United States Patent [19]
Inuzuka et al.

[11] Patent Number: 5,162,838
[45] Date of Patent: Nov. 10, 1992

[54] FACSIMILE APPARATUS AND METHOD FOR PROCESSING A FIXED DOCUMENT

[75] Inventors: Tatsuki Inuzuka; Keisuke Nakashima, both of Hitachi; Toru Takei, Katsuta; Yasuyuki Kojima, Hitachi; Kyoichi Nomura, Owariasahi; Shinichi Shinoda, Hitachi; Katsubumi Ouchi, Chigasaki; Hideki Muroya, Ebina; Eizou Ebisui, Yokohama; Norikazu Takahashi, Fujisawa; Tomoe Sasayama, Kamakura; Hideo Nakazawa, Yokohama; Naoki Kinoshita, Yokohama; Yasunori Iwafuji, Yokohama; Takeshi Kobayashi, Hachiouji; Hisashi Matsumoto, Yokohama; Hiroshi Kawamura, Yokohama; Tadashi Tamaoki, Yokosuka; Shogo Matsumoto, Shimoinayoshi, all of Japan; Kenji Yokoi, Basiglio MI, Italy; Atuhiko Urusihara, Kokubunji, Japan

[73] Assignee: Hitachi, Ltd., Tokyo, Japan

[21] Appl. No.: 735,351

[22] Filed: Jul. 24, 1991

[30] Foreign Application Priority Data

Jul. 26, 1990 [JP] Japan ................................. 2-198610
Jul. 27, 1990 [JP] Japan ................................. 2-197966

[51] Int. Cl.⁵ ............................................... H04N 1/00
[52] U.S. Cl. .................................................... 358/440
[58] Field of Search ................................. 358/400–401, 358/405, 442, 451, 475–476, 402, 407

[56] References Cited

U.S. PATENT DOCUMENTS

| | | | |
|---|---|---|---|
| 4,113,993 | 9/1978 | Heckman et al. | 358/440 |
| 4,837,635 | 6/1989 | Santos | 358/451 |
| 4,974,097 | 11/1990 | Kaneko et al. | 358/401 |

Primary Examiner—Stephen Brinich
Attorney, Agent, or Firm—Antonelli, Terry, Stout & Kraus

[57] ABSTRACT

A facsimile apparatus has a transparent plate on which a document may be located. The document is then scanned by a scanner which includes electronic solid state light generation means e.g. LEDs which illuminate the document, with the light reflected from the document being detected by a detector. An electronic signal corresponding to an image of the document may then be transmitted to a remote location. Alternately, the facsimile apparatus may be used to copy the document. Cut paper sheets are withdrawn from storage and an image printed thereon by a heat transfer system in which a film of ink is selectively heated. Paper on which an image has been printed is then received on the upper surface of the storage. The facsimile apparatus may also have a document transporter for moving a document past the scanner with the scanner fixed.

27 Claims, 58 Drawing Sheets

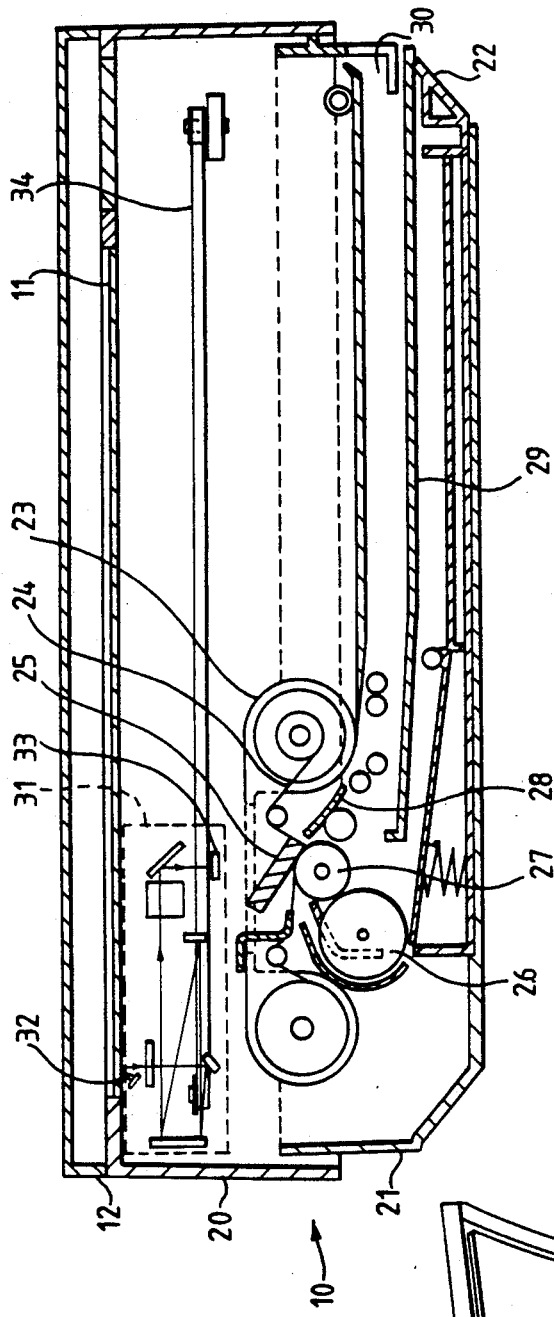
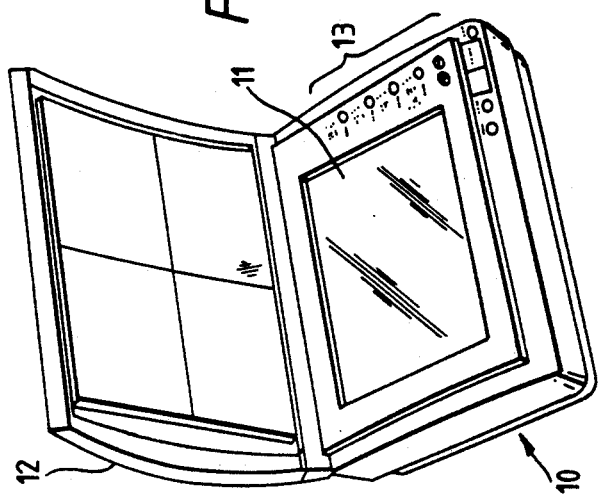
FIG.1b
FIG.1a

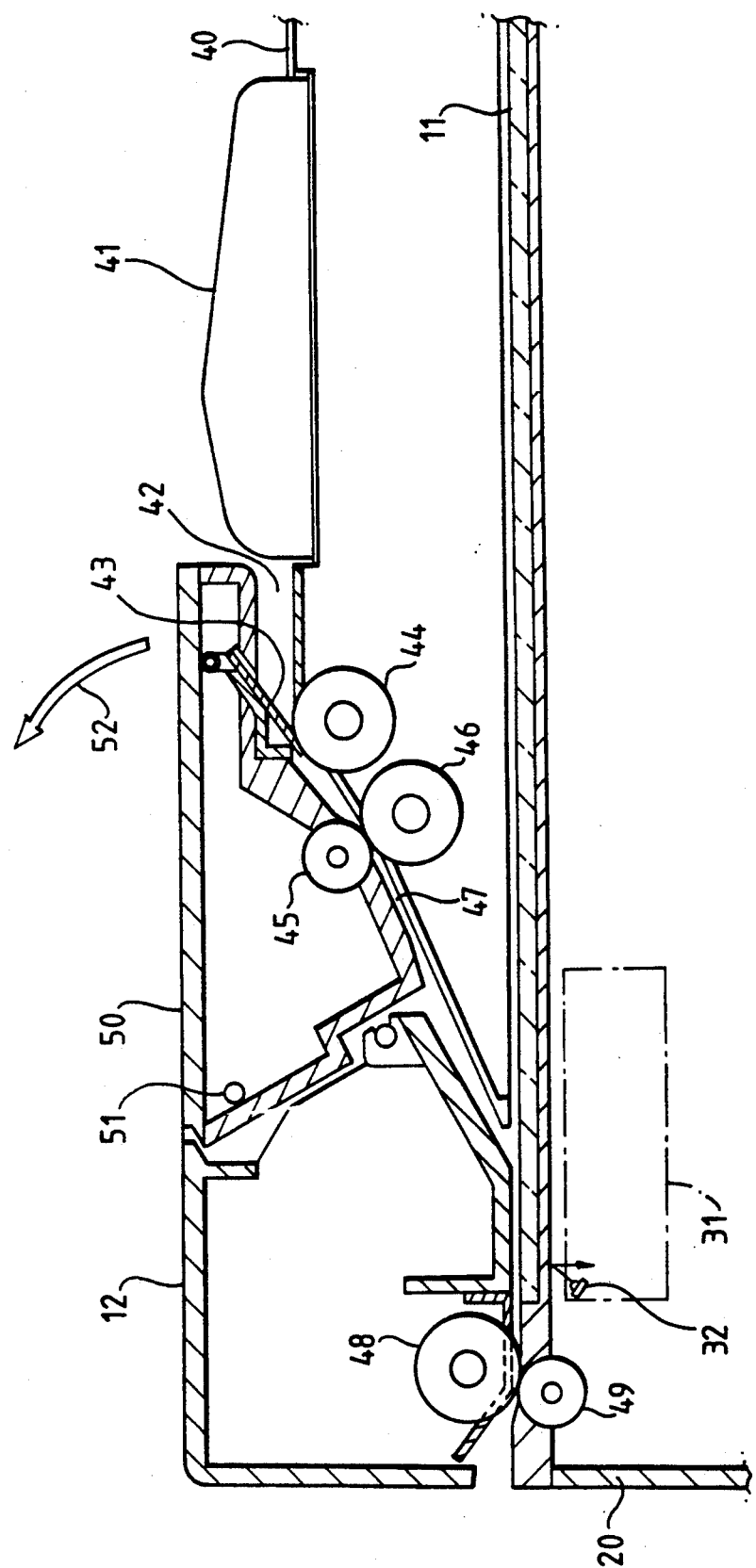

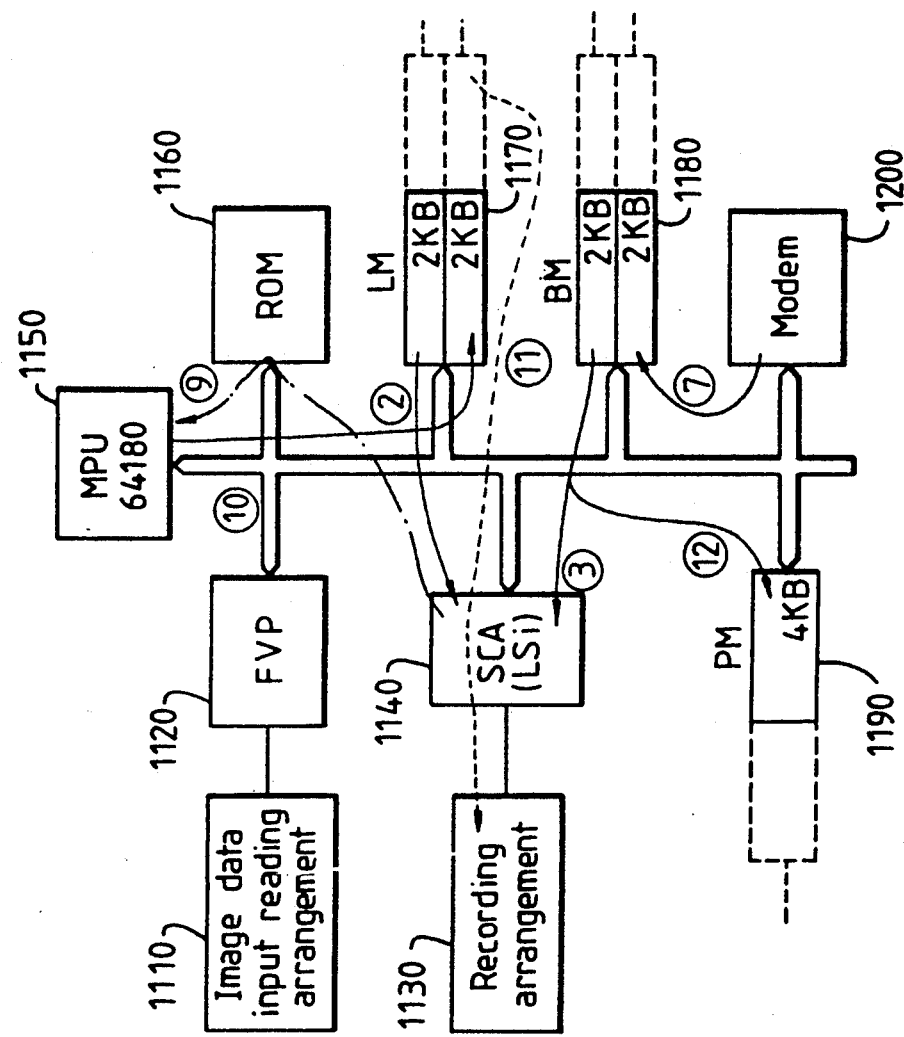

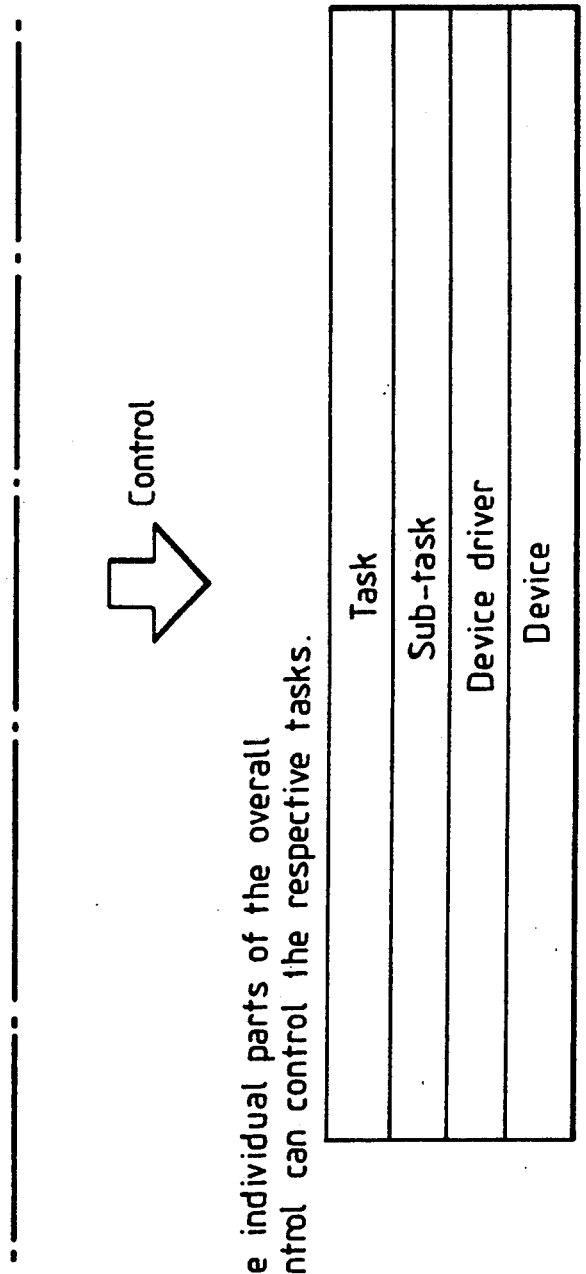

FIG.5

| Logic address | Physical address | | |
|---|---|---|---|
| 0000H | 00000H<br><br>03FFFH | \multicolumn{2}{l}{With a logic address and a plan number designated, the physical address can be generated for memory access.} | |
| 4000H | 04000H | DC000H | 14000H |
| 8000H | 08000H | 10000H | 18000H |
| CD00H | Ⓐ   60000H | | |
| | Ⓑ₁  60800H | | |
| | Ⓑ₂  61000H | | |
| | Ⓑ₃  61800H | | |
| | Ⓑ₄  62000H | | |
| | Ⓒ₁  62800H | | |
| | Ⓒ₂  63000H | | |
| FFFFH | Ⓒ₃  63800H | | |

FIG.6

| Indication character | 0 | 1 | 2 | 3 | 4 | 5 | 6 | 7 | 8 | 9 |
|---|---|---|---|---|---|---|---|---|---|---|
| Write data | C0H | F9H | A4H | B0H | 99H | 92H | 82H | D8H | 80H | 90H |
| Indication state | 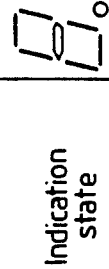 | 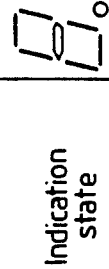 | 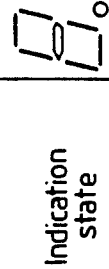 | 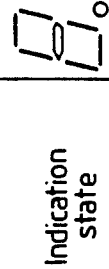 | 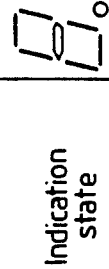 | 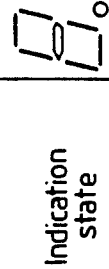 | 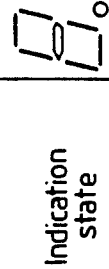 | 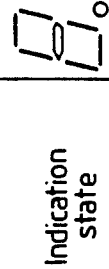 | 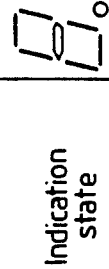 | 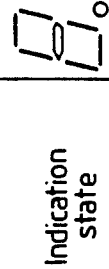 |
| Use | Normal | Q'ty of copy or q'ty of transmission | Same as left | Same as left | Same as left | Same as left | Same as left | Same as left | Same as left | Same as left |

| Indication character | C | E | F | H | L | P | 11 | | |
|---|---|---|---|---|---|---|---|---|---|
| Write data | C6H | 86H | 8EH | 89H | C7H | 8CH | C9H | | |
| Indication state | 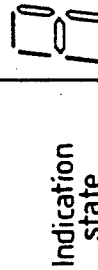 | 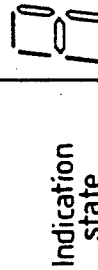 | 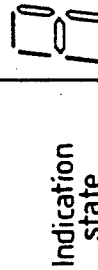 | 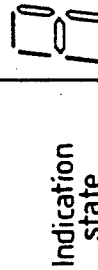 | 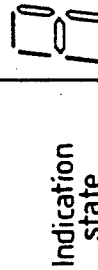 | 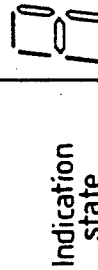 | 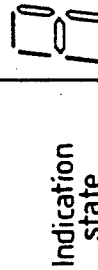 | 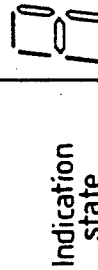 | 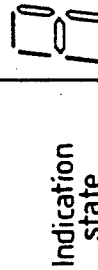 |
| Use | Management report | Alarm, general | Film | Post card | OCR | Recording paper alarm | Test | | |

(1) Combination of a sheet feeder and a book reading arrangement (2) Reading with the sheet feeder (3) Book reading (1)
Source two-dimentional image (2)
Destination two-dimentional image (1) Connection through a terminal adapter (2) Unique modemless connection

FIG. 14

| Feature | State<br>Event | State AA1 | | State AA2 | | |
|---|---|---|---|---|---|---|
| | | Process | Next state | Process | Next state | |
| Basic features | Event 101 | — | — | A1 | AA1 | ≀ |
| | Event 102 | A3 | AA2 | — | — | ≀ |
| | Event 103 | A10 | AA3 | A10 | AA3 | ≀ |
| | Event 104 | — | — | — | — | ≀ |
| | ...... | ...... | ...... | ...... | ...... | ≀ |
| Extension features | Event 201 | D11 | AA4 | — | — | ≀ |
| | ...... | ...... | ...... | ...... | ...... | ≀ |

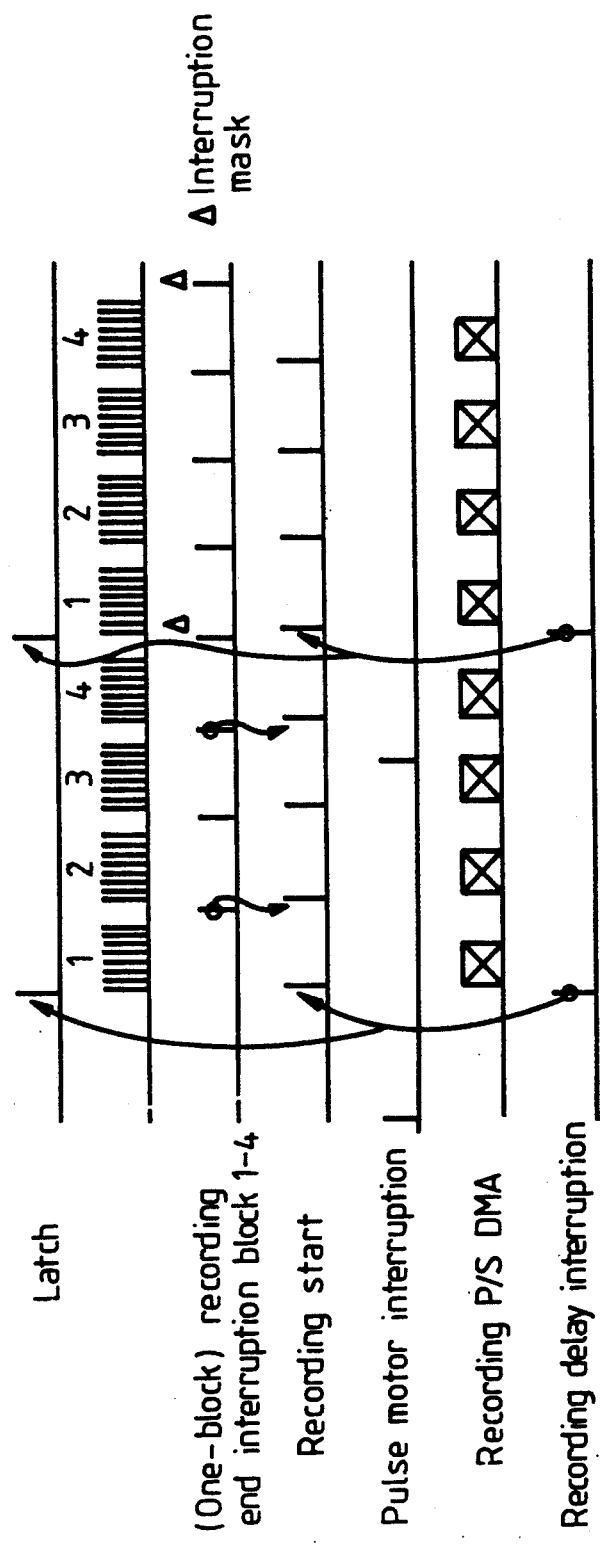

Reduction control method
(reduction of 15/16)

Illustration of two-line OR process
and process time.

| Recognition character | 0 | 1 | 2 | 3 | 4 | 5 | 6 | 7 | 8 | 9 | A | B |
|---|---|---|---|---|---|---|---|---|---|---|---|---|
| Meaning | Number 0 | 1 | 2 | 3 | 4 | 5 | 6 | 7 | 8 | 9 | Hex A | B |
| OCR style | ◻ | ⋮ | 2 | 3 | 4 | 5 | 6 | 7 | 8 | 9 | ⌐ | ь |
| | ▫ | | | | | | | | | ь | — | ᄂ |
| | | | | | | | | | | 6 | Ε | ┐ |
| Recording data g Yes | 62H 33H | 0CH | 52H | 70H | 4DH | 61H | 63H | 31H | 73H | 59H,71H | | |
| g No | 22H | 0CH | 12H | 30H | 0DH | 21H | 23H | 31H | 33H | 19H | | |
| Use | | | | | | | | | | | | |

FIG. 46 cont.

| Recognition character | C | D | E | F | P | - | + | T | , | * | # | = |
|---|---|---|---|---|---|---|---|---|---|---|---|---|
| Meaning | HEX C | D | E | 2nd dial tone | Pause | Hyphen | Overseas communication | Signal change | Blank | | | Dial end OCR style |
| OCR style | C | d | E | F | P | - | + | T | . | *, ⊥, ⌐, ∗ | #, #, #, # | =, ≡, ≡ |
| | ⋮ | ⋮ | ⋮ | | | | | | ⋮ | | | |
| Recording data | 42H | | 07H | 43H | 53H | 40H | 4CH | 48H | 00H | 6DH | 4FH / 7CH | 0FH / 3CH |
| g Yes | | | | | | | | | | | | |
| g No | 02H | | 07H | 03H | 13H | 00H | 0CH | 08H | 00H | | | |
| Use | | | | | | | | | | | | Same message |

Controlling main scanning direction

Controlling sub-scanning direction

FACSIMILE APPARATUS AND METHOD FOR PROCESSING A FIXED DOCUMENT

BACKGROUND OF THE INVENTION

1. Field of the Invention

The present invention relates to a facsimile apparatus. It also relates to a method of processing a document by such a facsimile apparatus, by e.g. either transmitting an image of the document to a remote location, or copying an image on the document, as appropriate.

2. Background

In a standard facsimile apparatus, a document to be transmitted is moved past a fixed reading device, and an image signal generated corresponding to the image on the document (whether words or graphics). That image signal may then be transmitted to a remote location e.g. via the telephone network, or maybe used to reproduce the image on material (normally paper) withdrawn from a roll thereof. In a similar way, an image signal of a document received by the facsimile apparatus via the telephone network from a remote location may be printed on the material withdrawn from the roll.

In such a conventional facsimile apparatus, it is not possible for the facsimile apparatus to scan documents other than in sheet form, because the document must be moved passed the reading device, and in practice this is normally achieved by drawing the document sheet through a nip between rotating rollers. Thus, it is not possible for a conventional facsimile apparatus to transmit a page of a bound book. If such a page is to be transmitted, it must first be copied by a suitable copying apparatus onto a sheet, so that sheet can be transmitted. Therefore, facsimile apparatuses have been developed in which a scanning means is movable relative to a transparent plate which can receive the document thereon. Thus, a page of a bound book may be placed on the transparent plate, and the scanning means operated. The scanning means then moves relative to the transparent plate to generate the image signal. Of course, such a facsimile apparatus may also transmit an image from a document in sheet form, by placing the sheet on the transparent plate. Examples of such facsimile apparatuses are shown in JP-A-60-118553, JP-A-60-232345, JP-63-117851, and JP-A-2-174362.

Another feature of conventional facsimile apparatuses is that they print onto material (normally paper) which is withdrawn from a roll. Therefore, the user must buy special paper for the facsimile apparatus, and cannot use plain paper sheets which are more readily available. Therefore, facsimile apparatuses have been proposed in which plain paper sheets are used.

One existing facsimile apparatus, the Fuji Xerox Able 3015 facsimile apparatus, combines both of the developments discussed above. In that facsimile apparatus, there are two reading modes, by which a document is scanned. Firstly, a document in sheet form can be scanned in the normal way, by moving the sheet past suitable scanning means. Secondly, a document in book or sheet form may be placed on a transparent plate and scanned. Printing of images occurs on cut sheets, making use of laser printer technology. The resulting apparatus is large and expensive.

SUMMARY OF THE PRESENT INVENTION

The present invention seeks to improve the convenience of use of conventional facsimile machines, and proposes that the facsimile apparatus has at least one scanning mode by which a document in book form can be scanned, and prints on material in the form of sheets, rather than a continuous roll.

The present invention then has a number of aspects which, alone or in combination, improve the ease of use of such a facsimile machine. In a first aspect of the present invention, the scanning means includes electronic solid state light generation means for generating light for illuminating the transparent plate on which a document in book or sheet form may be placed. An example of such electronic solid state light generation means is a light-emitting diode (LED).

Use of such electronic solid state light generation means according to the first aspect of the present invention then provides a number of advantages. Firstly, it is relatively simple to control the quantity of light generated by such solid state light generation means, and such control is preferably on the basis of a pulse signal, so that pulsed light is generated. The pulse rate of those pulses may then be controlled to give different effects. For example, the speed of scanning of the document may depend on the quality of the telephone line by which the electronic signal representing the image on the document is to be transmitted, or the degree of fineness of the resulting image. However, if the amount of light is held constant, it is possible for the detector detecting the light to become saturated when the speed of the document is low. By using a pulsed signal to the solid state light generating means, the pulse rate can be varied depending on the transmitting speed. Indeed, it is then particularly advantageous if the pulse speed is synchronized with the speed of movement of the scanning means relative to the transparent plate on which the document is located. It is also possible, by varying the pulse rate, to achieve scaling (changing the size of the final image relative to the original image).

The second aspect of the present invention is concerned with the printing of the image on a sheet. As was mentioned earlier, in the Fuji Xerox Able 3015 facsimile apparatus, use was made of a laser printer for printing. In the second aspect of the present invention, however, it is proposed that a thermal transfer method be used in which means generates a pattern of heat, and ink is transferred to the sheet on the basis of that pattern. Such a thermal transfer printing method may be achieved in a more compact structure than in a laser printer, so that the total size of the facsimile apparatus may be kept small. It may readily be appreciated that this second aspect of the present invention may be used in combination with the first, or may be used independently.

In the second aspect of the present invention, the ink is preferably carried on a movable film, which may then be movable parallel to the direction of movement of the sheet as it approaches the printing means. Indeed, it is possible for that film to be movable in either direction, to increase the efficiency of use thereof. In a further development of this aspect of the present invention, the film is mounted in a cassette which is removable from the facsimile apparatus, to make replacement thereof easy.

In the Fuji Xerox Able 3015 facsimile apparatus, documents in either book or sheet form were readable by placing the document on a transparent plate, and documents in sheet form could also be read by moving the sheet past the scanning means. In the present invention, of either the first or second aspect, it is possible to provide such a dual scanning arrangement. However, it has also been realised that the sheet reader may be connected to means for analysing the image scanned, to derive information therefrom. Then, it is possible to provide on a sheet information which indicates the destination of documents to be transmitted (such as the telephone number of a further facsimile apparatus), and then for the document to be transmitted to that destination to be located on the transparent plate for scanning. This feature then represents a third aspect of the present invention, which again may be independent or used in combination with either of the first and second aspects.

A further problem with the conventional facsimile machine is that, since the document to be scanned is moved past the scanning means in a fixed direction, the direction of scanning is necessarily fixed. Therefore, a fourth aspect of the present invention proposes that scanning is on the basis that the scanning means moves relative to a transparent plate, and that the direction of such scanning is selectable. Thus, it is possible to determine how a document will be received. This may be important, for example, where the destination facsimile apparatus uses paper from a roll and it is desired to ensure that the received image is orientated in a particular direction at the destination facsimile apparatus.

One of the problems of the Fuji Xerox Able 3015 is its size. and the fifth aspect of the present invention considers the problem that existing facsimile apparatuses generally have a paper receiving tray, for receiving the printed images, which projects from the casing of the facsimile apparatus. This increases the overall size of the facsimile apparatus and therefore, according to the fifth aspect of the present invention, sheet receiving means receiving the or each printed sheet is provided within the casing, accessible via an aperture in the casing. In this way, the size of the facsimile apparatus is not increased by the tray for receiving the printed paper.

The facsimile apparatus according to the present invention may also be used in a copy mode, in which the image from the scanned document is immediately printed on a paper sheet.

In conventional facsimile apparatuses, in which the paper to be printed thereon is withdrawn from a roll, there is no real problem when a break occurs in the reception of an image signal from a remote location, because printing can immediately cease, and the roll be cut at the point where the break occurred. In the Fuji Xerox Able 3015 facsimile apparatus, there is similarly no problem because a laser printer does not start to print a document until the whole of a page has been received. However, if thermal or transfer printing methods are used, based on cut sheets, then it is necessary to complete the withdrawal of a sheet from the sheet store once that withdrawal has commenced. Therefore, a sixth aspect of the present invention proposes that there is a delay between the start of reception of an image symbol from a remote location and withdrawal of a printed sheet from the store. In practice, the majority of reception failures result from erroneous linking between the two facsimile apparatuses at or close to the start of the transmission, and therefore the delay proposed will prevent such breaks in transmission wasting sheets of paper. Again, this aspect of the present invention is independent or may be combined with any of the earlier aspects.

BRIEF DESCRIPTION OF THE DRAWINGS

Embodiments of the present invention will now be described in detail, by way of example, with reference to the accompanying drawings in which:

FIG. 1a shows a general perspective view of a facsimile apparatus according to a first embodiment of the present invention;

FIG. 1b shows a sectional view through the facsimile apparatus of FIG. 1a;

FIG. 1c shows a modification of the facsimile apparatus of FIG. 1a;

FIG. 5 illustrates schematically an example of the assignment of memory addresses;

FIG. 6 is an example of an indicator display for indicating internal states of the facsimile apparatus;

FIG. 14 is a chart showing transition states;

FIG. 43 shows yet a further timing chart;

FIG. 46 illustrates the generation of the sheet of FIG. 45;

DETAILED DESCRIPTION

Figure 2A:
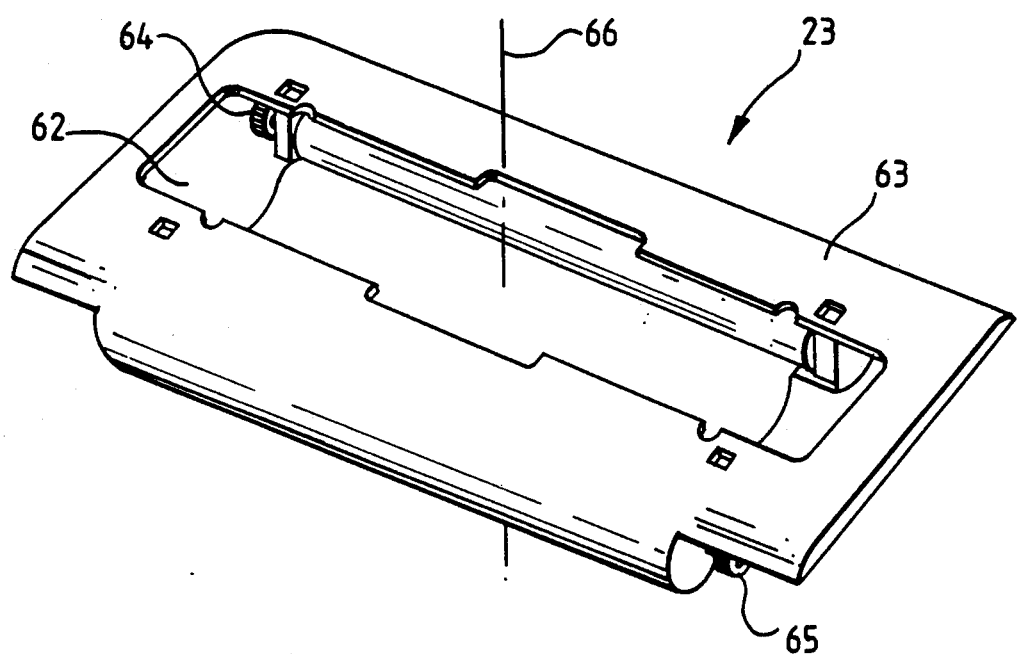
FIGS. 2a and 2b are views from above and below respectively of, a cassette for an ink-carrying film.

FIG. 1(a) shows a general perspective view of a facsimile apparatus in which the present invention may be embodied. The facsimile apparatus shown in FIG. 1 has a body 10 having a transparent plate 11 in a surface thereof, on which plate 11 a document to be scanned may be placed. FIG. 1(a) also shows a lid 12 of the apparatus, to reduce the amount of stray light reaching the transparent plate 11, and controls 13 (shown schematically) for operating the facsimile apparatus.

A cross-sectional view of the facsimile apparatus of FIG. 1(a) is shown in FIG. 1(b). It can be seen that the body 10 comprises upper and lower body parts 20, 21 which are separable to permit access to the interior of the body 10. The lower body part 21 receives therein a store 22 for storing therein sheets of paper on which images are to be printed by the facsimile apparatus. The lower body part 21 also supports therein a cassette 23 containing a film 24 carrying ink. Heating means 25 is controlled so as to establish a heating pattern which transfers ink from the film 24. In the printing operation, a paper sheet is withdrawn from the store 22 via a roller 26, and passed between the film 24 and a further roller 27 below the heating means 25. That heating means 25 then heats the ink in the desired pattern corresponding to the image, so that the image is then transferred to the paper sheet. The paper sheet is then guided via a guide 28 to the upper surface 29 of the store 22, so that the space 30 above that store 22 acts as a sheet receiving tray. Thus, the printed sheets are received within the body 10 of the apparatus, rather than on a projecting tray.

The upper part 12 of the body 10 of the apparatus has a scanner 31 including a linear arrangement of LEDs 32 and a light detector 33. The scanner 31 is movable below the transparent plate 11 along a track 33. In this way, a document placed on the transparent plate 11 may be scanned on the basis of illumination from the LEDs 32, and the resulting image detected by the detector 33.

FIG. 1(c) illustrates a modification of the facsimile apparatus of FIGS. 1(a) and 1(b). In the embodiment of FIGS. 1(a) and 1(b), a document is placed on the transparent plate 11 and the scanner 31 moves to scan the image thereon. In the embodiment of FIG. 1(c), it is also possible to scan a document in sheet form with the scanner 31 fixed. In the embodiment of FIG. 1(c), an upper surface 40 of the lid 12 has a paper guide 41 which guides a paper sheet into an aperture 42, where it is engaged between a plate 43 and a roller 44. That guides the sheet between rollers 45, 46 and down a track 47 so that it passes above the scanner 31 and hence may be illuminated by the LEDs 32. Rollers 48, 49 then guide the sheet from under the lid 12. This operation will be discussed in more detail later. The part 50 of the lid above the channel 47 may be hinged about hinge 51 to permit it to be listed in the direction of arrow 52 to permit access to a sheet in the channel 47 if, for example, there is a paper jam.

The apparatus shown in FIGS. 1(a) to 1(c) has several operation modes. These will now be discussed in more detail.

(1) Image Reading

The image reading section has image data to be transmitted to a destination party through transmission line. Image reading occurs in either of the following two modes of operation.

a) A book reading mode in which that the document is put on the transparent plate 19, and sensor scanning is made as the document and the sensor are moved relative to each other.

b) A sheet reading mode in which the sensor is fixed, and sensor scanning occurs as the document is moved.

The facsimile function is not restricted by those modes of operation, but the former book reading mode of operation allows a thick book to be input directly while the latter sheet reading mode allows a plurality of sheets to be read continuously and automatically when an automatic sheet feeding unit is combined therewith. As the two modes of operation have respective advantages, users may select the appropriate mode of operation as desired. The embodiment shown in FIG. 1c permits the lid of the facsimile apparatus to have a configuration that allows for the both modes of operation so that a variety of documents can be read.

The two image reading modes can use either an independent sensor for each mode or a common sensor. With the common sensor, for example, in the book reading mode, the sensor is moved below the transparent plate and in the sheet reading mode an arrangement is provided so that the sheet can be moved above the sensor, which is fixed at an end of the transparent plate.

The image reading section can have a document reading mode selecting arrangement provided therefor, e.g. in the controls 13. Depending on a suitable set value signal processing occurs to select a desired image reading mode. The sensor can be moved to its initial position depending on the set value.

(2) Recording

Recording section for a facsimile receiving image or copying image is not restricted to a specific method. However, the present embodiment may make use of, for example, a heat sensing recording method, a heat sensing transfer method, and a toner developing method. In the heat sensing transfer method, as an example, ink coated on a film is selectively heated by a heat sensing head so that it is transferred to plain paper.

If the ink on the film is arranged so that it cannot all transferred be transferred at once, the ink film can be used a plurality of times. It is relatively rare that the whole sheet has an image recorded therein. Thus, the decrease in ink concentration when a plurality of recordings are made is lowered if recording parts are not completely aligned every time. This is advantageous to minimize consumption of the ink film.

Figure 2B:
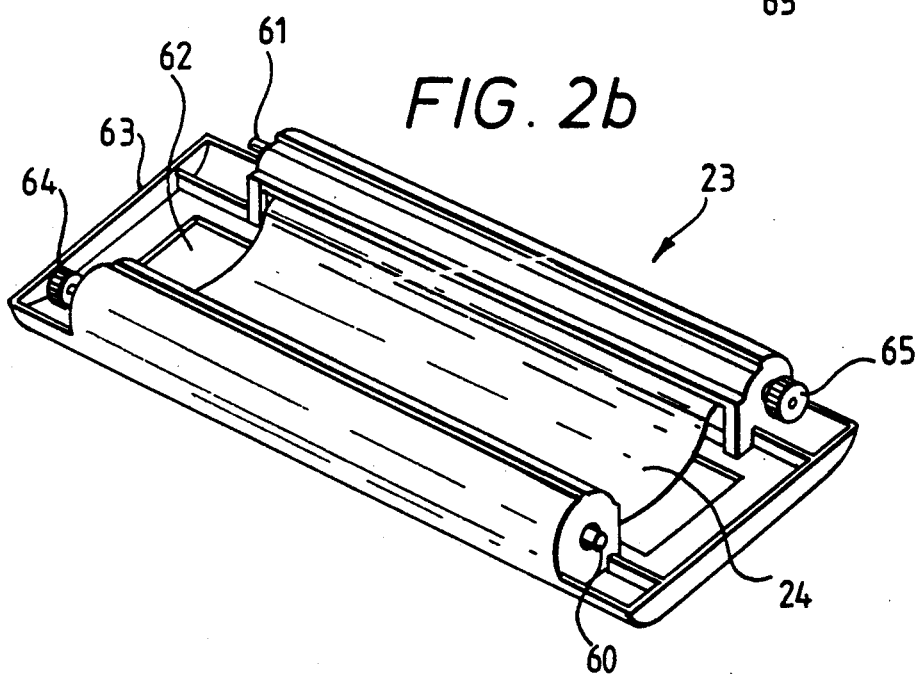
Figure 3A:
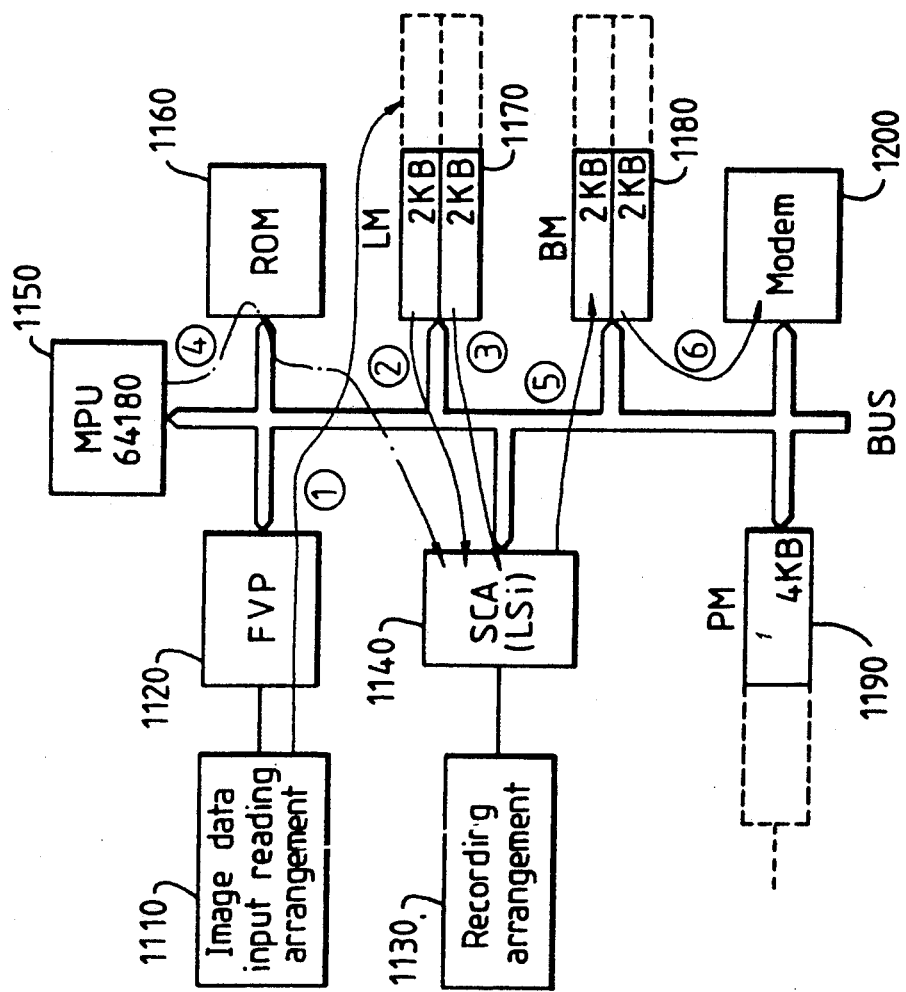
FIGS. 3(1) to (6) and 4 are block diagrams showing data flows within a facsimile apparatus according to the present invention.
Figure 3B:
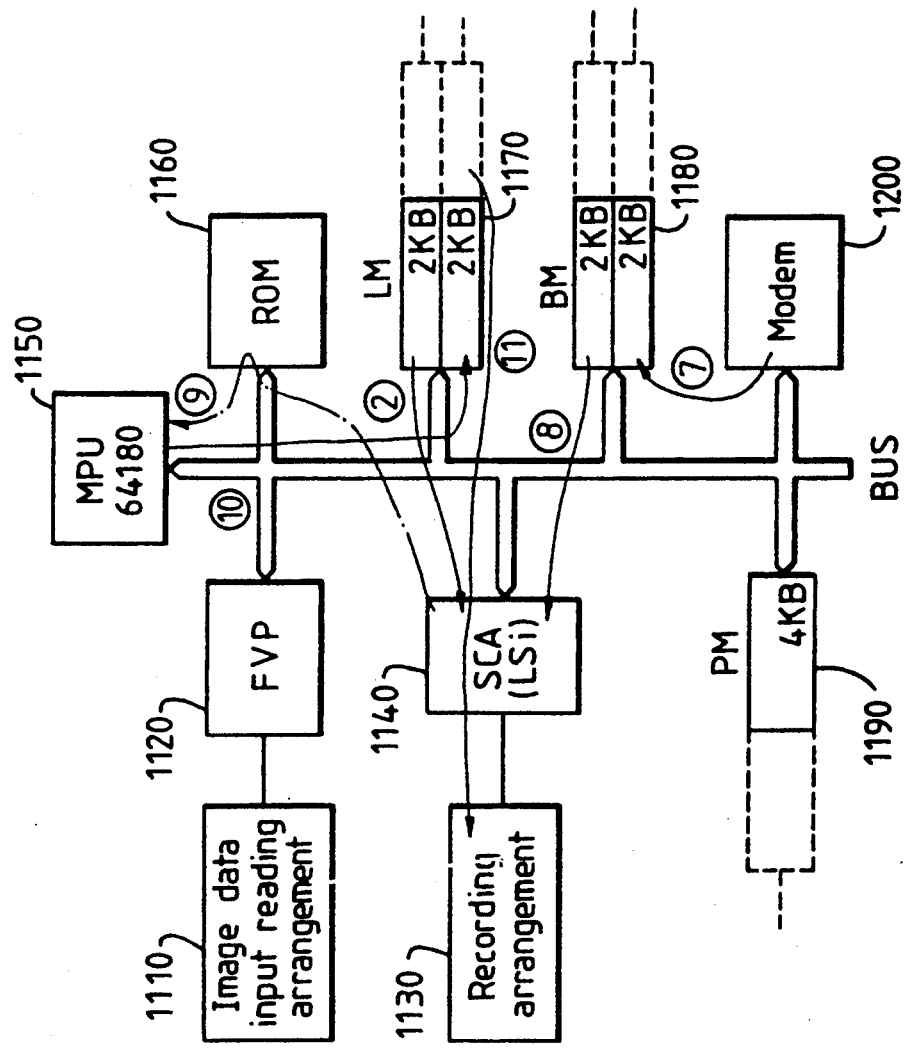
Figure 3C:
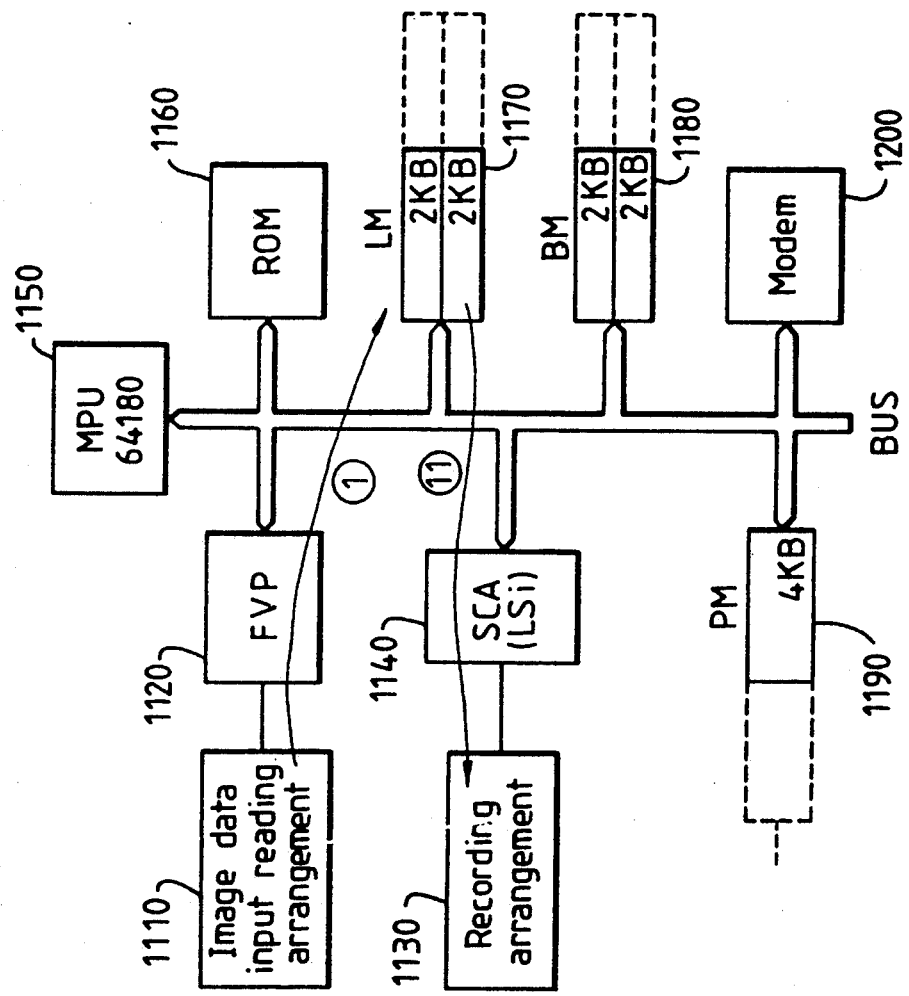
Figure 3D:
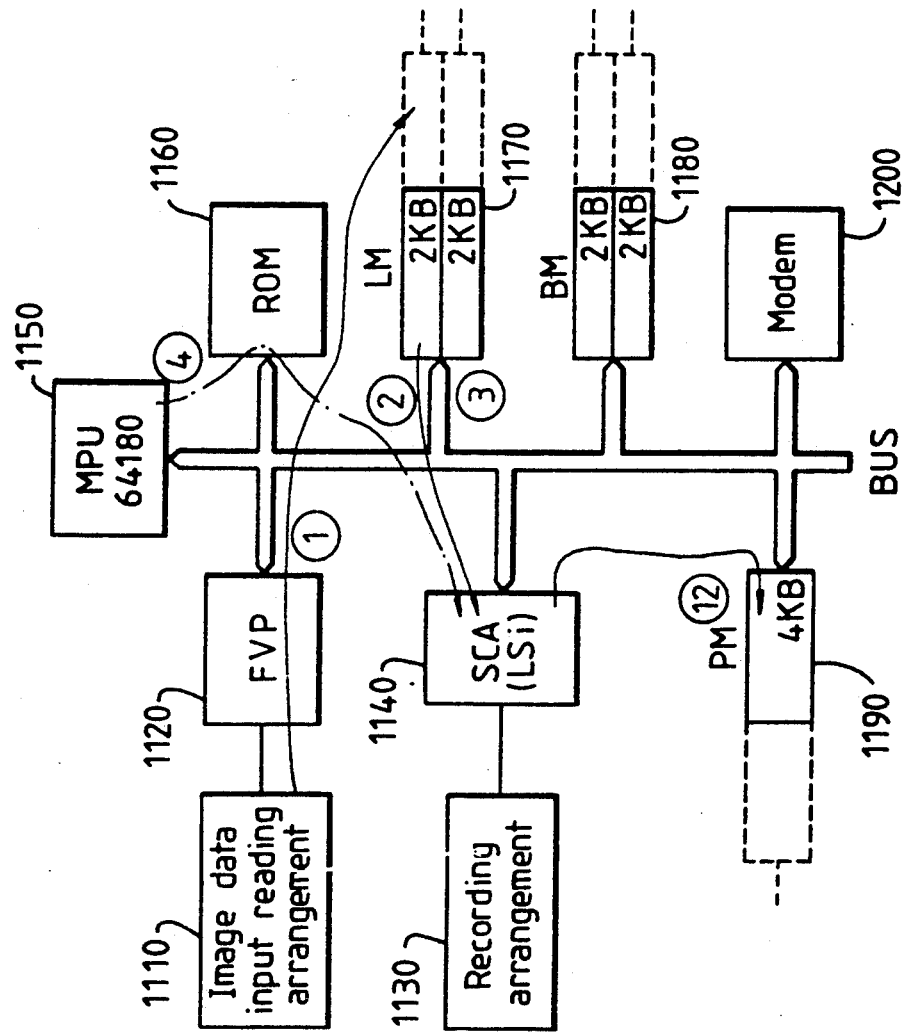
Figure 3E:
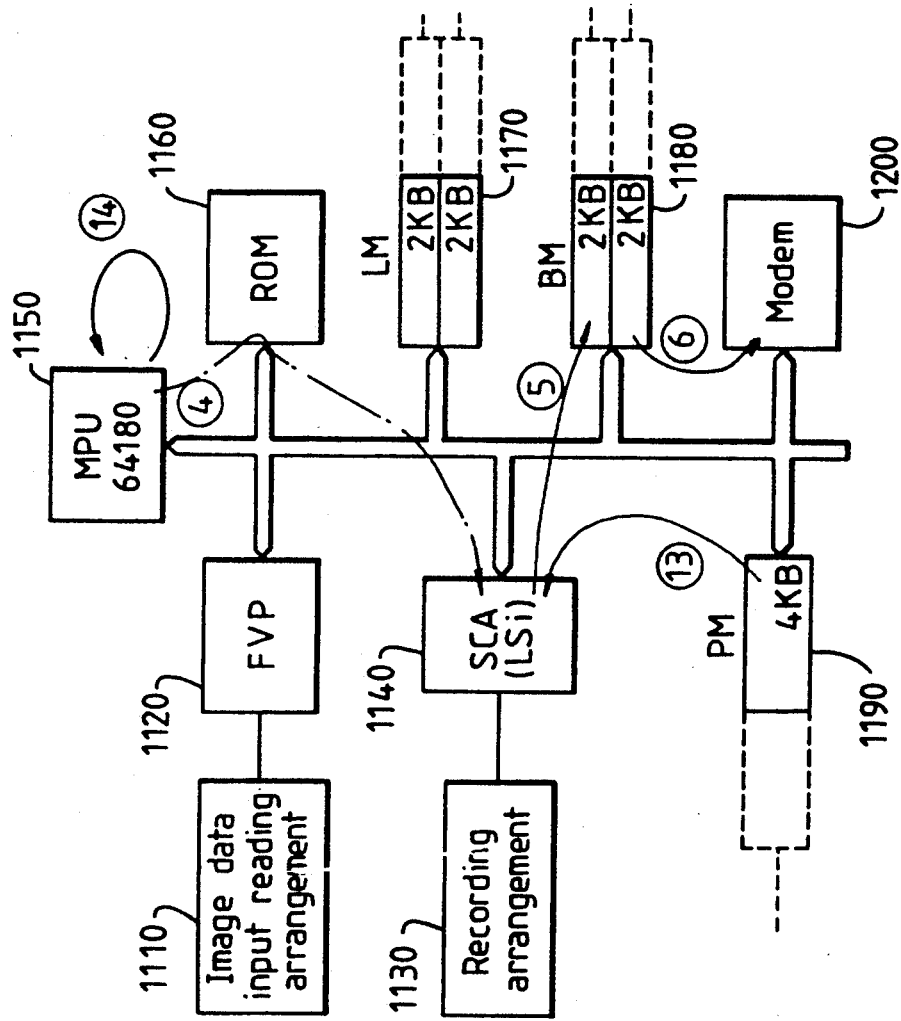

FIGS. 2a and 2b show in more detail the structure of the cartridge 23. As shown in FIGS. 2a and 2b, the cartridge 23 has a pair of shafts 60, 61 around which is wrapped the film 24, so that the film 24 extends across an opening 62 in an upper surface 63 of the cassette 23, through which the heating means 25 will be moved to contact the film 24. Each of the shafts 60, 61 terminates in a drive wheel 64, 65 respectively. When the cassette is in the position shown e.g. in FIG. 2a, the drive wheel 64 of the shaft 61 may engage with a suitable drive to draw the film 24 from the shaft 61 to the shaft 62. When the end of the film 24 is reached, the cassette 23 can be rotated through 180° about axis 66, so that the drive wheel 65 of the shaft 61 is now driven, to cause the film 24 to move from the shaft 60 to the shaft 61. Thus, it is possible by rotating the cassette to achieve a multiplicity of operating runs of the film from one shaft to the other. It is also possible, of course, to provide drives to each of the wheels 64, 65 so that the direction of movement of the films 24 can be reversed without movement of the cassette 23.

(3) Transmission Control

In order to make facsimile communication through an analog telephone network, transmission control procedures are executed, which comply with the standard of Group 3 facsimiles recommended by the CCITT (International Telegraph and Telephone Consultative Committee).

The telephone number of the destination party can be entered without installation of an additional telephone dialling feature on the facsimile apparatus according to the present invention, by use of a telephone set connected to the facsimile apparatus in a master-slave relationship.

Also, a list of the telephone numbers of destination parties used often can be stored in the facsimile apparatus or as an IC card which is portable.

An example of a control circuit to accomplish the facsimile apparatus discussed above, is shown in FIG. 3.

The data flow corresponding to the facsimile features will now be described with reference to the circuit construction shown in FIG. 3. FIG. 3 shows an image data input reading arrangement 1110 for input of image data, a pre-processing arrangement 1120 for the input image data, which is referred to as facsimile video processor (FVP) recording arrangement 1130 for the image data, an exclusive OSI 1140 for executing the facsimile signal process, which is also referred to as a system control ASIC (SCA), a central processing unit (CPU) 1150 or a microprocessing unit (MPU), and a read only memory ROM 1160 for storing programs for the CPU 1150.

Also, FIG. 3 shows a line memory LM 1170, a line memory BM 1180, and a page memory PM 1190 which provide different functions for storing the image data, code data, and one page image data, respectively.

FIG. 3 shows a modulation/demodulation unit modem for input or output of signals via an external analog telephone line.

The following describes data flow for use of the facsimile apparatus described above for (1) instantaneous transmission, (2) instantaneous reception, (3) copying, (4) memory storage, (5) memory transmission, and (6) memory reception. The data flows are indicated by arrows in FIG. 3.

(1) Instantaneous Transmission

In data flow *1, the image data entered through the image data input reading arrangement 1110 is pre-processed, such as by shading correction, by the pre-processing arrangement 1120, and then is transferred to the line memory LM 1170 in a DMA (direct memory access) way.

In data flows *2 and *3, data, stored in the line memory LM 1170 including the present line PL to be encoded and a reference line LL to be referred to for encoding, are transferred to the OSI 1140, which in turn generates data for generation of coded words on the basis of picture element positions in the PL and LL. It should be noted that the algorithm used for encoding process complies with the CCITT recommended modified Halfmann (MH), modified read (MR), or modified (MMR) systems.

In data flow *4, the CPU 1150 creates the coded word, on the basis of the data generated in the OSI 1140 for generation of coded words, which in turn is transferred to the OSI 1140.

In data flow *5, as since the coded word is generally a bit stream of fixed length, the OSI 1140 can write it in the line memory BM 1180 when a number, for example, eight, bits, are collected.

In data flow *6, in turn, data is transferred from the transmission/reception line memory BM 1180 to the modem 1200 in time with signal transmission of the modem 1200.

(2) Instantaneous Reception

In data flow *7, the signal input from an external analog line is converted to a digital signal by the modem 1200. The digital signal then is written in the transmission/reception line memory BM 1180.

In data flow *8, data in the transmission/reception line memory BM 1180 is transferred to the OSI 1140, which in turn generates data for code detection suitable for the decoding process.

In data flow *9, the data is transferred to the CPU 1150. The CPU 1150 re-stores the image data so that it is stored in the line memory LM 1170 while compares it with the decoded data in the reference line (data line *2).

In data flow *11, the image data obtained as described above is transferred to the recording arrangement 1130, which reproduces the recording image.

(3) Copying

The image data input through the image data input reading arrangement 1110 is pre-processed by the pre-processing arrangement 1120, and then is stored in the line memory LM 1170. The image data is transferred from the line memory LM 1170 to the recording arrangement 1130, which reproduce the recording image.

(4) Memory Storage

The coded word is generated in the same way as in instantaneous transmission. The generated coded word is not output from the modem 1200, but is stored in the page memory PM 1190.

(5) Memory Transmission

In order to transmit the coded words stored in the page memory PM 1190 to a destination party, those words are converted to an image size specific to the recording capacity of the destination machine. The converted signal is output through the modem 1200.

For this purpose, data transference is made for the image size conversion using the CPU 1150 and the OSI 1140 (data flows *13 and *14). The generated coded words are transferred to the transmission/reception line memory BM 1180 and fed out through the modem 1200.

(6) Memory Reception

The received data is not decoded, but the received data in the transmission/reception line memory BM 1180 is stored in the page memory PM 1190 in units of one page. The data are encoded and processed to reproduce recorded image as necessary.

Figure 4A:
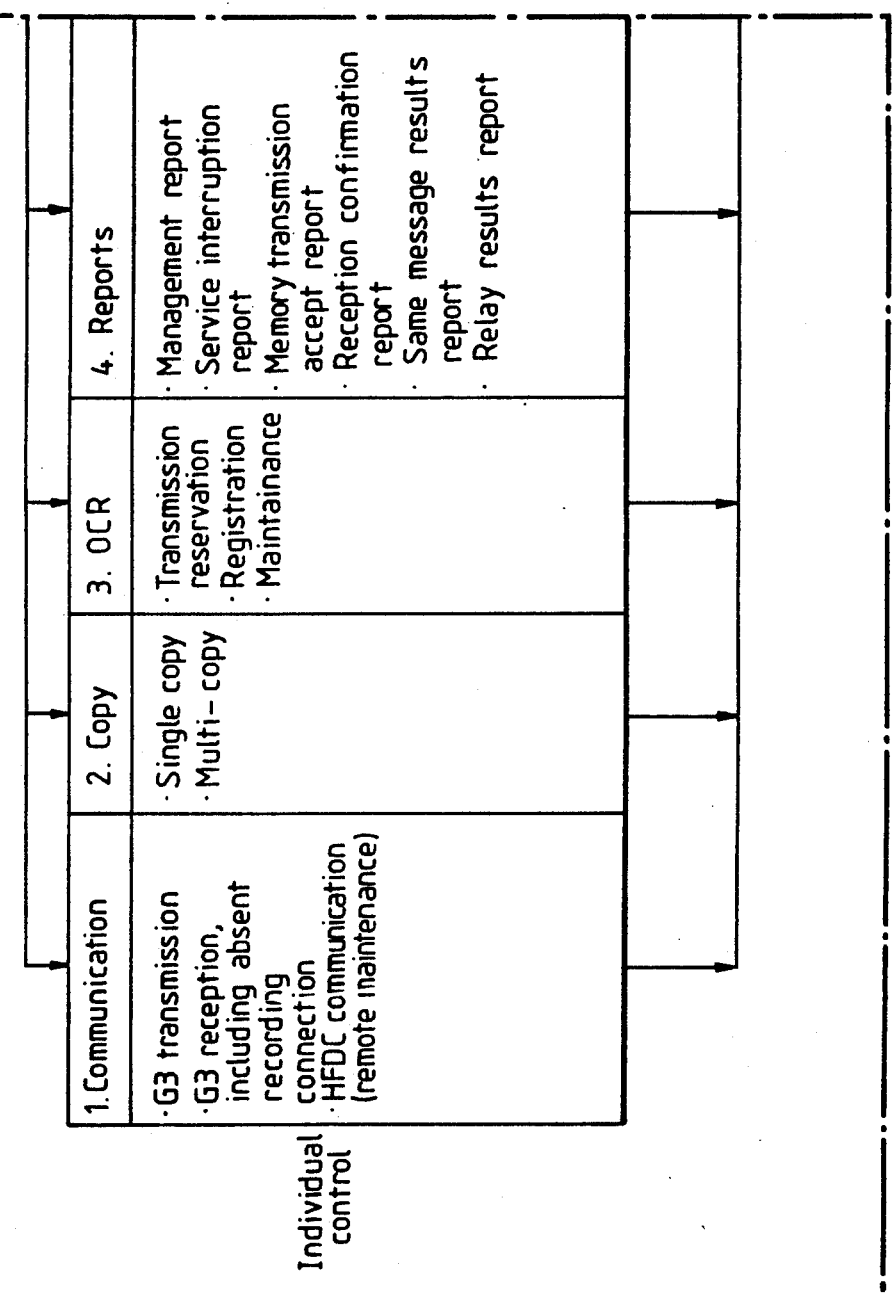
Figure 4B:
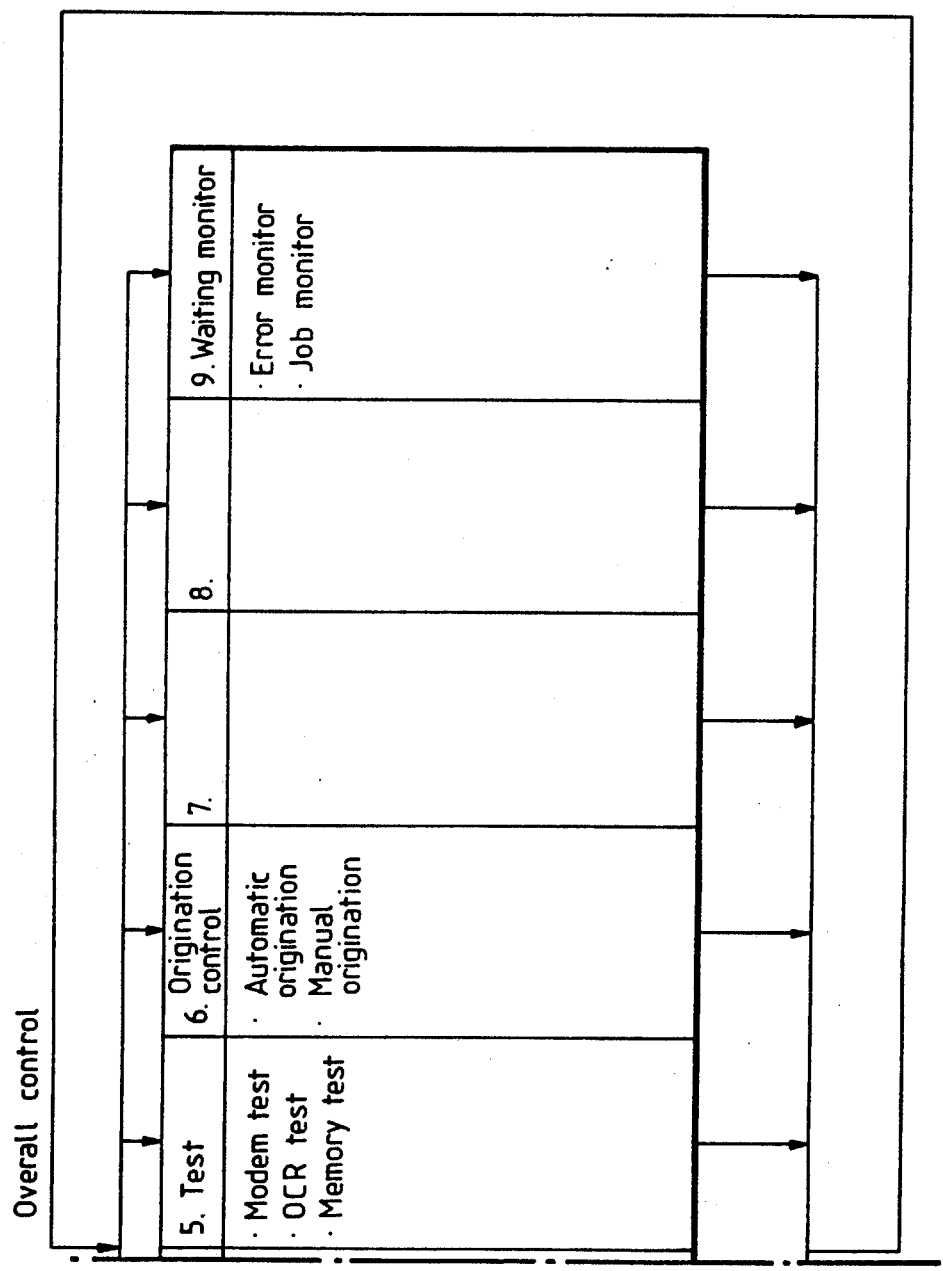

In turn, the software for accomplishing the above operations of the facsimile apparatus can be structured as shown in FIG. 4 as an example. It has a hierarchic structure with an overall control section for controlling the entire system, individual control sections for controlling individual features, task and subtask sections for processing signals which are controlled by the individual control sections, and a device driver section for controlling features specific to devices. Every feature is in the form of a module, which facilitates program correction and addition and program development and debugging.

The execution procedures of each program can be described as a combination of the current state with a future event. They can be controlled by the overall control section so that each of the lower levels can have its program described independent of the whole system.

To control the facsimile apparatus, for example, an eight bit CPU can be used so that the address space is region and can be designated with a 16 bit binary signal. It is however desirable that the address space has a program memory, image data, and code data superimposed thereon, as programming is often restricted.

To avoid such a difficulty, the address space may have a plurality of numbered memories assigned in the same region so that the number designation can be executed independently in parallel with the address designation. This can make the memory region be physically greater than the address space that the CPU can designate directly.

FIG. 5 shows an example of the assignment of memory addresses arranged in the way described above. The memory numbers mentioned above correspond to divided features of the software so that, for example, the memories can be used for image memory, but not for code memory. This means that the physical memory can be made functionally clear for use.

The divided memory described above facilitates correction, addition, and debugging during creation of the program. It also makes clear the functions corresponding to specific features, for example, the addition of memory capacity to be used as optional feature. Thus, it is greatly advantageous in constructing the apparatus.

It is very important that an operator is aware of the facsimile features and operational states for smooth operation and prevention of erroneous operation. For the purpose, the apparatus can include features for indicating character information or generating out voice information.

However, it is also important to make the construction of the apparatus as simple as possible. FIG. 6 shows a seven segment indicator, as an example, which gives information to the operator. Such an indicator may form one of the controls 13. The simple indicator can indicate to the operator not only transmitting and receiving details characteristic to the facsimile operation, but also facsimile states, including set quantity of copies reporting communication control, passing error messages such as jamming of recording paper, and other information.

The indicator is useful to simplify the apparatus and clearly indicate to the operator the operational states.

As described previously, entering an image of document can be made in either of the following two modes of operation.

a) A book reading mode.
b) A sheet reading mode.

When both document reading modes are available, they may be sequentially or selectively usable by means of, for example, a selection button.

Figure 7A:
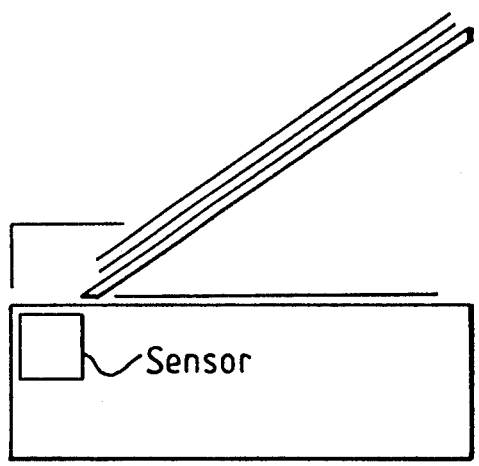
FIG. 7 shows schematically the reading of documents by the apparatus of FIG. 1c.
Figure 7B:
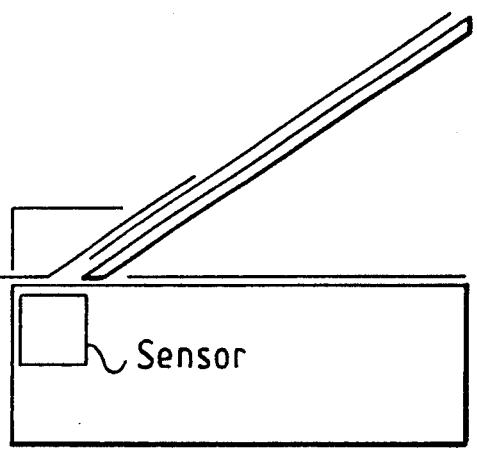
Figure 7C:
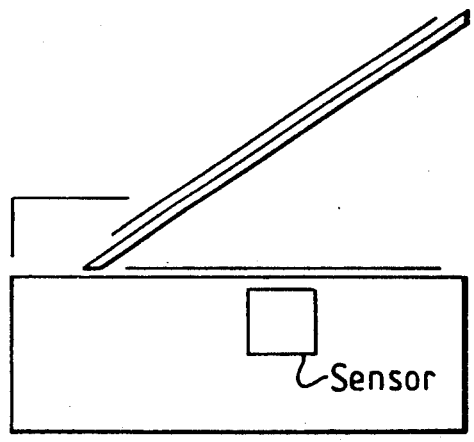

FIG. 7 shows a combination of both document reading modes of operation which allows for the following operations. A book reading plate (transparent plate 19) should have a document for facsimile transmission, and the sheet reading section should have a sheet containing a destination telephone number of, for example, OCR (optical code readable) form described and provided at a plurality of positions. Several of the OCR sheets may be available.

Firstly, at least one destination telephone number is entered via the sheet reading section. Secondly, the document on the book reading table (transparent plate 19) scanned to transmit coded data to the destination party. Thirdly, the designated telephone number should be re-entered on the sheet reading section so that facsimile transmission can be made in the book reading mode.

With the procedure described above repeated, the image data of the document to be sent can be code transmitted while sensor scanning occurs. This allows the same image data to be transmitted to a plurality of destination parties without image data being stored in a memory of the apparatus.

Similarly, to copy the document on the book reading table (transparent plate) to a plurality of sheets sensor scanning should be repeated a plurality of times. This can be executed without storing image data in the memory.

It should be noted that sensor scanning repeated a plurality of times, is not be limited in a direction, but may be in any of lateral direction.

It is sometimes desirable that the size of the image read by scanning should be magnified or reduced before being code transmitted. This happens when the procedures for checking the capabilities of both communication parties are executed and on the basis of the result, the transmitting party has to convert the image size so that it coincides with the image size available to the receiving party. Image size magnifying and reducing is not be limited to one method, but may be executed by hardware or software or a combination of both.

Figure 8:
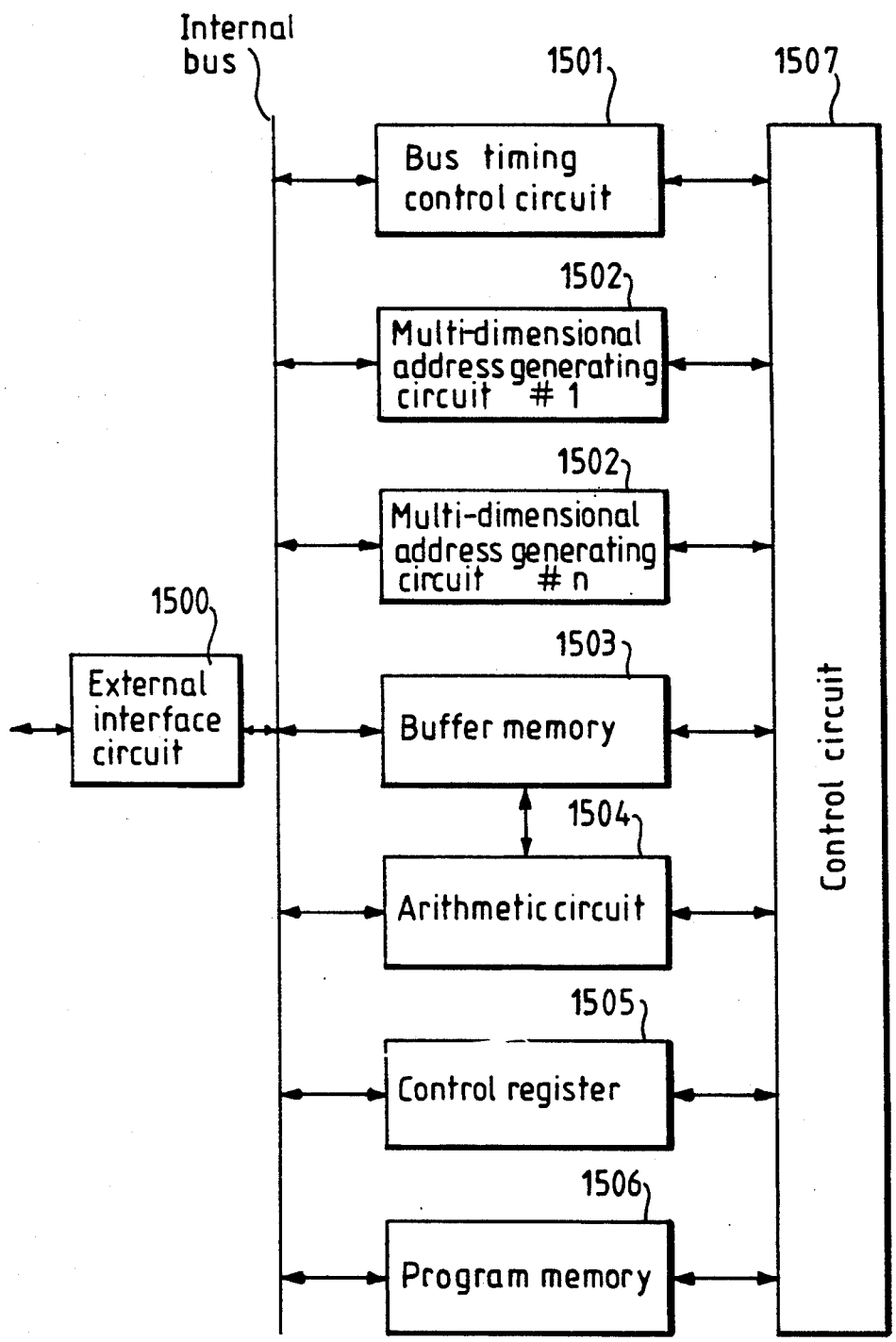
FIG. 8 shows the configuration of an image data processing unit.

FIG. 8 is an example of an image data processing unit for magnifying or reducing (scaling) the image size. The image data processing unit comprises an external interface circuit 1500 for controlling signals between an external bus and an internal bus, a bus timing control circuit 1501 for managing the bus controlling signals, a multi-dimensional address generating circuit 1502 for converting between addresses in a two-dimensional image plane and addresses in a memory arranged in one dimensional fashion and for controlling bit arrangement of single picture element, a plurality of color signals for a color image, a buffer memory 1503 for storing image data, an arithmetic circuit 1504 for executing signals using of the image data in the buffer memory 1503, a control register 1505 and a program memory 1506 for setting operation conditions of the image data processing unit using of the external CPU, and a control circuit 1507 for executing and operating the above mentioned component circuits of the image data processing unit.

Figure 9:
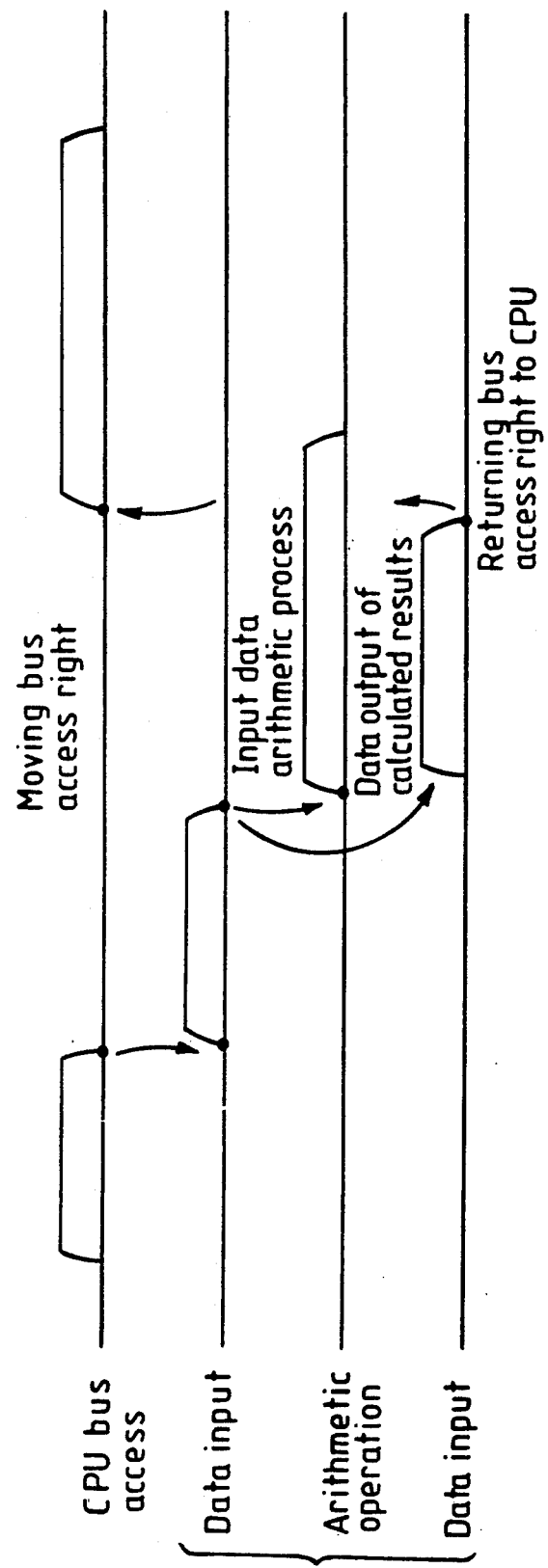
FIG. 9 shows signal timings in the image data processing unit of FIG. 8.

The image data processing unit is connected to e.g. the CPU, and the image memory, through the bus so that it can operate sequentially according to values registered by the CPU and an internal program to input or output data from the image memory. Bus access is made so as to avoid data collision with other units capable of bus accessing the bus. The data stored in the internal buffer memory 1503 can be processed by the arithmetic circuit 1504 for e.g. magnification, reduction, rotation, filtering and/or level conversion. The internal buffer memory 1503 can be doubled, one part for executing data input and output and the other part for arithmetic processing, thereby shortening the execution and processing time. FIG. 9 is a timing chart for signal processing of the image data processing unit.

As described above, the image data processing unit has an image memory and an arithmetic circuit in addition to the features of a data transfer unit conventionally know as direct memory access controller (DMAC). It has the great advantage that it can execute at a high speed the input and output of the image data of the address arrangement, related to the image composition as well as magnification, reduction, filtering, and other arithmetic processes based on image composition, without increasing the load on the CPU. It also has another great advantage in that the unit can be constructed simply.

Figure 10A:
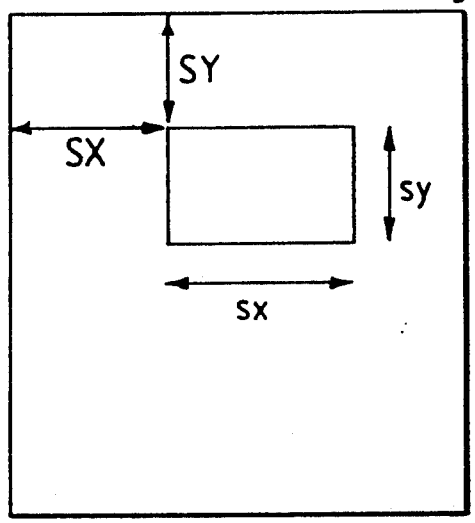
FIG. 10 illustrates image transmission.
Figure 10B:
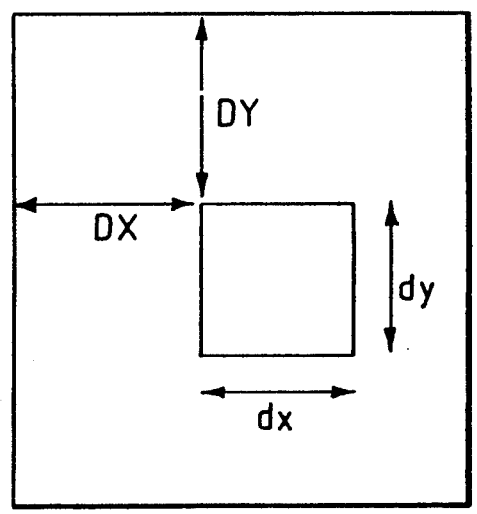

FIG. 10 illustrates a two-dimensional source image and a destination image for signal processing of parts of the image. The multi-dimensional address generating circuit 1502 is used to define actual memory addresses. The generation of the memory addresses can be made by distinguishing a plurality of color signals of the color image, the bit width per picture element, horizontal or vertical subsampling, and/or other set values. This has the advantage of decreasing the load on the CPU.

In order to encode and code process a multi-value image in which a single picture element is represented by a plurality of bits, using e.g an orthogonal conversion, such as a discrete cosine conversion, it data should be input or output in signal processing units of, for example, 8 by 8 picture elements. The multi-dimensional address generating circuit 1502 can execute data transfer sequentially in units of a two-dimensional image block of 8 by 8 picture elements at a high speed, with no duplication or omission of picture elements between the blocks without increasing the load on the CPU, and maintaining the scanning order of the block units.

The internal arithmetic circuit 1504 can have an additional multiplier circuit and an adder circuit, suitable for orthogonal conversion, to control the arithmetic order so that the orthogonal conversion can be executed at a high speed.

Figure 11:
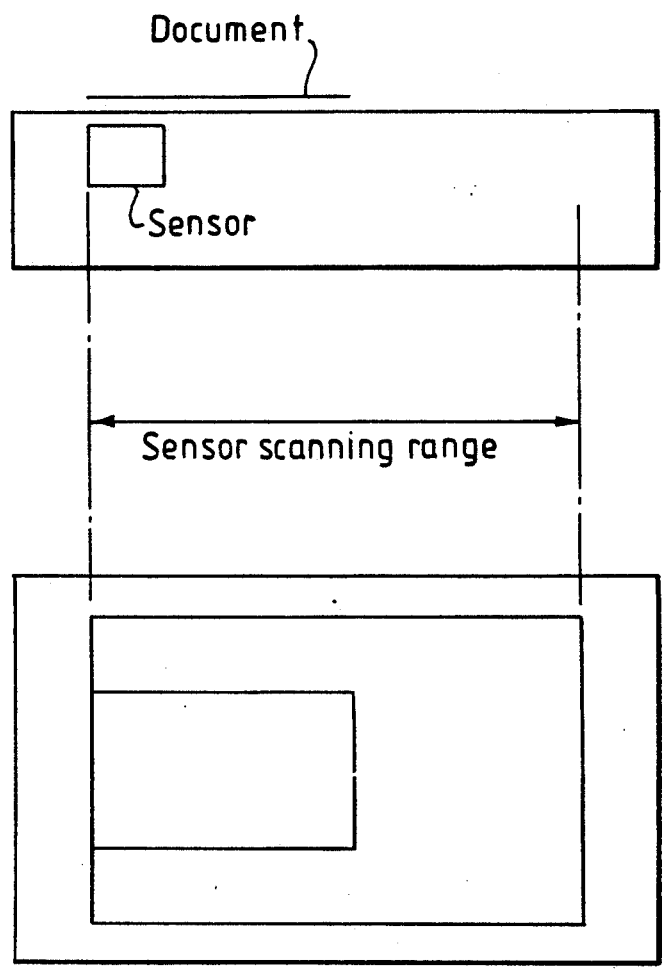
FIG. 11 shows schematically a document reading operation of a facsimile apparatus according to the present invention.

The scanner section of the facsimile apparatus may be constructed so that it can read in a block fashion, as shown in FIG. 11. This allows picture element data to be input repeatedly while the sensor scannes the same document a plurality of times. This feature is not available in a conventional sheet reading mode.

The probility of a plurality of sensor scans allows signal processing by: (i) judgement of the document size, (ii) judgement of character areas, drawing areas, and similar areas through signal processing of the image data on the document, and (iii) signal processing for calculating statistical signal values of the whole image, permitting signal processing to improve the image quality.

The sensor scanning may be either to the right or to the left in the figure, and is not limited to a single direction.

Figure 12A:
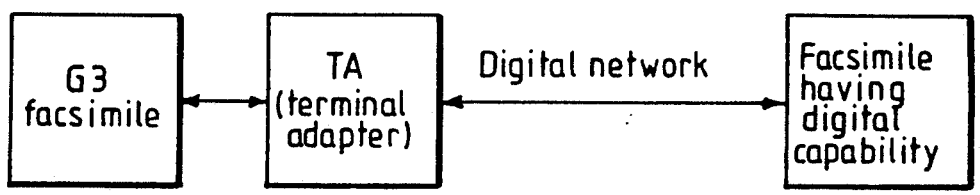
FIG. 12 illustrates the transmission of similar images according to the present invention.
Figure 12B:
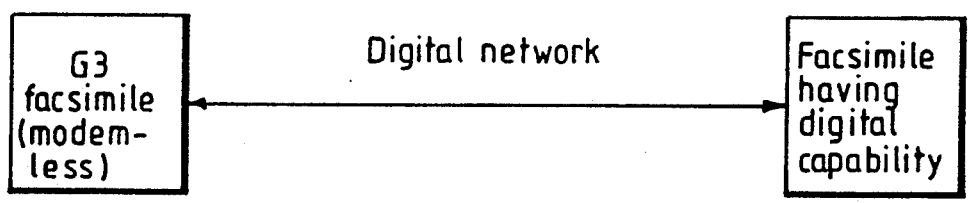

FIG. 12 is block diagram illustrating connection with a destination party. In FIG. 12, in order to connect a facsimile apparatus, such as one of CCITT Group 3 which assumes an analog telephone network, with a digital network, to transfer data between it and another facsimile apparatus having digital capabilities, a protocol converter called a terminal adapter (TA) has to be inserted therebetween. The TA is needed to provide an interconnection capability according to the standard of the facsimile communication through the digital network. However, if the features of the destination facsimile apparatus can be uniquely specified with a telephone number of the digital network, the facsimile apparatus does not always have to comply with the communication standard, but can make data transfer using its own control procedures. In this case, the facsimile communication can be achieved by specifying the destination telephone number and features to be used before the coded data in a Group 3 facsimile apparatus is directly transmitted in digital fashion without conversion to an analog signal by a modem. Specifying the destination telephone number as may determined which whether the communication standard or the internal control procedures should be used.

Thus, the facsimile apparatus or an IC card held by an operator can have a list of destination telephone numbers, corresponding features for example, analog or digital capability and highest communication speed preset therein. This allows omission of parts of the checking procedures of the capabilities of the two parties specified in the communication standard for the destination parties listed. It also allows determination of availability of the own control procedures are available. In this way, it is possible to shorten or omit the time for the communication controls other than those of the image data transfer. This is advantageous in that the time needed for the facsimile communication can be shortened.

Alternatively, for signal processing on the receiving side, a receiver can have a plurality of telephone numbers assigned thereto. The capabilities of the apparatus transmitting may be determined in dependence on the called telephone number, so as to determine whether connection is made by the communication standard or by the internal control procedures.

In general, conditions which the signal process procedures for the CPU are determined can be those of combination of the present state with events allowed in the present state. Depending on the conditions, the signal processing procedures to be executed and the subsequent state can be determined.

Figures 13A, 13B, 13C:
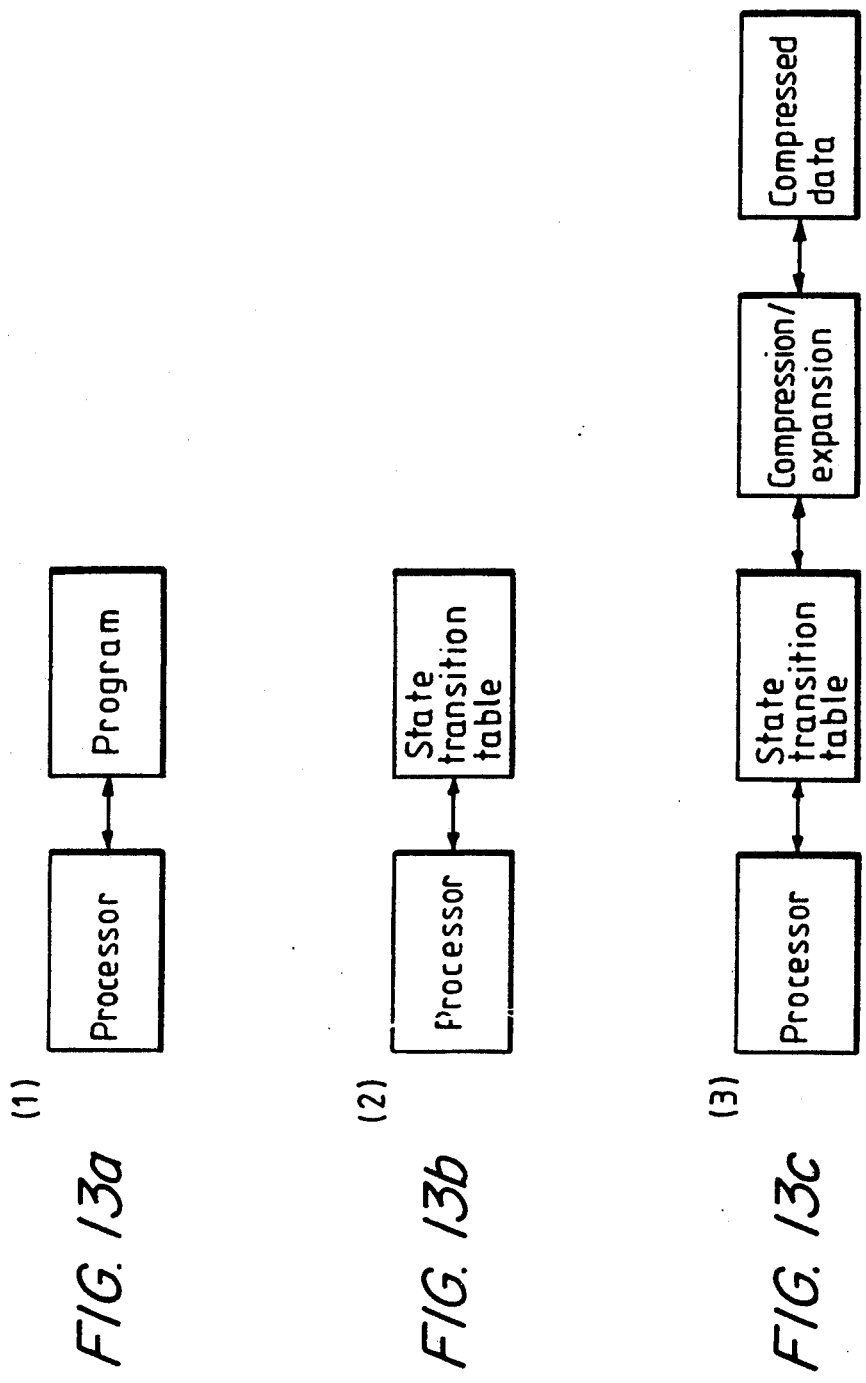
FIG. 13 is a block diagram showing processor processing operations.

Such operations of the CPU are described in a program language as shown in FIG. 13(1), and are stored in the program memory so that they can be set.

However, the description of the CPU operation in the program language may cause some problems. Examples of these include (1) unclear conditions for the combination of the state with events, which result in difficulties in program correction, addition, and for debugging, and (2) significant ranges to be checked due to addition of a new optional feature.

To avoid such problems and describe the signal processing procedures clearly, use may be made of a technique called the state transition table which charts the signal processing procedures to be executed in the combination of the state with the event and the change to the next state. The state transitions are given in, for example, the CCITT recommendation in which the transmission control procedures are specified.

Thus, the CPU operation is set by the above mentioned state transition table as shown in FIG. 13(2) rather than described in the program language. This allows control of the state transition of the apparatus to be distinguished from CPU operation under controlled conditions. Thus, for example, the decision to comply with the communication standard is made using of the state transition, while the communication processing procedures are characteristic to the apparatus. This has the advantage that program correction, addition, and/or debugging, can be made easily.

However, in general, not all the combinations of the states in the state transition table are possible, but there are many ineffective combinations. For this reason, as shown in FIG. 14, the state transition table has blanks therein for which contents are not described.

It is not always possible, due to use of the memory that such a state transition table is stored unchanged in the memory. To solve this, as shown in FIG. 13(3), there may be an additional data compression/expansion feature capable of data compression or expansion for the state transition table. It can compress the data when it is stored in the memory, and expand it when it is needed for the CPU operation. In other words, the data can be in the memory in a form in which it can be referred to by the CPU so that the efficiency of memory can be improved.

If the state transition table is determined to be little related to the CPU operation in the current state, the data is controlled or organised so that they cannot be expanded as they were compressed. This can reduce the memory capacity needed for development of the state transition table to a form in which it can be referred to by the CPU.

The data compression and expansion should not be limited to specific methods and means, but can be accomplished by, for example, an algorithm such as the Halfmann coding or arithmetic coding or by converting the data transition table to a list structure before the data are accumulated.

Data input/output can be made by connection of an external data processing apparatus such as a personal computer. For this purpose, it is necessary to control line communication features, facsimile operation buttons, and signal processing procedures and priority of the external data input/output. These controls can be described in the state transition table referred to above so that the program can be easily created, corrected, added, and debugged.

If the image data are code processed before being stored in the memory of the facsimile apparatus, the amount of codes generated by a single page changes with the nature of the image to be processed. Therefore, the number of images which can be stored in the memory gives capacity is variable. For the reason, it is desirable for an operator of the facsimile apparatus to be presented with a rate or percentage of the amount of data stored in the memory, to indicate the current state of the storage of the image data.

In such a case, it is not always necessary that the amount of memory used is indicated accurately, but, for example, the rate of use can be represented by one-digit number (1 through 9) or by a other definite symbols to guide the user properly for correct operation.

Figure 15:
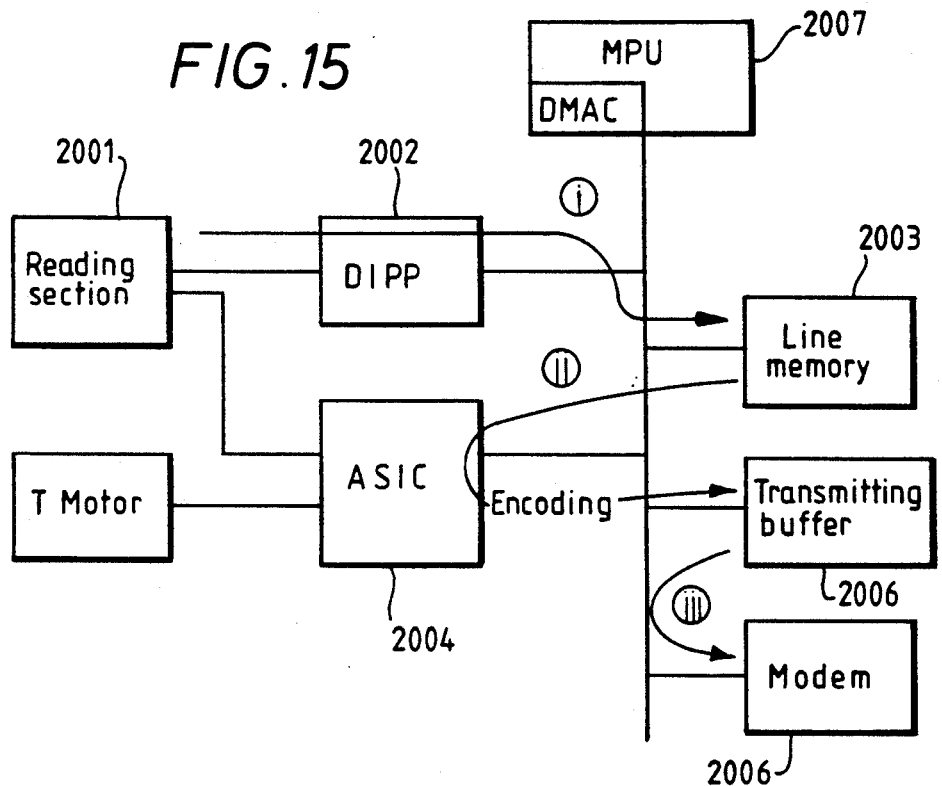
FIG. 15 is a block diagram showing part of the facsimile apparatus according to the present invention.

FIG. 15 is a hardware block diagram of an example of reading control. Flow line (i) indicate data read by a reading section 2001 (corresponding to scanner 31 in FIGS. 1b and 1c) and stored in a line memory 2003 through a DIPP 2002 (Product No. HD63084) which is an image processing LSI. Flow line (ii) indicates, in turn, that image data in the line memory 2003 is encoded by a software CODEC 2004 (ASIC in FIG. 15) and is stored in a transmitting buffer 2005. Flow line (iii), indicates that the code data is transferred to a modem 2006 by modem interruption as transmission data in units of eight bits.

Figure 16:
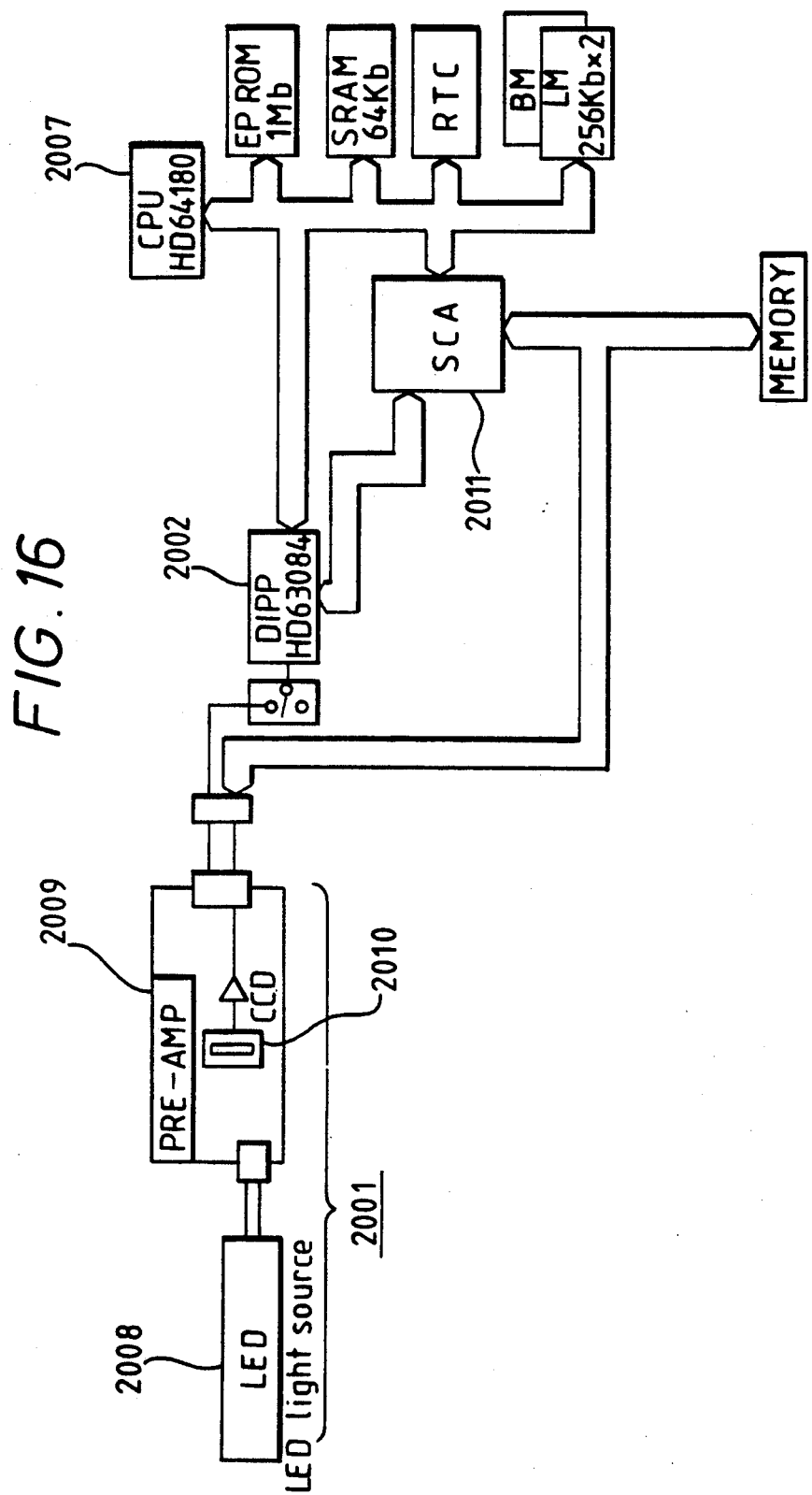
FIG. 16 is a block diagram showing a further part of the facsimile apparatus according to the present invention.

FIG. 16 shows details of the reading section 2001. FIG. 16 shown a LED light source 2008 (corresponding to LEDS 32 in FIGS. 1b and 1c) which illuminates a document to be read. Light reflected from the document is read by a one-dimensional reading sensor 2010 provided on a preamplifier printed-wiring board 2009. The reading sensor 2010 of FIG. 16 has a CCD sensor but a MOS sensor or contact sensor may be used.

The reading sensor 2010 has a control signal given through the DIPP 2002 from a SCA system control unit SCA 2011. The system control unit SCA 2011 also generates a turn-on control signal for the LED light source 2008 and an interruption signal for a drive pulse motor. The DIPP 2002 and the system control unit SCA 2011 are controlled by a CPU 2007 (HD64180).

Figure 17:
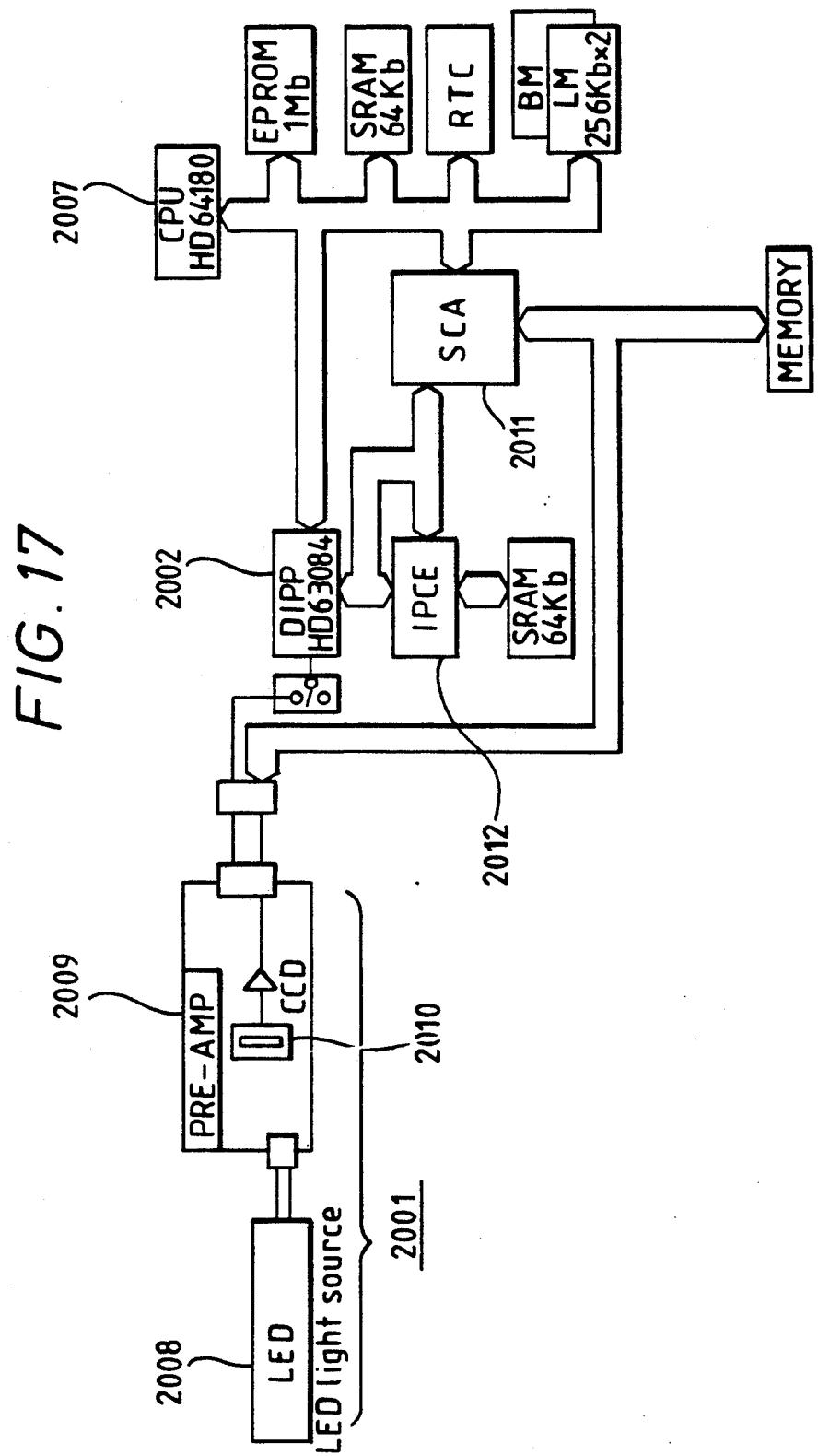
FIG. 17 shows a modification of the part of the facsimile apparatus of FIG. 16.

FIG. 17 is an image improving ASIC IPCE 2012 connected to the DIPP 2002 to improve the image reading characteristics. The IPCE 2012 can emphasize two-dimensional edges to prevent them from being thinned and collapsing, and can suppress moire caused during a two-value process for a half tone image, thereby improving the image reproducibility.

As described previously, there are two modes of operation for reading a document with the one-dimensional line sensor. One is a book reading mode in which the document is fixed while the line sensor is moved. The other is a sheet reading mode in which the line sensor is fixed while the sheet is moved.

Both modes of operation involve output dispersion due to shading which affects the two-value coding of the read signal. Shading is a low frequency distortion of the image signal when the white signal level gradually approaches the black level as the quantity of light is lowered as the edges of the document are approached.

This is due to non-uniformity of the light source and the characteristics of the lens used to focus the image on the sensor.

Figure 18:
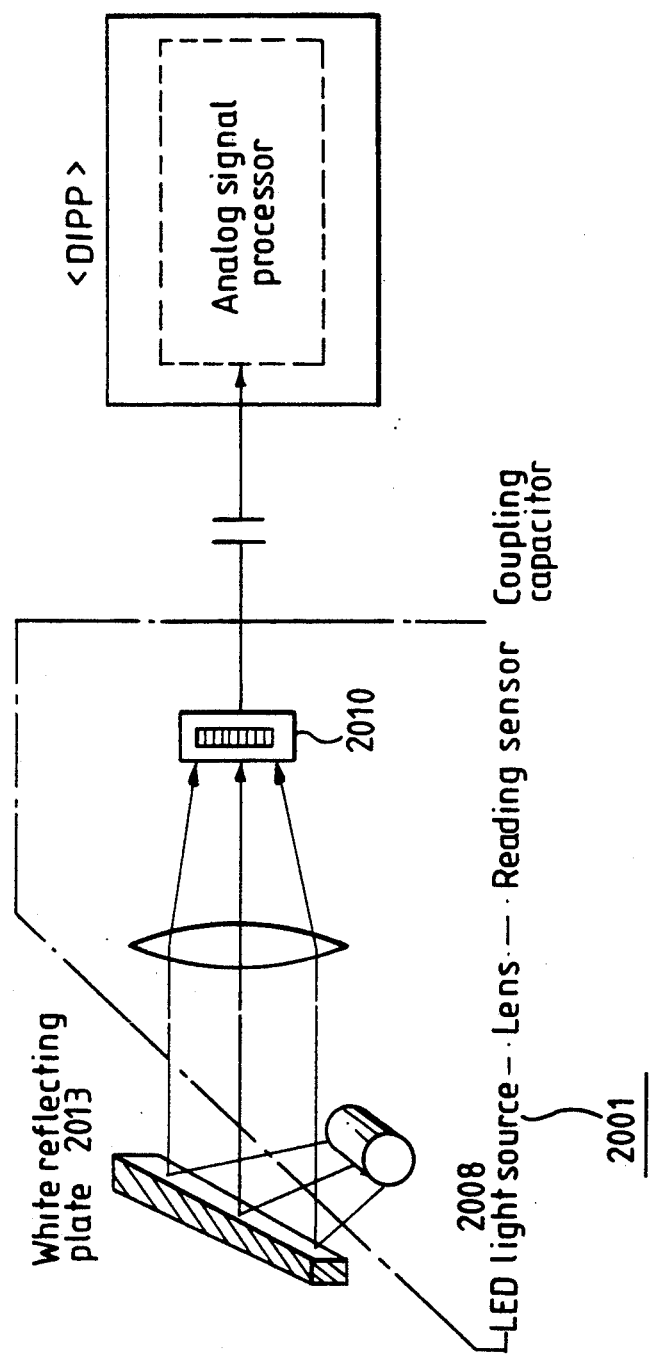
FIG. 18 illustrates schematically documents scanning in an embodiment of the present invention.

To compensate for this distortion, the present invention makes use of the DIPP 2002. The DIPP 2002 reads and stores reference data of one line from a white reflecting plate 2013 in the reading section 2001 before reading the document, as shown in FIG. 18. By reference to the shading waveform, a slice level is generated to digitize the input image data. The data of one line of the document then is read and coded to two values using of the slice level.

Figure 19:
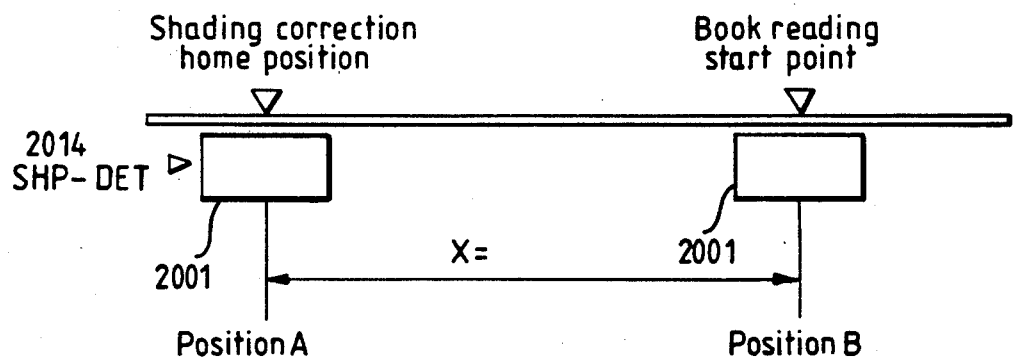
FIG. 19 illustrates further the scanning operation.
Figure 20:
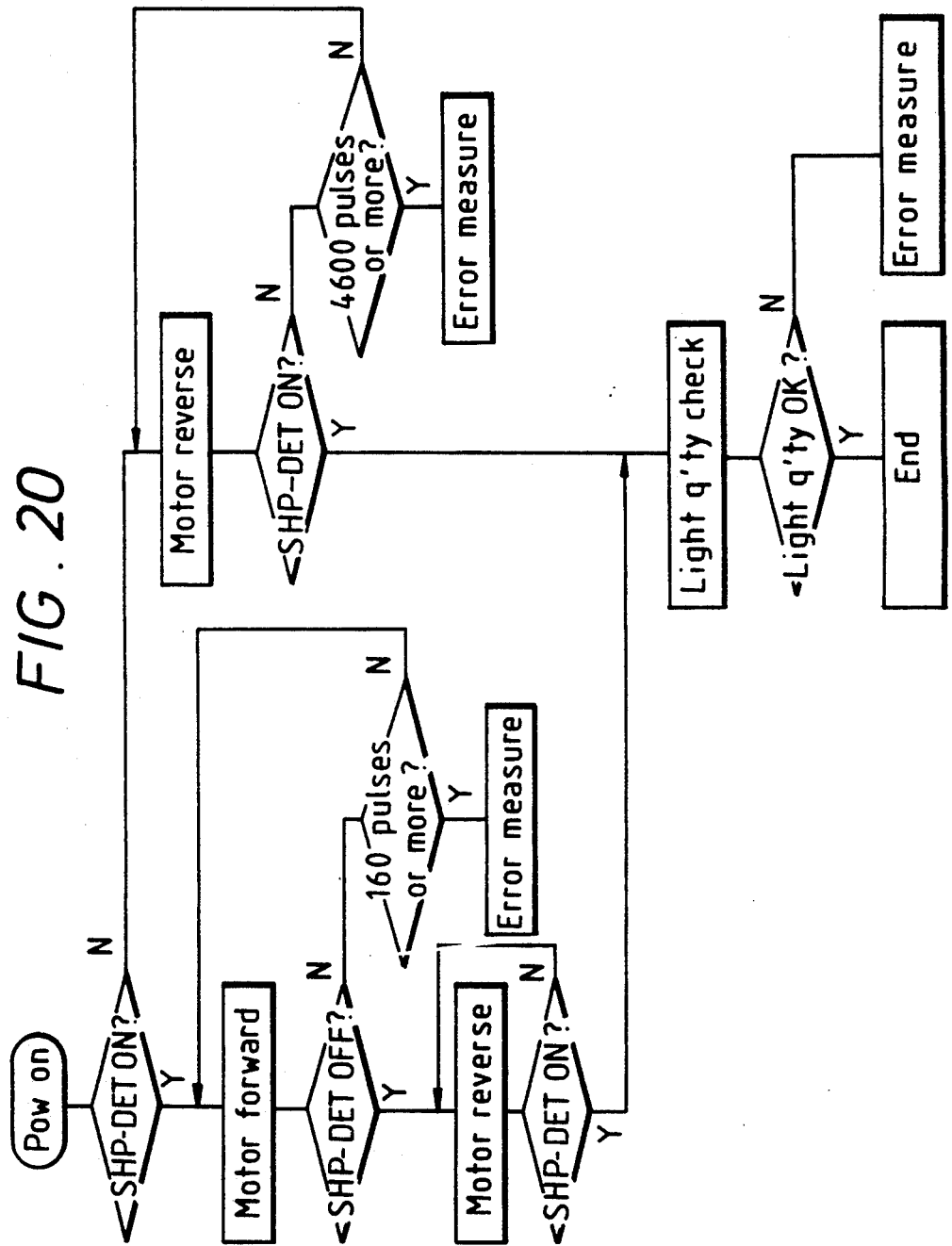
FIG. 20 is a flowchart of the scanning operation.

First, the initial setting will be described with reference to FIG. 19 illustrating an outline of the mechanical arrangement and FIG. 20 showing a flow chart for the process. When the power is on, a check is made as to whether the reading section 2001 is at a center home position SHP (position A). The book reading mode makes a shading compensation at the home position SHP (position A), while the sheet reading mode causes the reading section 2001 to be moved to adjacent the white reflecting plate 2013 provided near a sheet reading position, before reading starts.

If the reading section 2001 is at the home position SHP (position A), the pulse motor is driven until the reading section 2001 moves from the home position SHP (position A). If it does not move from the home position SHP (position A) even if more than a predetermined number of pulses have been supplied, for example, more than 160 pulses corresponding to 10 mm of an operationable range of a detection sensor 2014 for the home position SHP (position A), the system detects a fault and is stopped.

If the reading section 2001 moves from the home position SHP (position A) within the predetermined number of pulses, the pulse motor drives in the opposite sense to return the reading section 2001 to the home position SHP (position A), and the amount of light is checked. If the amount of light is sufficient, the initial setting is ended for the next instruction. If the quantity is too low, the operation is stopped and a fault indicated by, for example, indicating a faulty light source.

If the reading section 2001 is not at the home position SHP (position A), the pulse motor drives to return the reading section 2001 to the home position SHP (position A), and the amount of light is checked. However, if the reading section 2001 cannot be returned to the home position SHP (position A) even after a predetermined number of pulses are supplied, for example, more than 4600 pulses corresponding to the length of the document read, then the operation is stopped, indicating a fault.

The reading start control will now be described. Start conditions include (1) turn-on of a transmission or copy start switch, (2) depression of a memory transmission switch, and (3) depression of a recording switch on-hook. Condition (2) applies to a facsimile apparatus having an image recording memory in which the read image data is written in the memory before transmission. Condition (3) applies to a facsimile apparatus having a feature that a destination facsimile number written on the sheet is read before transmission.

Figure 21:
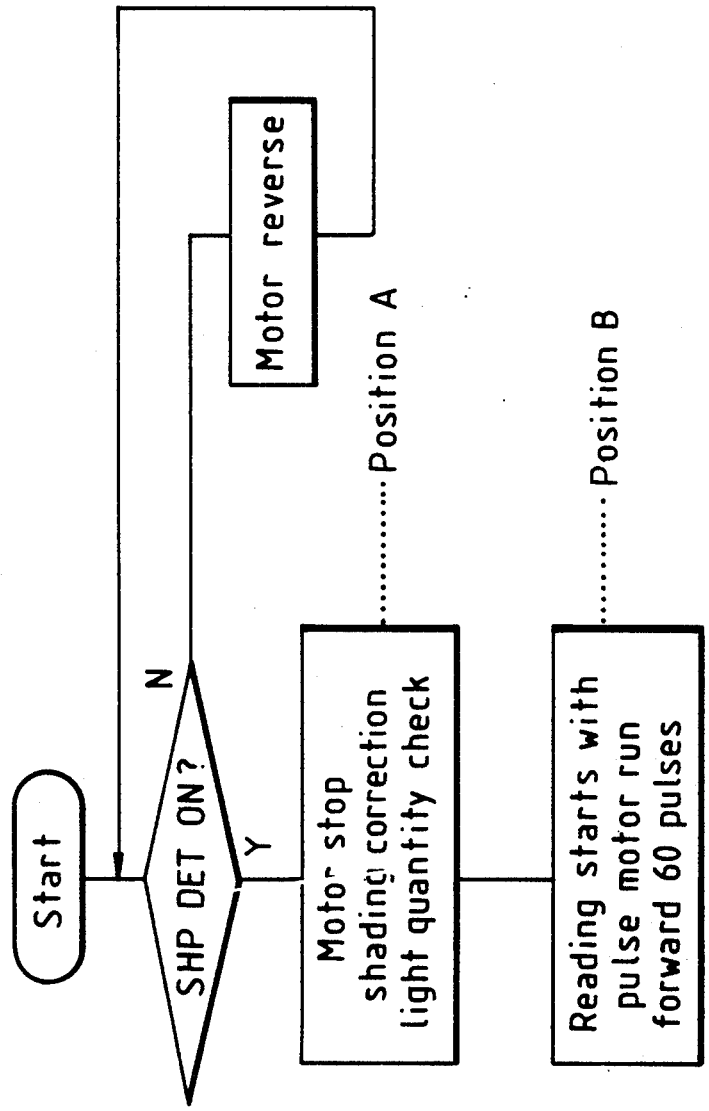
FIG. 21 is a further flowchart of the start of the scanning operation.

FIG. 21 is a flow chart for the reading start operation described above. The first step is to determine whether reading section 2001 is at the home position SHP (position A). If it is at that position, shading compensation and the amount of light are immediately checked. The pulse motor is driven before starting reading from a reading start position B.

Figure 22:
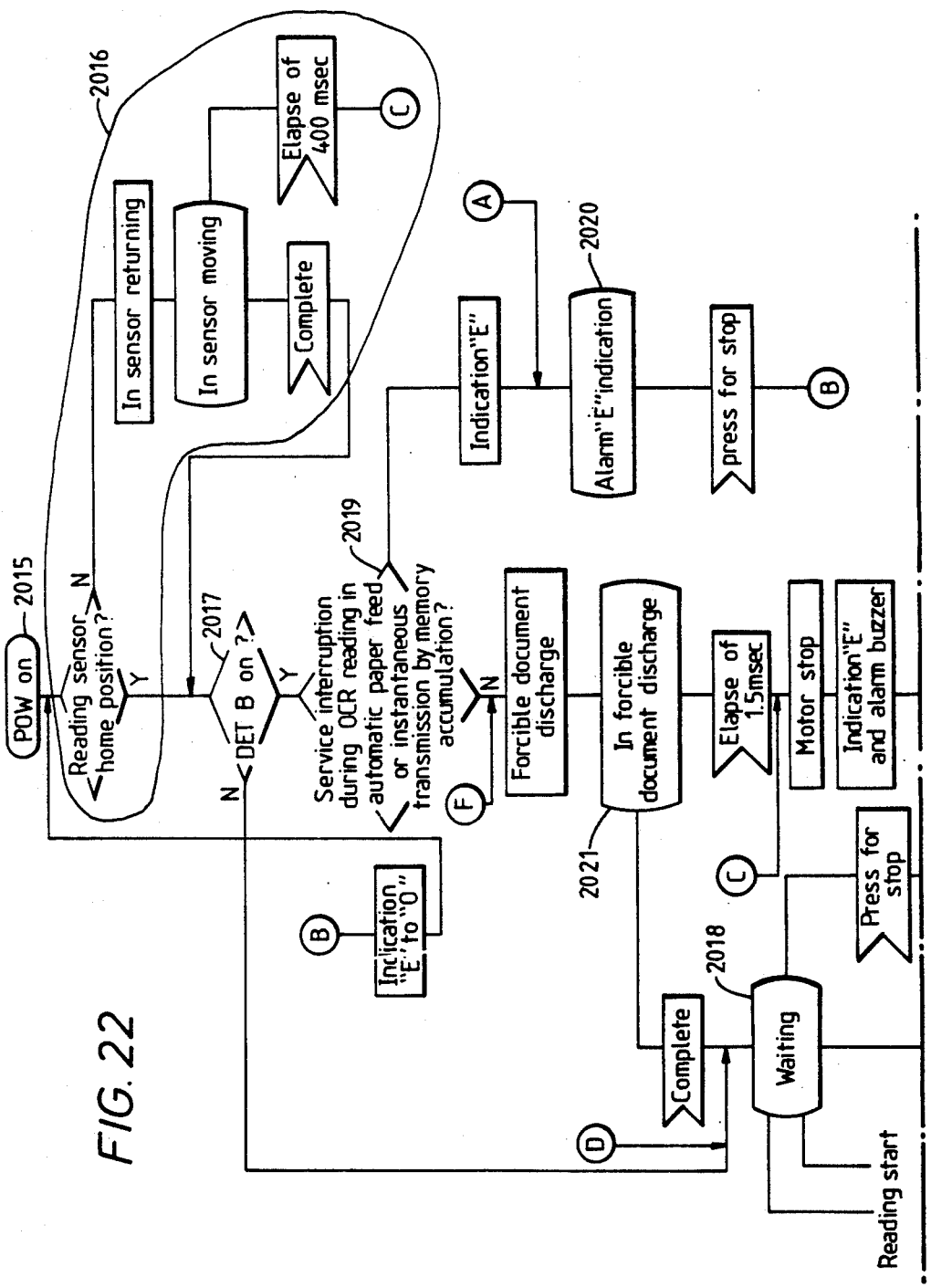
FIG. 22 is a flowchart showing the storage of information in a facsimile apparatus according to the present invention.
Figure 22:
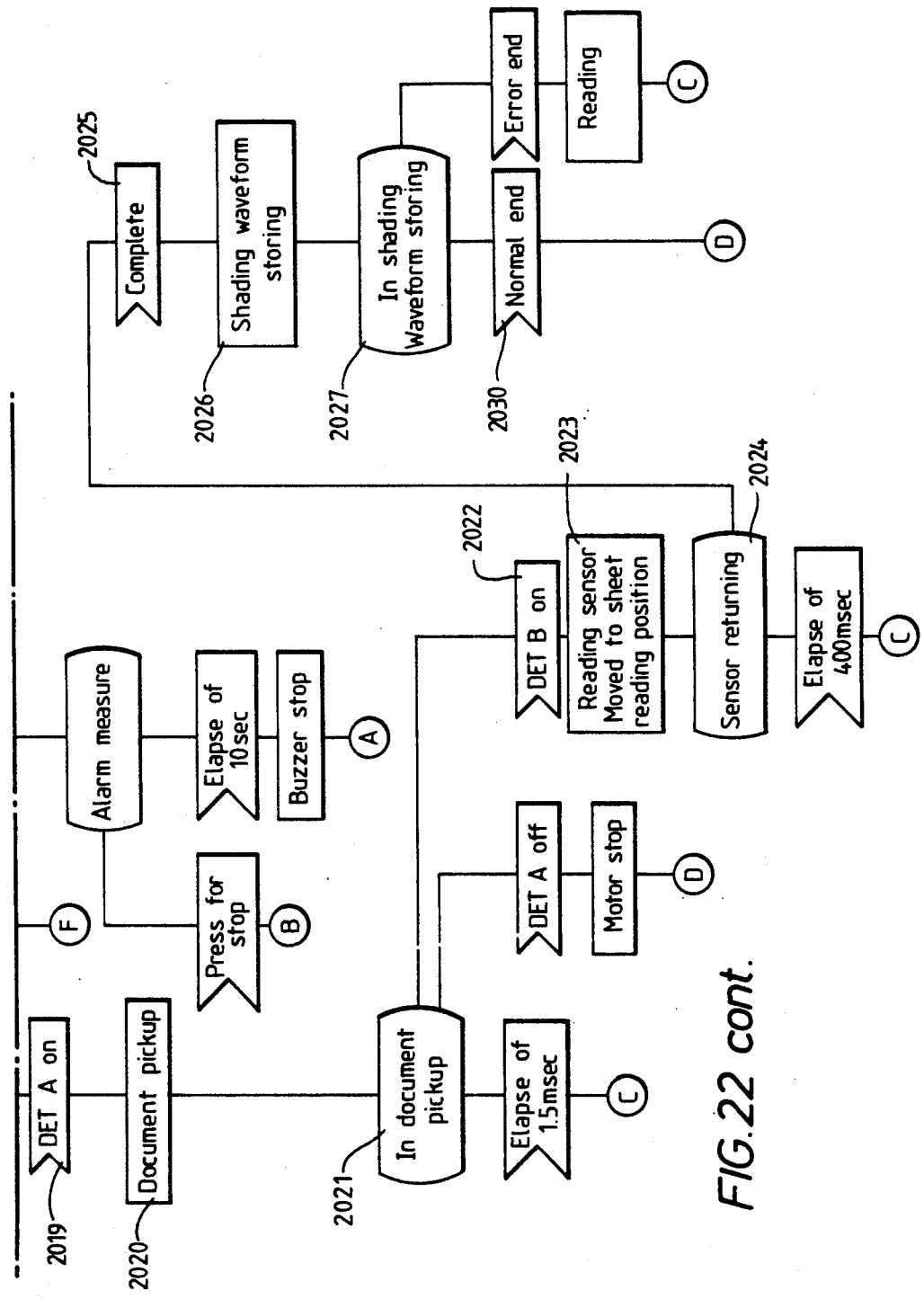

FIG. 22 is a flow chart showing the storing of the shading waveform. When the power is turned on (step 2015), a check routine 2016 of the reading section 2001 described in FIG. 20 is executed. The process is the same as in the book reading mode. In turn, a check is made as to whether there is a document at the document reading position (DET B) for sheet reading (step 2017). If not, the operation enters a waiting state (step 2018). If there is a document it determines whether the stop is due to turn-off of power (step 2019). If it is due to service interruption, an alarm is generated (step 2020). If this occurs, the document is ejected (step 2021), and the operation enters the waiting state (step 2018).

If the document to be sent arrives at a sheet reading position, a document detection sensor DET A is turned on (step 2019). The document is pulled in until it arrives at a document reading position DET B (steps 2020 to 2022).

In turn, the reading section 2001 moves to a shading waveform reading position (steps 2023 to 2027) at which the shading waveform is stored (step 2030).

Figure 23:
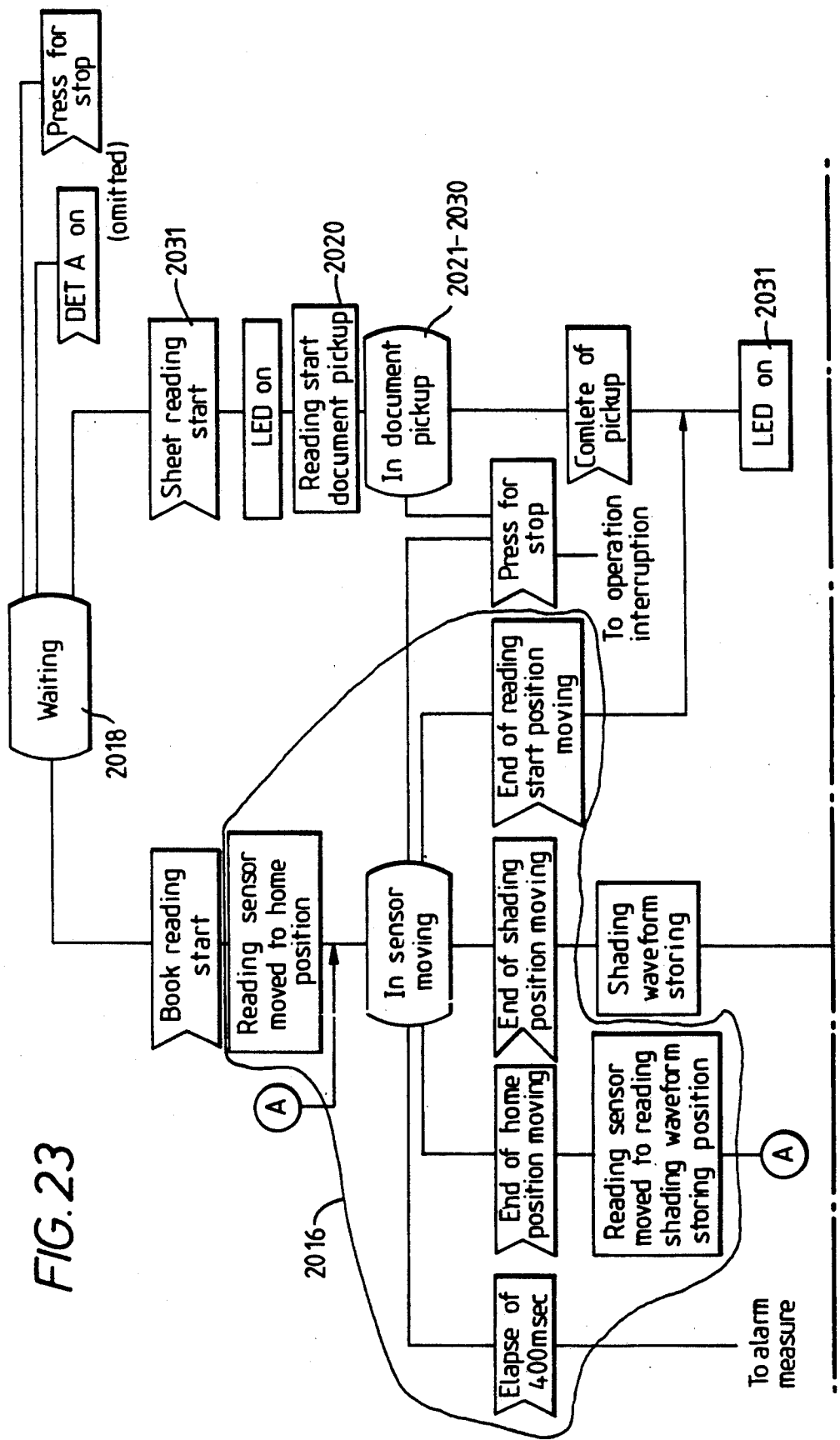
FIG. 23 is a further flowchart showing the operation of a facsimile apparatus according to the present invention.
Figure 23:
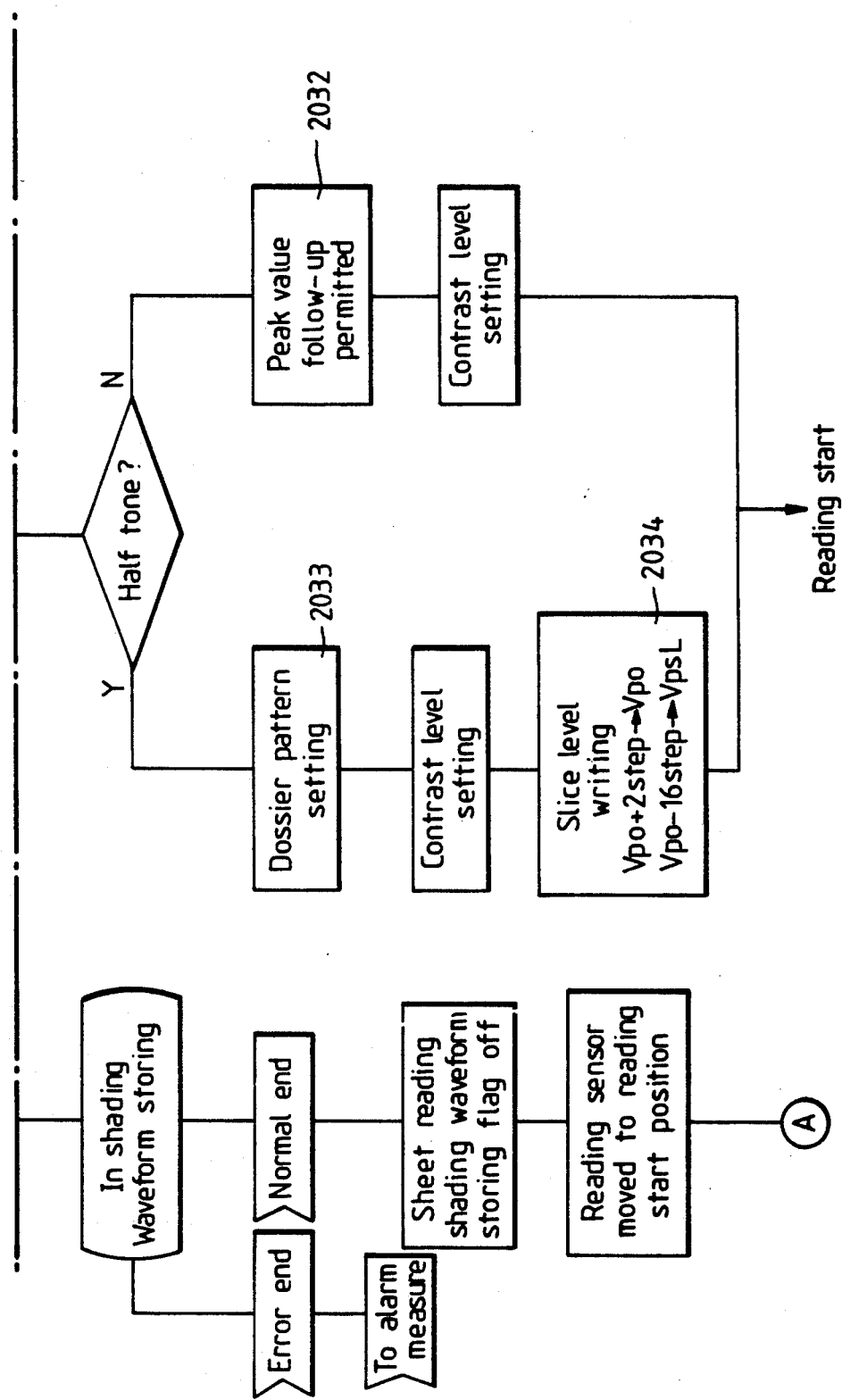

FIG. 23 is a flow chart for both book and sheet reading modes. When the sheet reading document detection sensor DET A is turned on in the waiting state (step 2018), as described in FIG. 22, the document is drawn in, and the shading waveform is stored (steps 2020 through 2030). The LED light source 2008 then is lit (step 2031). For the two-value, a peak value of the image signal is generated (step 2030) to make an optimum image determination reference to read. For a half tone, a dither pattern is set as a pseudo tone pattern corresponding to the tone (step 2033), the slice level for the image signal is written (step 2034), and reading starts.

When reading a document, there may be e.g. three reading pitches in a sub-scanning direction, including 3.85 line/mm, 7.7 line/mm, and 15.4 line/mm. The standard mode is 3.85 line/mm. The drive motor usually used is a pulse motor. If the step number is 4 pulse/line for the 3.85 line/mm reading pitch, for example, it is 2 pulse/line and 1 pulse/line for the 7.7 and 15.4 line/mm pitches, respectively. To keep the reading time per line constant, the speed of the pulse motor for the 3.85 line/mm reading pitch is made 400 pps (pulses per second).

On the other hand, since the quantity of light must be constant, the speeds for the 7.7 and 15.4 line/mm are 200 and 100 pps, respectively. At 3.85 line/mm, the pulse motor needs the highest drive torque. If the drive torque is sufficient, constant movement is possible from the outset, but such a motor costs too such to be economic. For this reason, smoothing occurs so that the motor speed is gradually accelerated to 200, 300, or 400 pps.

The operation described above applies to both book and sheet reading modes as the relative distance between the document and the reading sensor is the same.

Figure 24:
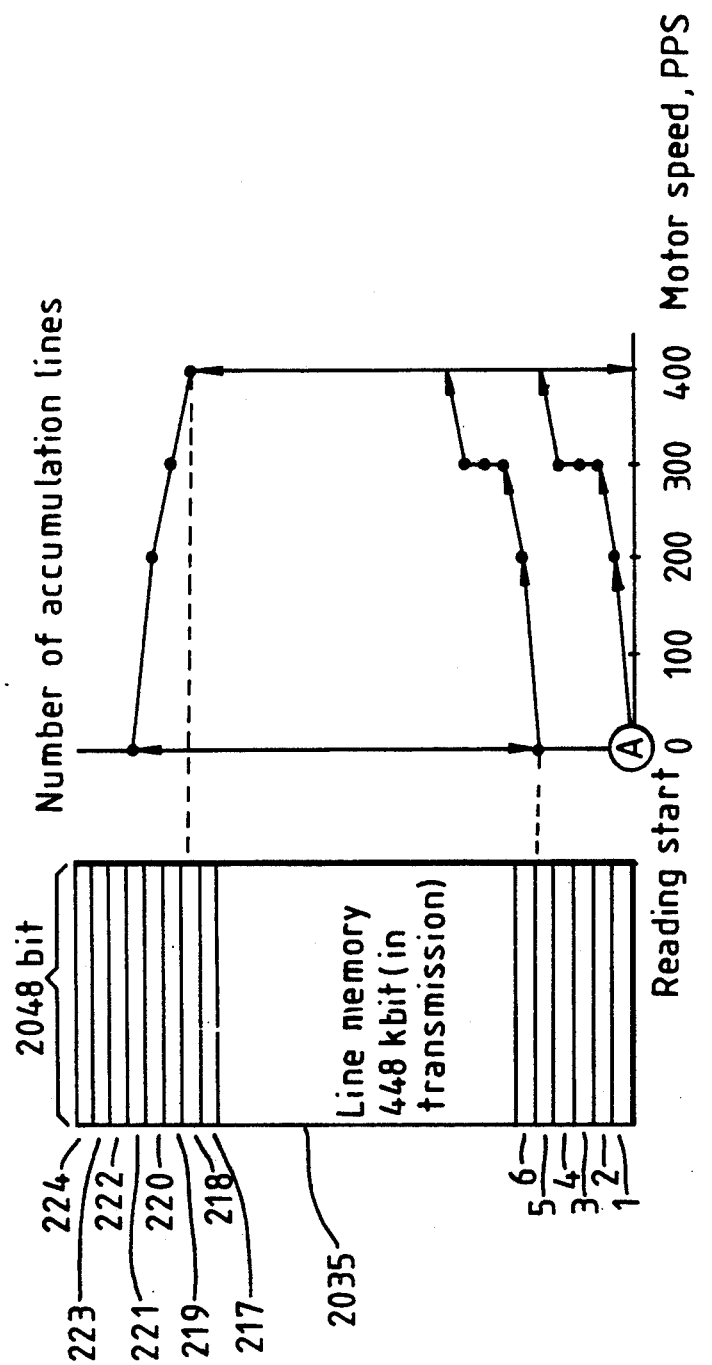
FIG. 24 illustrates the relationship between motor speed and data collection at one reading pitch.

FIG. 24 shows the relationship between the motor speed and data storage in an image storage line memory 2035 for the 3.85 line/mm reading pitch. Reading starts from point A and is accelerated. The motor speed of 300 pps is an example for which feeding of three lines is made because of low reading timing drive torque, which will be described later, and then enters the reading operation 400 pps drive.

When the encoding speed is slow as compared with the reading speed or when the line communication speed is slower than the encoding speed, data storage in the image storage line memory 2035 is increased. As the image storage line memory 2035 has a limited capacity however, reading must halt when a certain amount of data has been stored, In FIG. 24, read halts with the motor speed slowed down to 300 and 200 pps when the data representing 218 lines have been stored. When the data in the image storage line memory 2035 data in the image storage line memory 2035 decreases as the data transference continues, the reading starts again by accelerating the motor.

Figure 25:
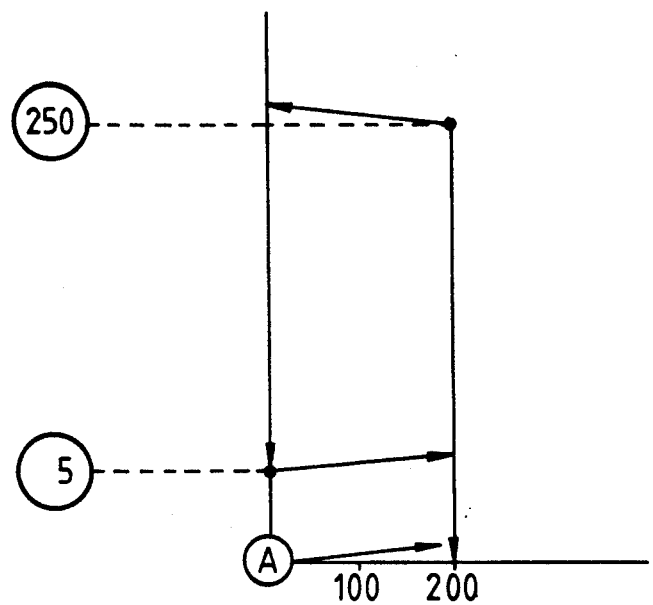
FIG. 25 shows the relationship between motor speed and data collection at a second reading pitch.
Figure 26:
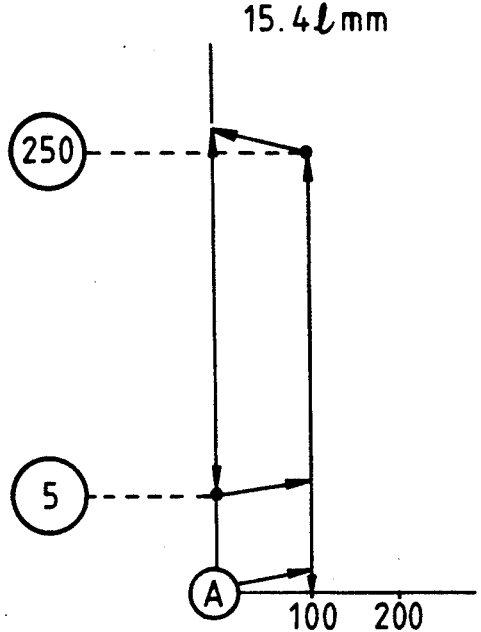
FIG. 26 shows the relationship between the motor speed and data collection at a third reading pitch.

The relationship between data storage in the image storage line memory 2035 and reading is identical for the 7.7 and 15.4 line/mm reading pitches except that, if no motor acceleration is necessary, the smoothing which allows immediate start at a predetermined speed is not needed. For example, FIGS. 25 and 26 show the relationships between the motor speed and data storage in the image storage line memory 2035 for 7.7 and 15.4 line/mm reading pitches, respectively.

Figure 27A:
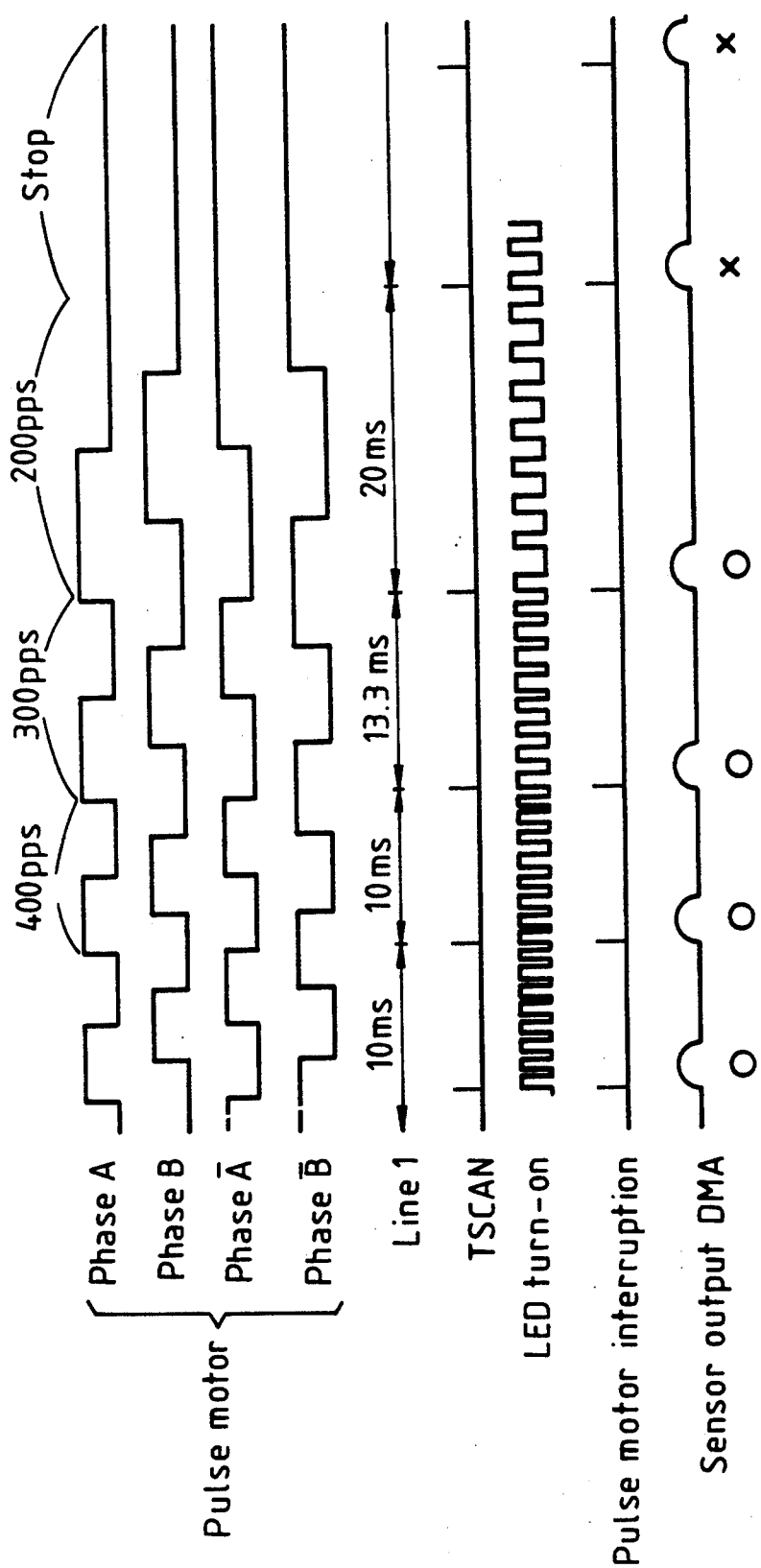
FIG. 27 illustrates the relationship between motor pulses and reading control.
Figure 27B:
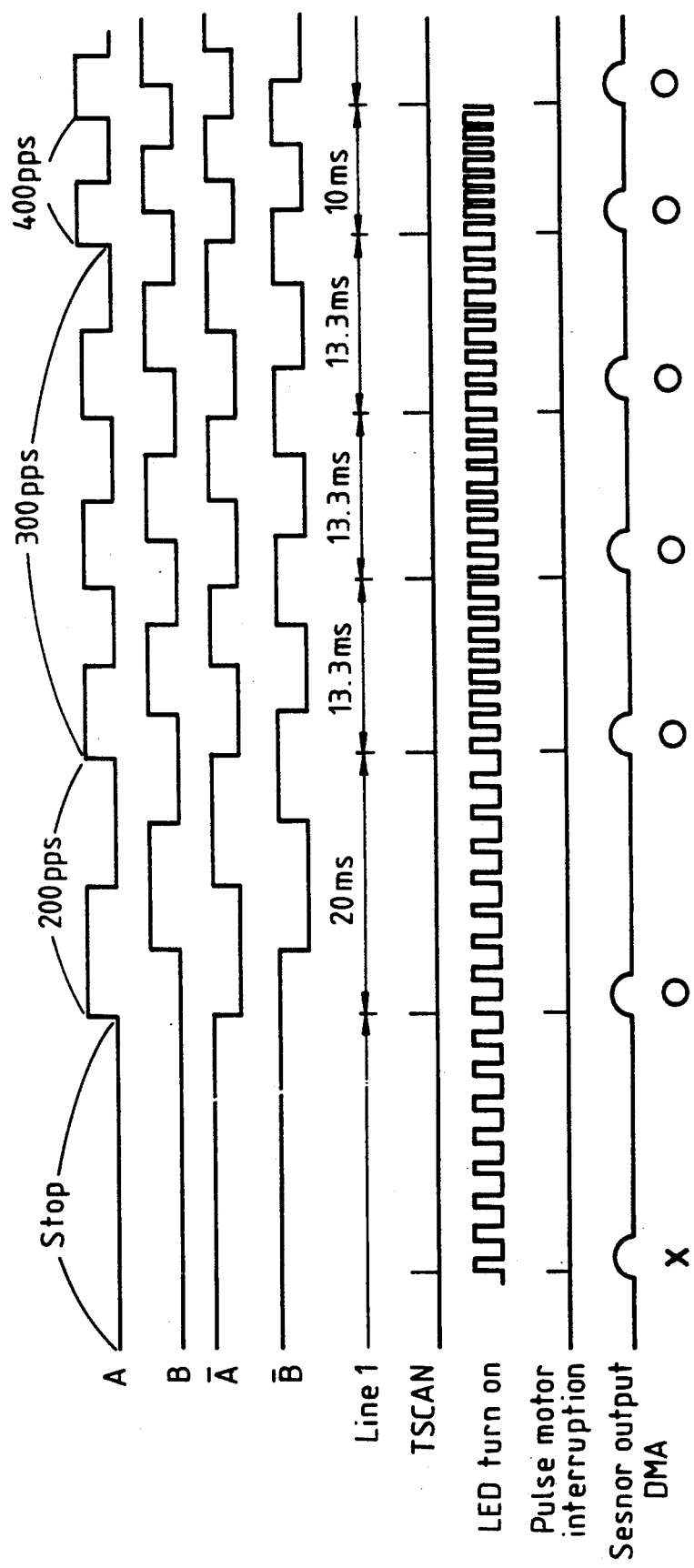

FIG. 27 shows the relationship between the pulse motor and reading control during the smoothing process. FIG. 27(a) shows the sequence of change from a constant reading speed to stopping of the pulse motor, and FIG. 27(b) shows the sequence when reading starts or is re-started after a short stoppage. FIGS. 27(a) and 27(b) indicate storage times per line, 10 msec for 400 pps, 13.3 msec for 300 pps, and 20 msec for 200 pps.

As the storage time per line is changed, as mentioned above, the amount of light at a 200 pps pitch is twice that at a 400 pps pitch if it is not changed. To avoid this, the LED light source 2008 is made to blink (pulse) so that the amount of light can be equal at any speed of the pulse motor. The sensor output signal obtained as described above is transferred from the DIPP 2002 by DMA (direct memory access). Reading can be made stable, by synchronization with the interruption of the pulse motor from the system control unit SCA 2011.

The DMA transference does not occur when the pulse motor is halted, as shown in FIG. 27(a), but is synchronized with the start of the driving of the pulse motor, as shown in FIG. 27(b).

It is possible to use a reading method that the storage time per line is constant, and have not related to the motor speed. This method, however, is not desirable as the un-synchronization causes differences between the document movement and read range, resulting in an adverse affect on the image quality.

Figure 28:
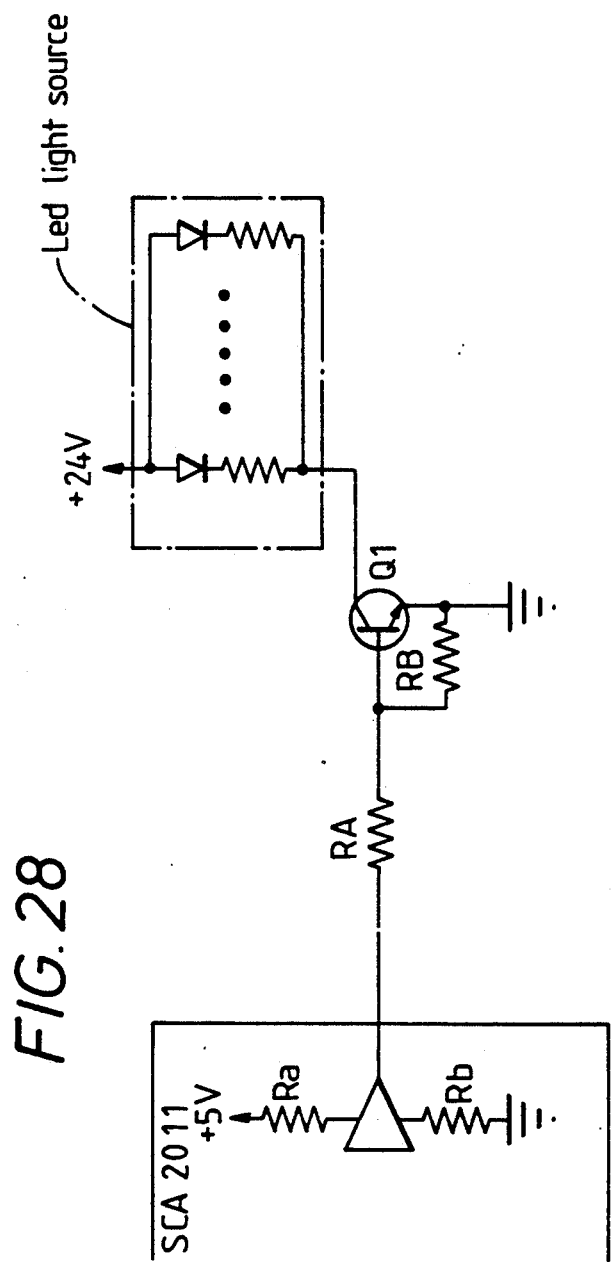
FIG. 28 illustrates a part of the control means for the solid state light source of an embodiment of the present invention.

To cause the LED light source 2008 to pulse, a turn-on control signal may be fed from the system control unit SCA 2011 to a switching transistor Q1 as shown in FIG. 28. FIG. 28 also shows limit resistors RA and RB.

With the arrangements described above, the amount of light can be controlled so as to be constant even if the storage time is changed in dependence on the pulse motor speed.

It is also possible to use pulsing to reduce the reading size. In the following example, a B4 image is reduced to A4. For this, the line density has to be reduced to 5/6, or the image of six lines has to be reduced to that of five lines.

Figure 29:
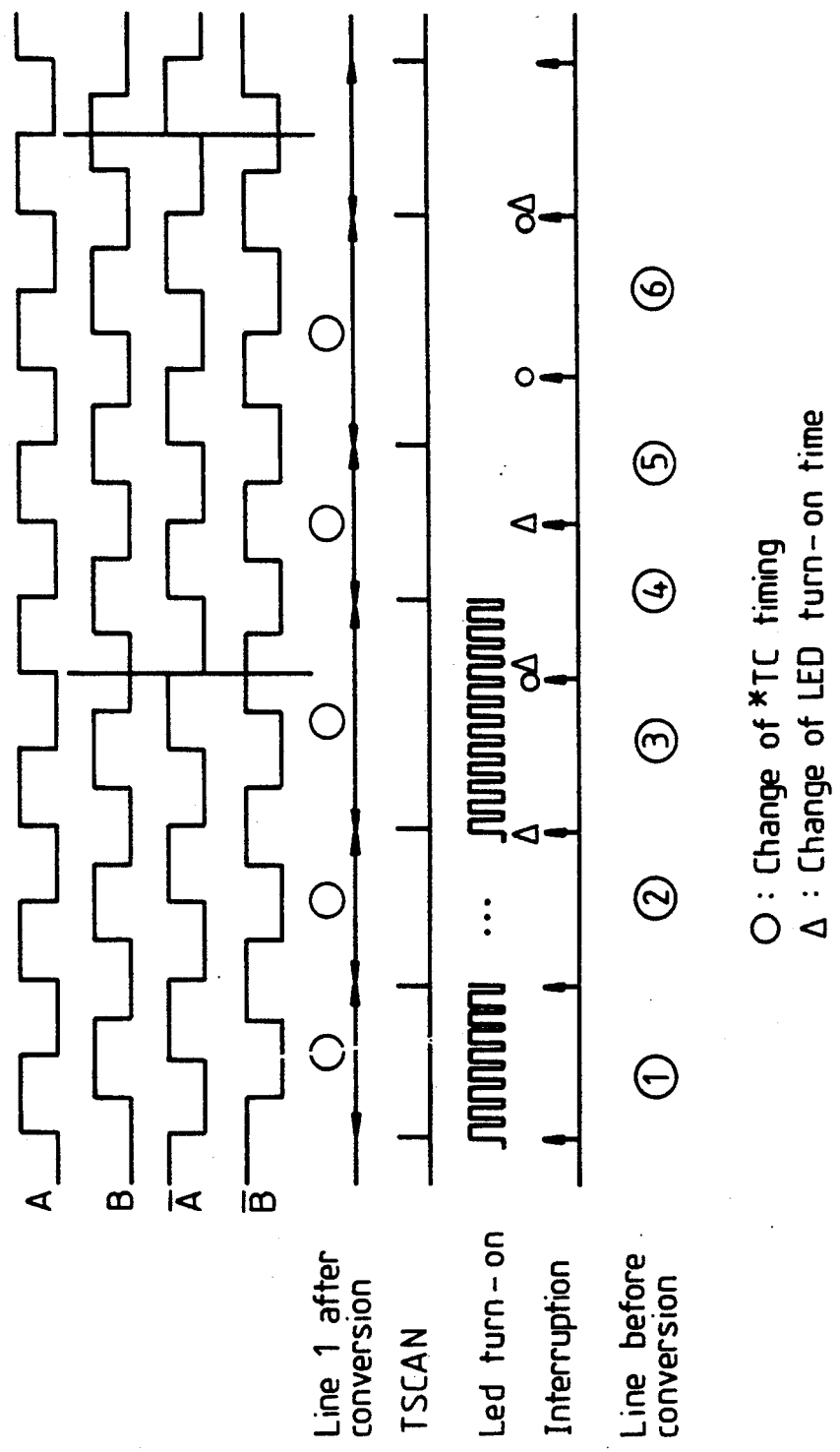
FIG. 29 illustrates motor speed pulses at one reading pitch.

FIG. 29 is the sequence diagram of the motor speed at reading timing and LED control for a 3.85 line/mm reading pitch. Lines 3 and 5, after conversion, have an original image of 1.5 lines each as shown, thereby preventing the image quality from deteriorating. For this purpose, the read timing pulse TSCAN is extended to 1.5 times at line 2 after reading, at the same time, the turn-on time of the LED light source is reduced to 1/1.5, and lines 3 and 4 are read. The next read timing pulse TSCAN is returned to the original pulse duration, and the line 5 is read. Such operations are cyclically repeated so that size conversion can be accomplished.

Figure 30:
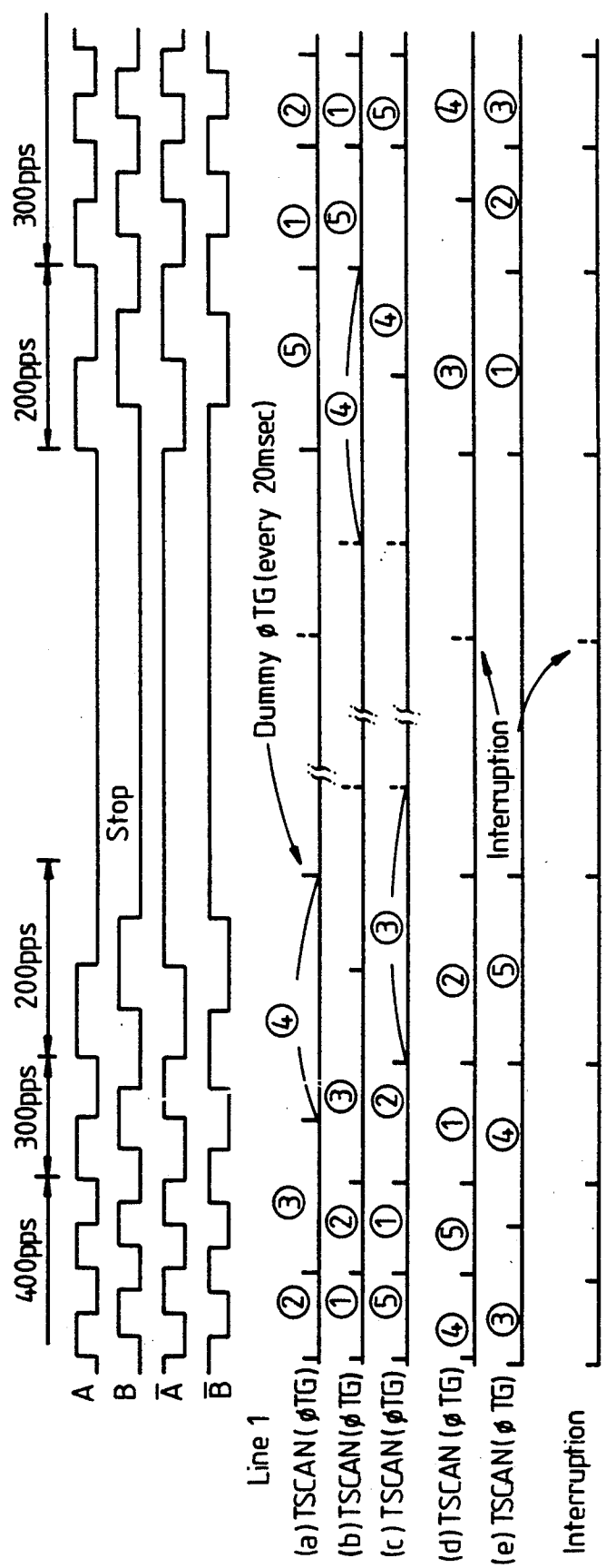
FIG. 30 shows motor speed pulses at a second reading pitch.

FIG. 30 is the sequence diagram for a smoothing process for a 3.85 line/mm reading pitch. Phases (a) to (e) in FIG. 30 show that control is changed at lines 3 and 5. The interruption signal can be generated even at a stoppage by generating a dummy interruption signal. Phase (a) shows that line 3 overlaps the 300 and 400 pps pulse motor speeds where the amount of light at each of the pulse motor speeds is reduced to 1/1.5 from the last period of 400 pps to stop. Phases (d) and (e) show that the amount of light is reduced after stoppage of the motor.

Phases (b) and (c) show that control has to be made to avoid image deterioration due to a stoppage during operation. For this purpose, as the time of stoppage of the pulse motor can be predicted in advance by checking the image accumulation line memory 2035, phase (b) may have the amount of light reduced to 1/1.5 at the same timing as phase (a). That is, lines 2 and 3 are controlled. Similarly, phase (c) is made to have the same timing as phase (d). In this way, optimization can be made.

Figure 31:
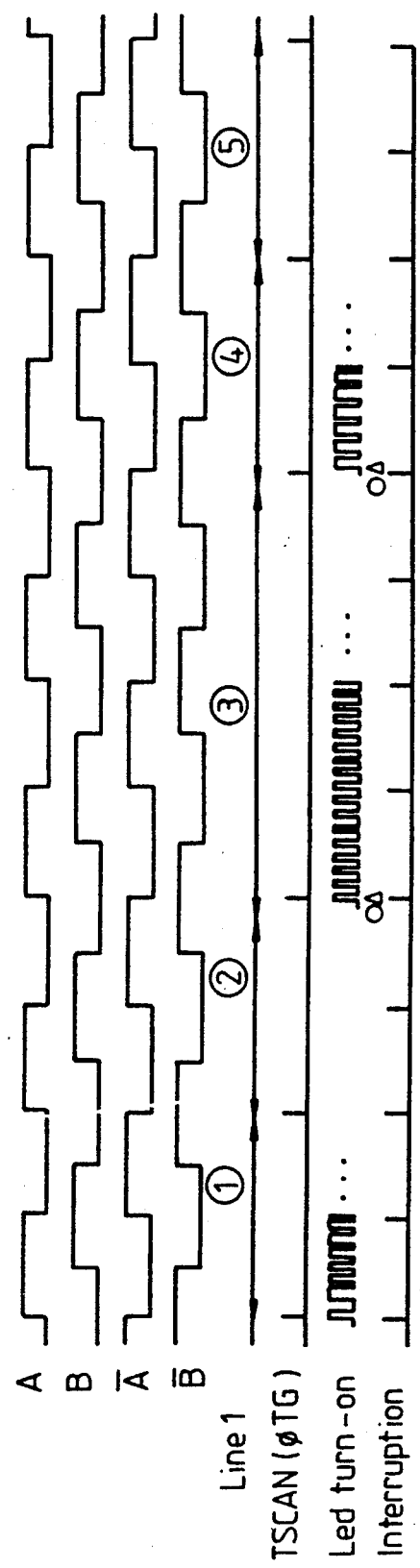
FIG. 31 also illustrates motor speed pulses.

FIG. 31 is another embodiment which can solve the complication of the control arrangement described above. Line 3 is an average of the preceding lines 3 and 4. The reading time on line 3 is extended twice, while the LED turn-on time is halved. Line 4 onward again has a normal reading time. This needs only a change in the TSCAN and the LED turn-on time at the same time so that the control can be simplified significantly.

Also, the smoothing process has no problem as only the storage time and the LED turn-on time are to be by two lines even if the pulse motor speed changes during operation. However, the situation of line 3 at a 200 pps switch which causes stoppage, resulting in image deterioration. This has to be avoided. Its control can be easily made as the image storage line memory 2035 is being monitored.

As described above, the present invention can vary the reading time as the pulse motor is controlled and at the same time, can change the amount of light so that a predetermined amount of light can arrive at the reading sensor at all times, thereby ensuring a good quality image.

Figure 32:
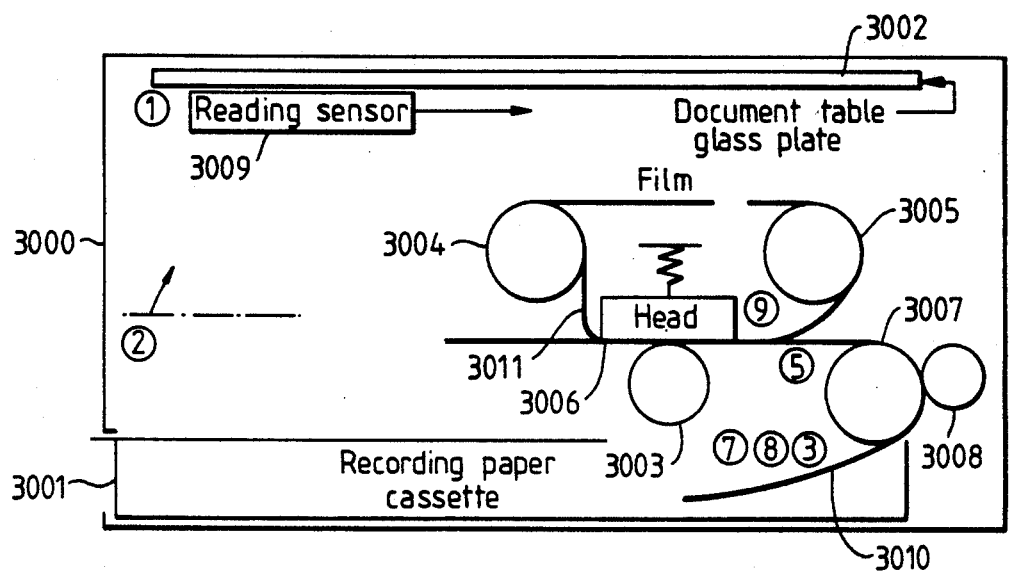
FIG. 32 is a schematic diagram for explaining scanning in an embodiment of the present invention.

The recording section of an embodiment according to the present invention will now be described in detail. FIG. 32 shows the mechanical arrangement of the recording section. Recording paper 3010 is picked up of a recording paper cassette 3001 (corresponding to store 22 in FIG. 16) contained in a main body 3000 (corresponding to body 10) by a pickup roller 3007. It then has ink from a film 3011 transferred thereto as it is moved via a roller 3008 by a recording roller 3003. The film 3011 is fed from a film shaft 3005 and wound on a further shaft, 3004 moving at the same speed as the paper.

The recording section is positioned below a reading sensor 3009 and a document table glass plate 3002 (corresponding to transparent plate 19) and above the recording paper cassette 3001.

Figure 33:
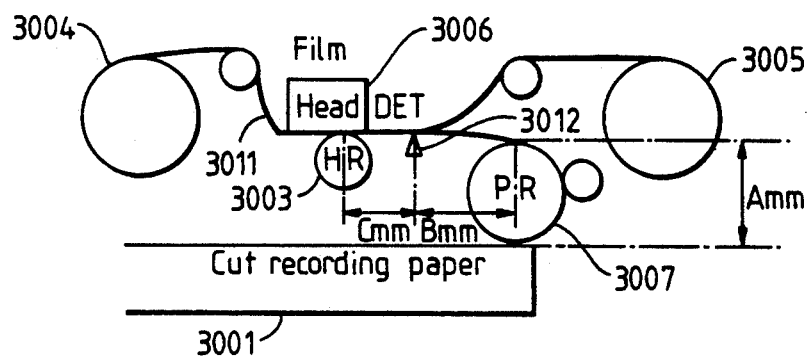
FIG. 33 shows in more detail the structure of the scanning parts.

FIG. 33 shows the mechanical arrangement of the recording section including a detection system for description of the paper feed mechanism. Thus, the arrangement will now be described, referring to flow charts of the operation thereof.

Figure 34:
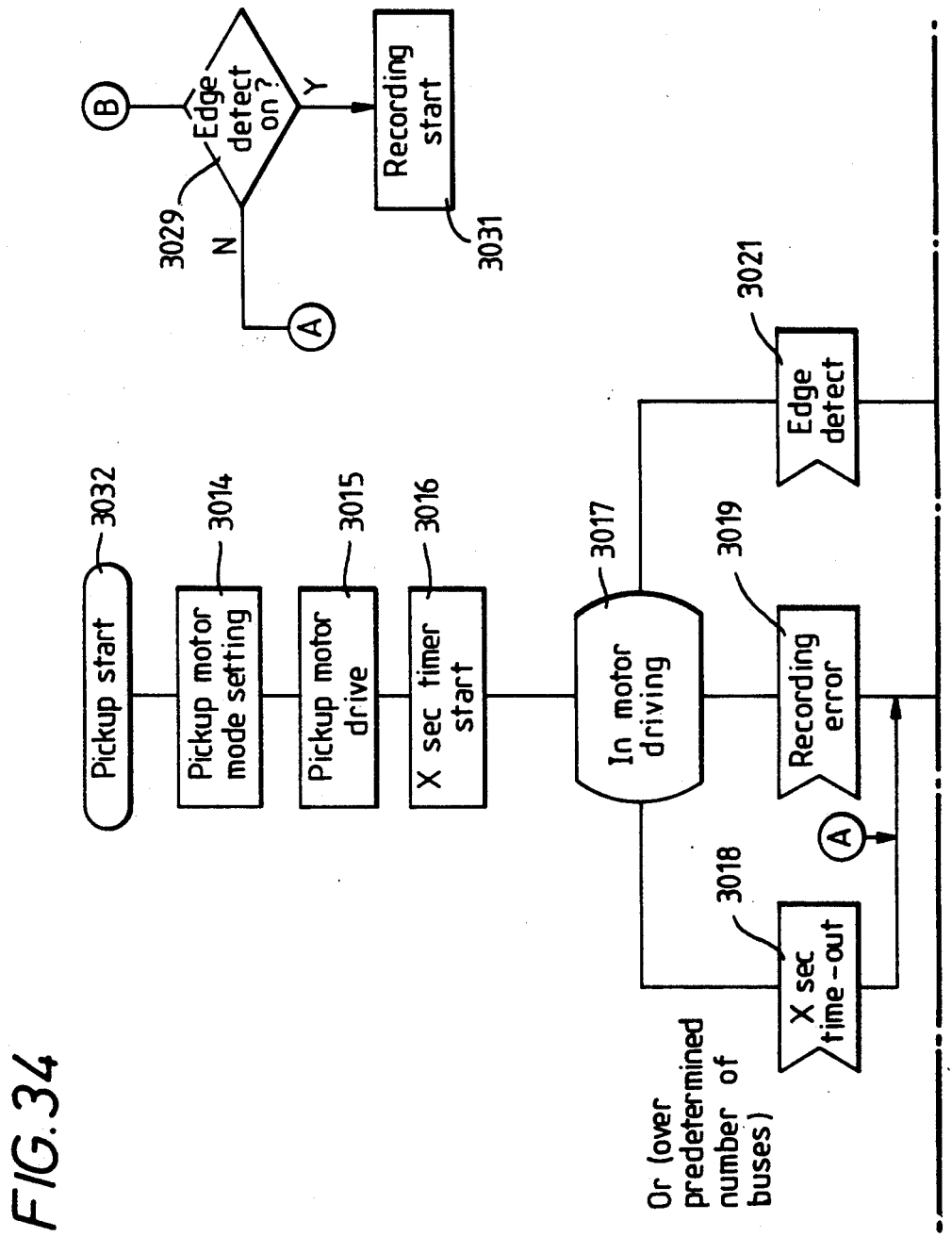
FIG. 34 is a flowchart illustrating paper pick-up in an embodiment of the present invention.
Figure 34:
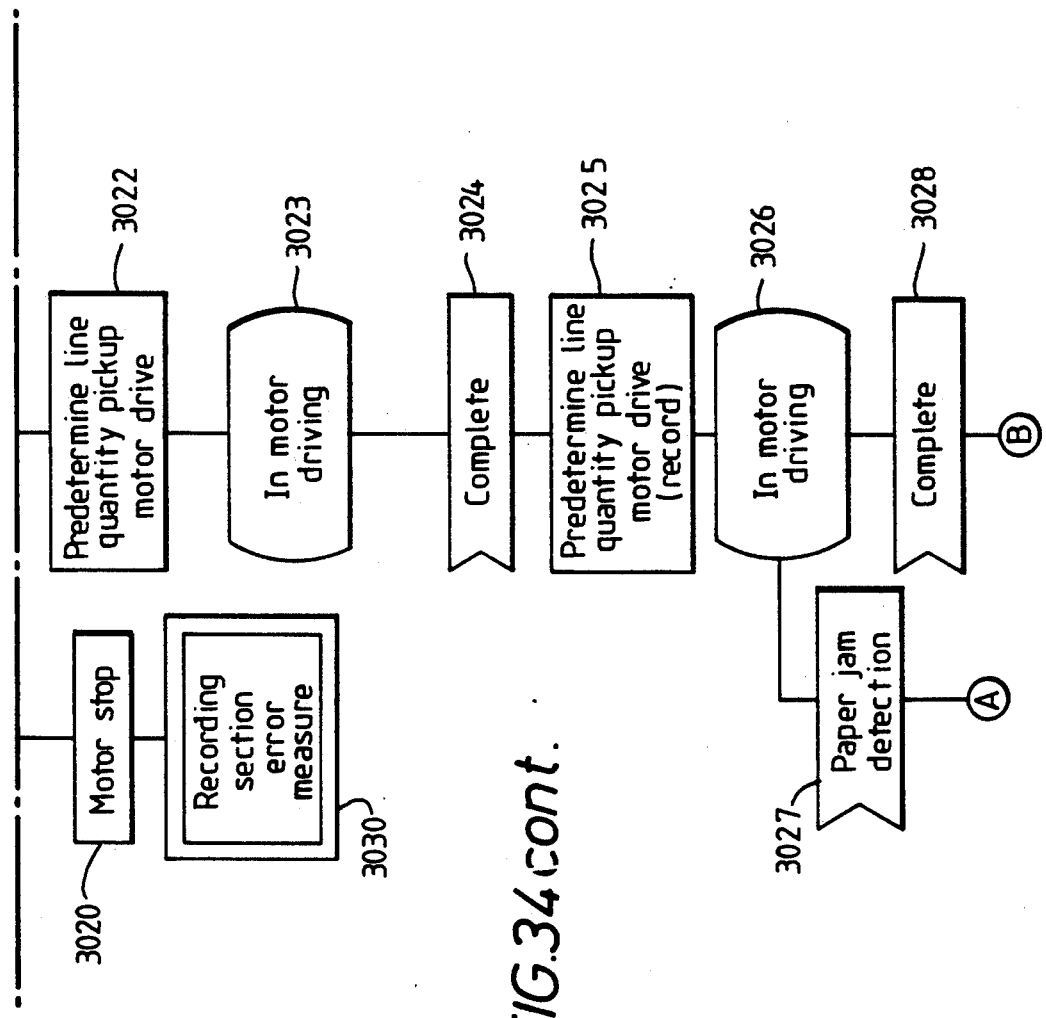

FIG. 34 is a flow chart for the pickup sequence. When a pickup starting control routine 3032 is executed, the mode of operation of a pickup motor (not shown) for driving the pickup roller 3007 is set (step 3014), and the pickup motor is driven. At this time, a timer is started for detection of a jam. Unless the process ends within a predetermined time, the operation is considered to be in the jammed state.

After this, the control routine enters a motor driving state (step 3023) and waits for one of three commands, being a time-out command (step 3018), a recording section error command (step 3019), and a paper detection error command caused when the paper is not picked up, generated by a detector 3012. An interruption routine (not shown) is provided to move the motor for consecutive lines and monitor the detection. The routine shown in FIG. 34 then waits for a command from the interruption routine or a higher routine. If the time-out command (step 3018) or the recording section error command (step 3019) reaches the routine, this prompts the motor to stop (step 3020) and the operation jumps to a recording section error measuring routine 3030 which executes a procedure for a recording section error.

If the routine receives a paper detection error command (step 3021), then an initial process is made to drive the pickup motor for predetermined number of lines, enters the motor driving state (step 3023), and waits for an end command. If the end command is issued in the interruption routine, then another initial process is made to drive a recording motor, which is a motor (not shown) for driving a recording roller 3003 shown in FIG. 33, and the pickup motor by a predetermined number of lines, enters the motor driving state, and waits for another end command. If the paper end detection signal does not occur at the end of motor drive, this means that the paper is jammed. A jam detection command (step 3027) is issued by the interruption routine. When it is received, the motor is stopped (step 3020), and the recording section error measuring routine 3030 executes an appropriate procedure in consequence of the error.

Figure 35:
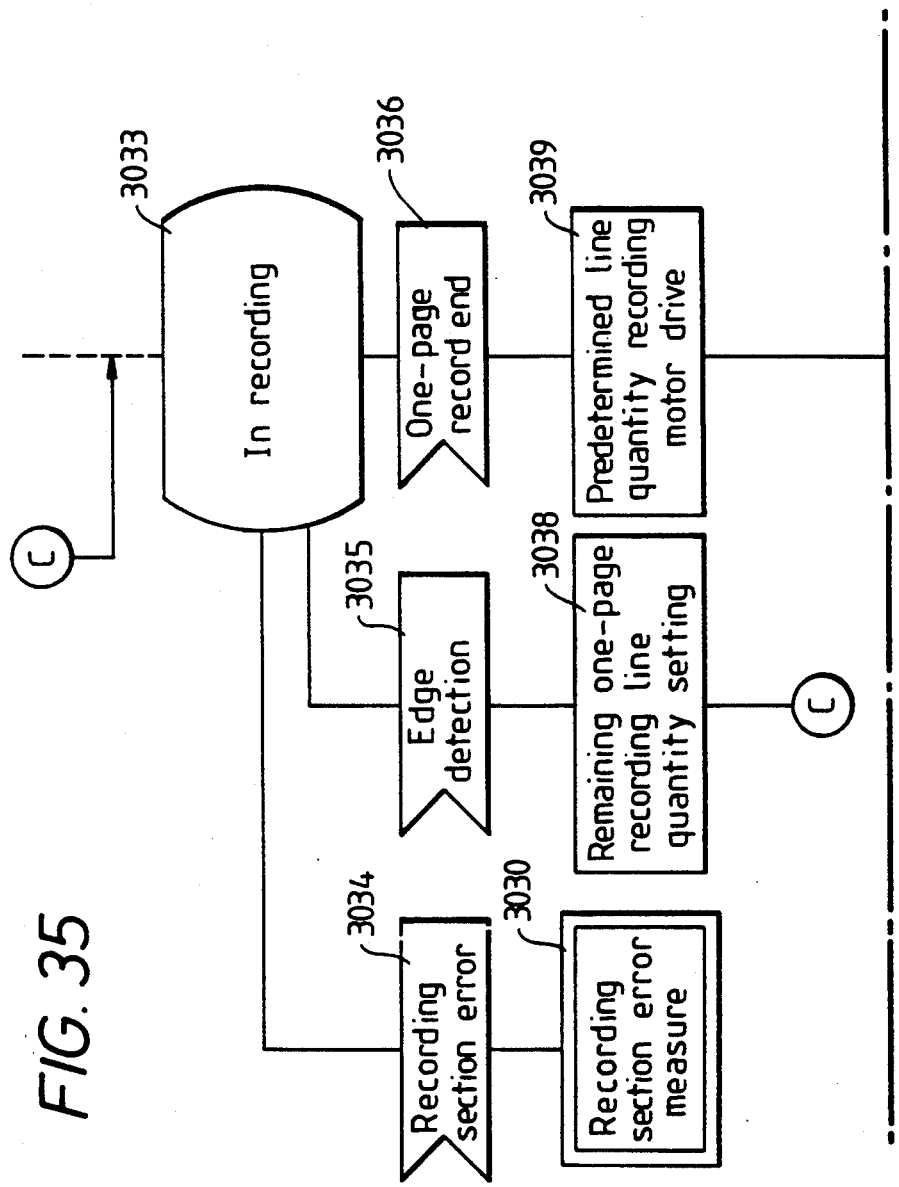
FIG. 35 is a flowchart of control steps during printing.
Figure 35:
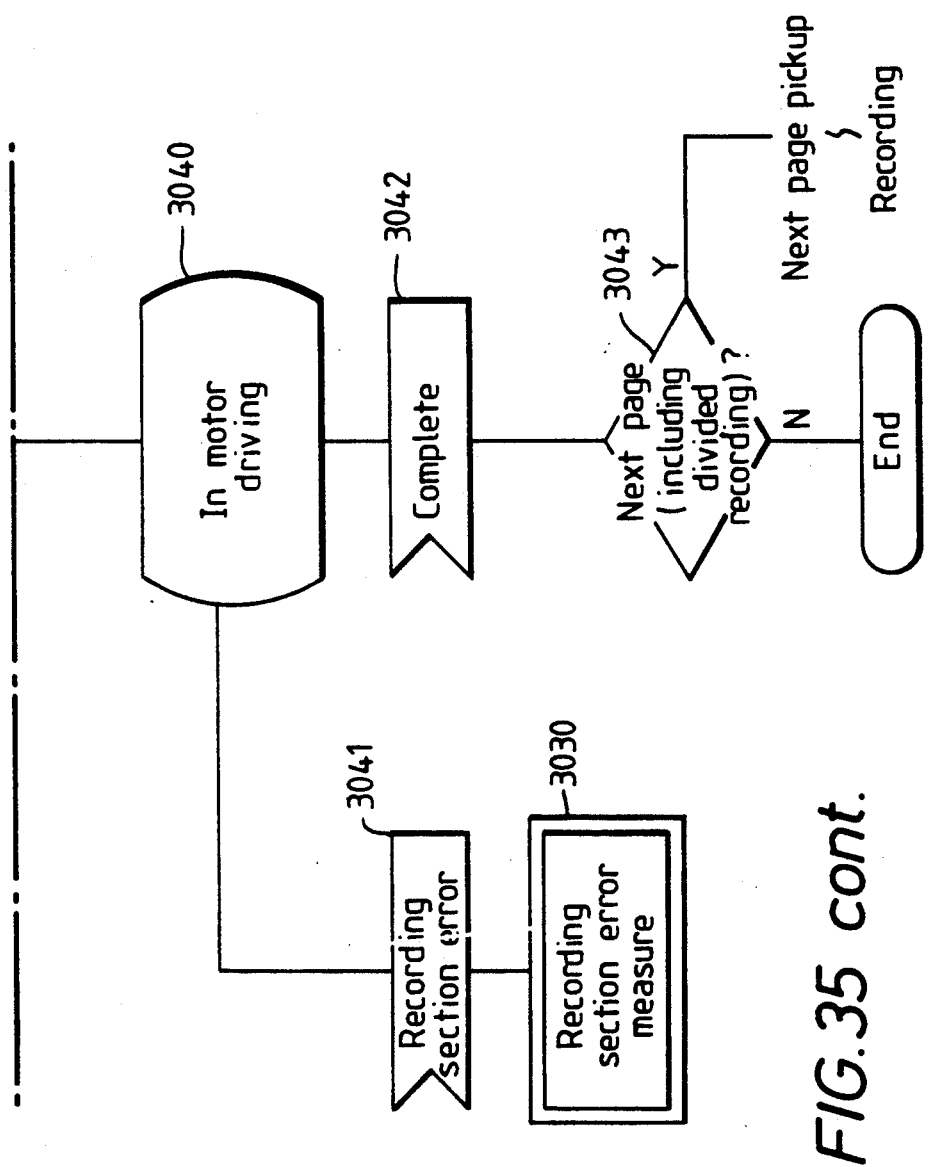

FIG. 35 is a flow chart of the control routine during printing. If the control routine is in a recording state (step 3033), a pulse motor interruption routine drives the motor, print data is transferred by a DMA end interruption routine, and the printing head is by a recording end interruption routine. The control routine waits for any of the commands issued by the respective interruption routines.

If temperature of the printing head becomes too high, a door of the recording section, or the paper is jammed, then the recording section error command (step 3034) is issued so that the recording section error measuring routine 3030 turns off voltages applied to an exciter of the motor and the printing head to end the DMA transference.

If the detector 3012 indicated in FIG. 33 turns from on to off during recording, then the control procedure sets the remaining recording lines as a single page (step 3038), starts the paper discharge process, returns to the recording state (step 3033), and waits for the end of paper feed-out by the motor.

If recording of one page ends (step 3033), the recording motor of predetermined number of lines is initialized t discharge the paper, and the control procedure enters the motor driving state (step 3040). If a recording section error occurs during when the motor is being driven (step 3041), then the recording section error measuring routine 3030 carries out an appropriate procedure for a recording section error.

Figure 36:
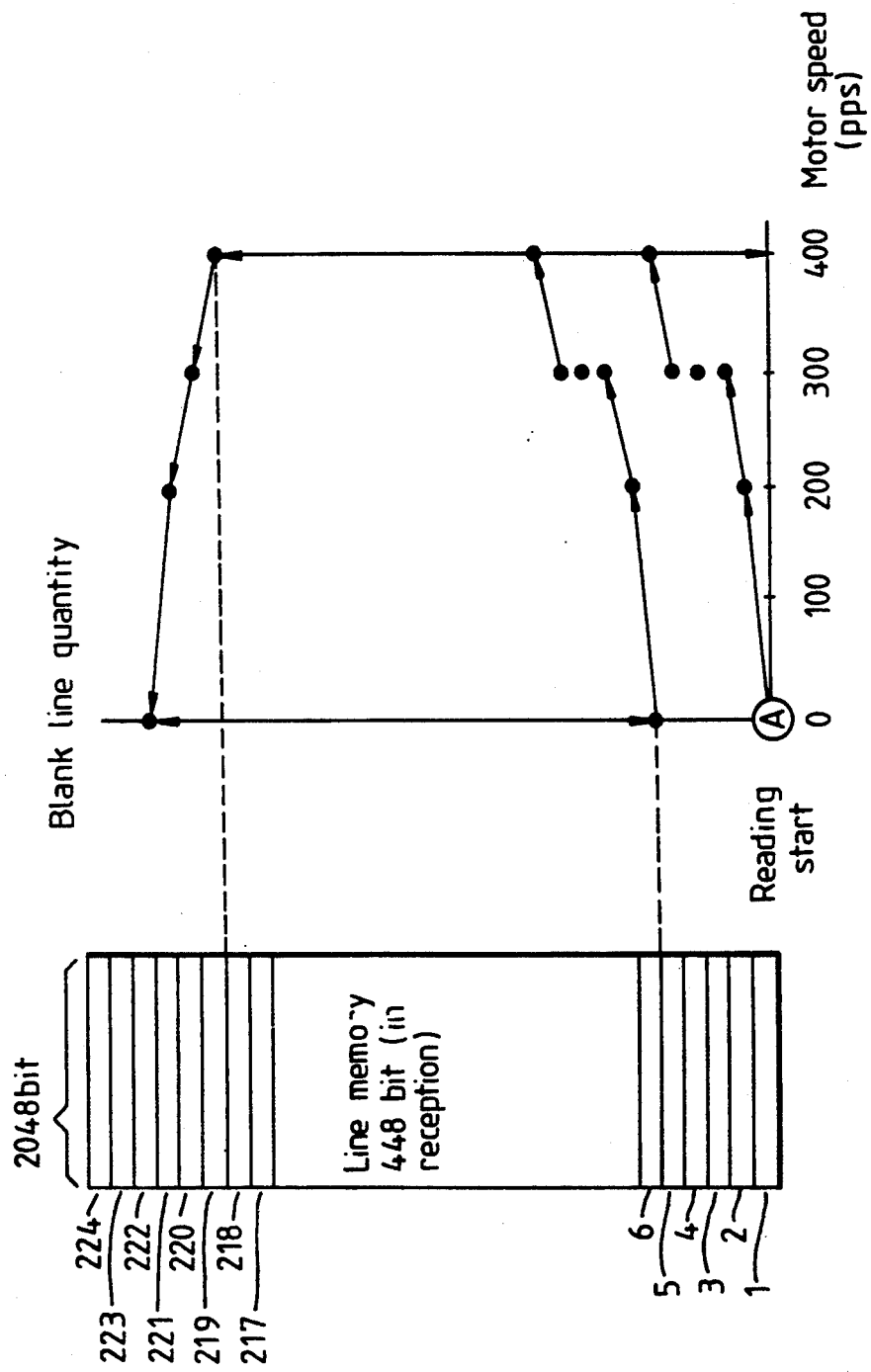
FIG. 36 illustrates the effect of motor smoothing in an embodiment of the present invention.

Smoothing of the recording motor can generally be made in the same way as for the reading section. FIG. 36 illustration motor smoothing. When the number of blank lines is large, or the number of stored lines is small, the recording motor slows down; conversely, when the number of blank lines is small, or the number of stored lines is large, a control procedure occurs on the basis of an accelerating hysteresis.

In this case, the control procedure must ensure that the motor speed is accelerated to increase gradually from, for example, 0 to 200, 300, and 400 pps (pulses per line) and will be decreased in a similar way.

In general, such a variable speed control procedure needs several parameters to be set, such as one-line long period of the motor and the exciting duty of the pulse motor, but a facsimile apparatus according to the present invention may operate on the basis of a table of these parameters and may thus read that table thereby simplifying the control procedure.

This can simplify the program needed and improve the ease of maintenance of maintainability.

Figure 37:
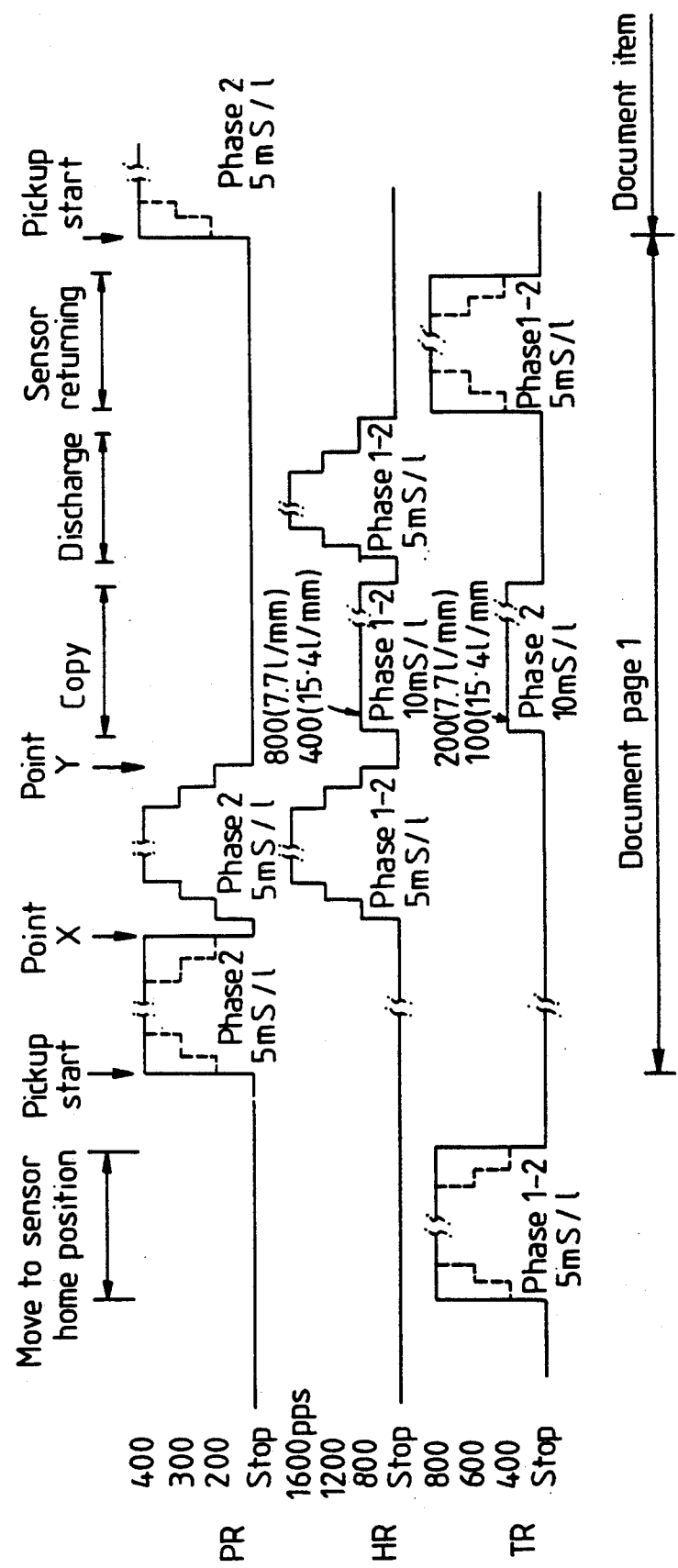
FIG. 37 shows steps in the motor smoothing operations at the time of copying.

FIG. 37 is a timing chart showing smoothing when copying. The chart shows speed changes of the pickup motor PR, the recording motor HR, and the reading motor TR. When copying is to occur, the reading motor is started to shift the sensor home position. After this, the pickup motor starts to pick-up and move the recording paper to a point X where the paper and the ink film are in registration. The pickup motor and the recording motor, are then run simultaneously to advance the paper to the recording start point Y before copying occurs.

Copying by the facsimile apparatus according to the present invention thus enables the reading motor and the recording motor to be run at the same speed. This gives the advantage that the size of the hardware can be minimized.

Magnification and reduction (scaling) copying processes involve the problem that when the reading motor and the recording motor are run at the same speed, the amounts of reading and recording may become too different resulting in overflow of the image memory. To avoid this, copying may operate on the basis that, for magnification, the reading motor is halted frequently, whilst for reduction, the recording motor is halted frequently. In this way, magnification and reduction copying can be accomplished without needing an image memory of large capacity. It should be noted that as the motors may have to halt frequently, the facsimile apparatus is operated at the motor speed at which the motors can be quickly stopped in the both magnification and reduction modes of operation.

At the ends of reading or recording, the recording paper is discharged, and the reading sensor is returned to its original position. This completes one copying cycle.

In order to increase further the copying speed, reading can be made in the reverse direction without returning the reading sensor to the original position so that a sensor returning time can be omitted.

The facsimile apparatus according to the present invention is not a mere copying machine, but a facsimile apparatus having a copying function that provides a variety of copying capabilities. One of the capabilities is a multi-copying feature. The multi-copy feature can make multiple copies with the read data of a document being encoded and stored in memory once, and are decoded for recording the data.

The multi-copy can be accomplished in combination with a document storage mode and a substitute received document recording mode. That is, a demand for multiple documents to be copied can be made in common with the document storage mode and the instantaneous transmitting mode of operation. Determination of the end of setting the next document can be made by pressing a start button when issuing the demand.

The multi-copy feature described above can be easily accomplished as the facsimile apparatus of the present invention has modules assembled for the processes.

The facsimile apparatus according to the present invention may have some problems due to the use of cut sheets of recording paper which do not occur when the conventional paper roll is used. The problem is how to allow for reception of a document which exceeds the size of the sheet.

To solve this problem, the user may select a range for which the information contained in the received document is to be recorded on the (limited) cut sheet of recording paper. In other words, if the user requires that all the information of the received document is to be obtained without any omission, the information which cannot be recorded on the first page is all transferred to and recorded on the next page. As many transmitted documents contain originating information, however, many received documents will exceed the size of a sheet of recording paper, resulting in overflow of the information a the second page.

For the reason, the facsimile apparatus of the present invention has a mode of operation that allows the abandoning of parts of the received document which could not be put on the first page of the recording paper if the user indicates that such omission is allowable, at least for a predetermined range.

If a document is divided during recording, for reception of a document, cut sheet recording takes an extra time for paper discharge and pickup as compared with the paper roll recording. This is due to the fact that if a document a little larger than the recording sheet is received and the user has required that no information is omitted, recording of one page cannot be completed until part of the document is recorded on a first sheet of recording paper, the sheet is discharged, a second sheet is picked up, the remaining information is recorded, and the second sheet is discharged. Extra time, therefore, has to be allowed for this procedure.

Figure 38:
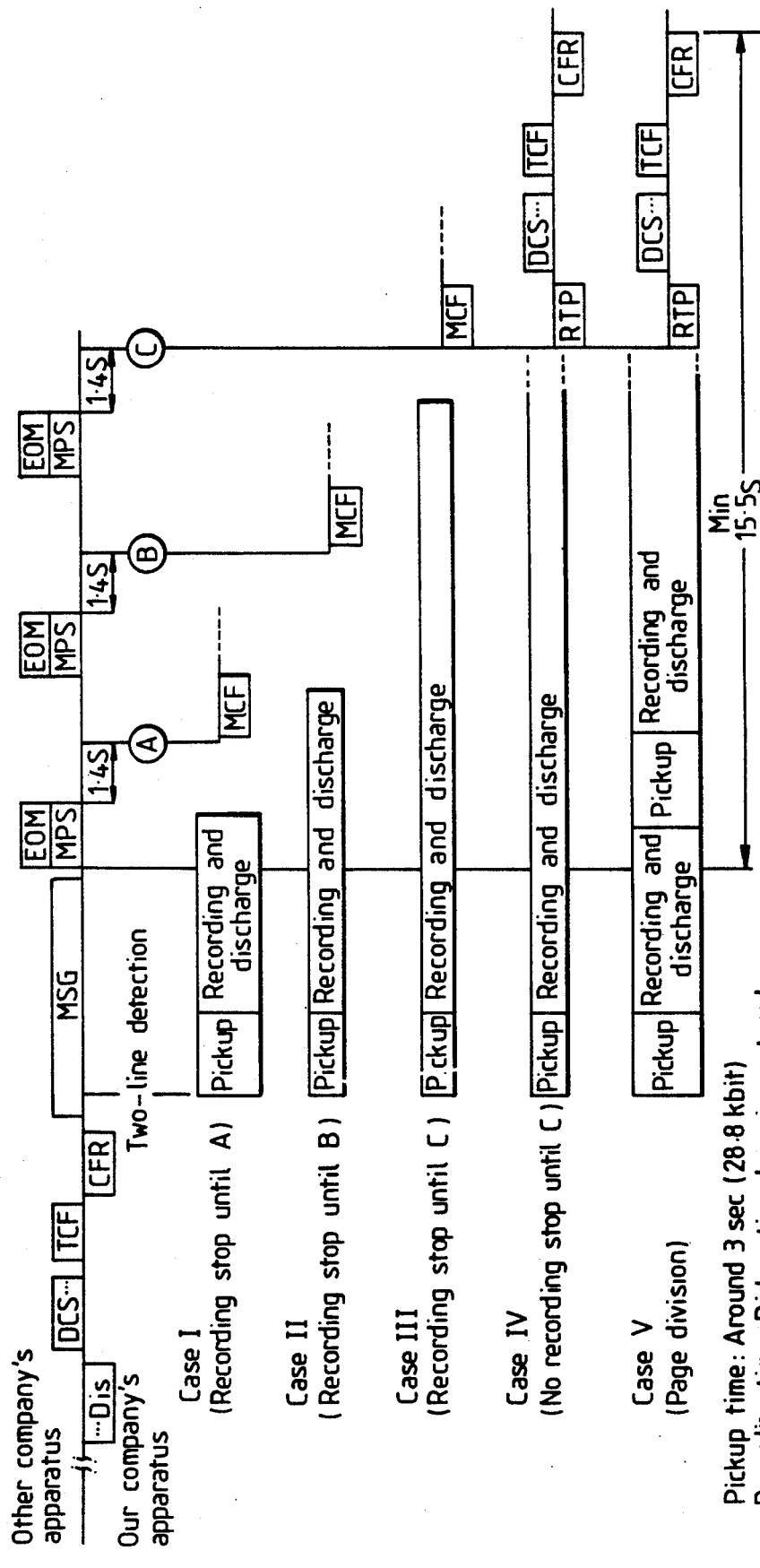
FIG. 38 illustrates response procedure timing.

FIG. 38 is a timing chart for response procedures in the G3 standard mode of operation. Case I has no problem as the reception process ends 1.4 seconds before the first EOM. Case II has the reception process ended before point B. It is allowed for by passing over the MPS a time. Case III passes over the MPS two times if the reception process ends before point C. Cases IV and V can return the RTP for the third EOM unless the reception process ends before point C.

Figure 39:
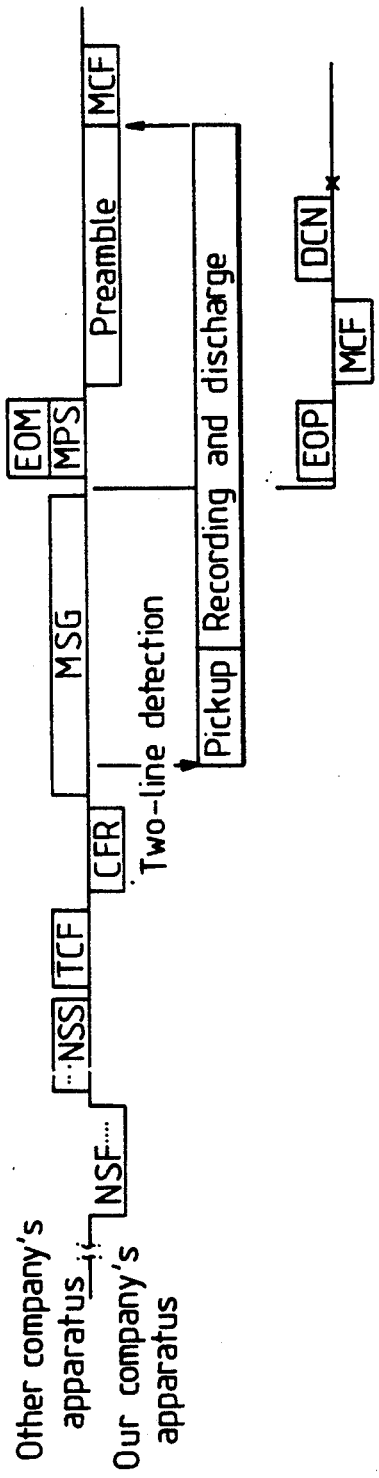
FIG. 39 illustrates a modified response timing procedure.

FIG. 39 is a timing chart for response procedures of an example in which waiting is made with preamble of a flag.

One of the features of the facsimile apparatus of the present invention is that it can use multi-time ink film. Multitime ink film can make transference several times as compared with the conventional ink film which is not available after one transference operation. Using the multi-time ink film needs more precise control than the conventional printing control.

Figure 40:
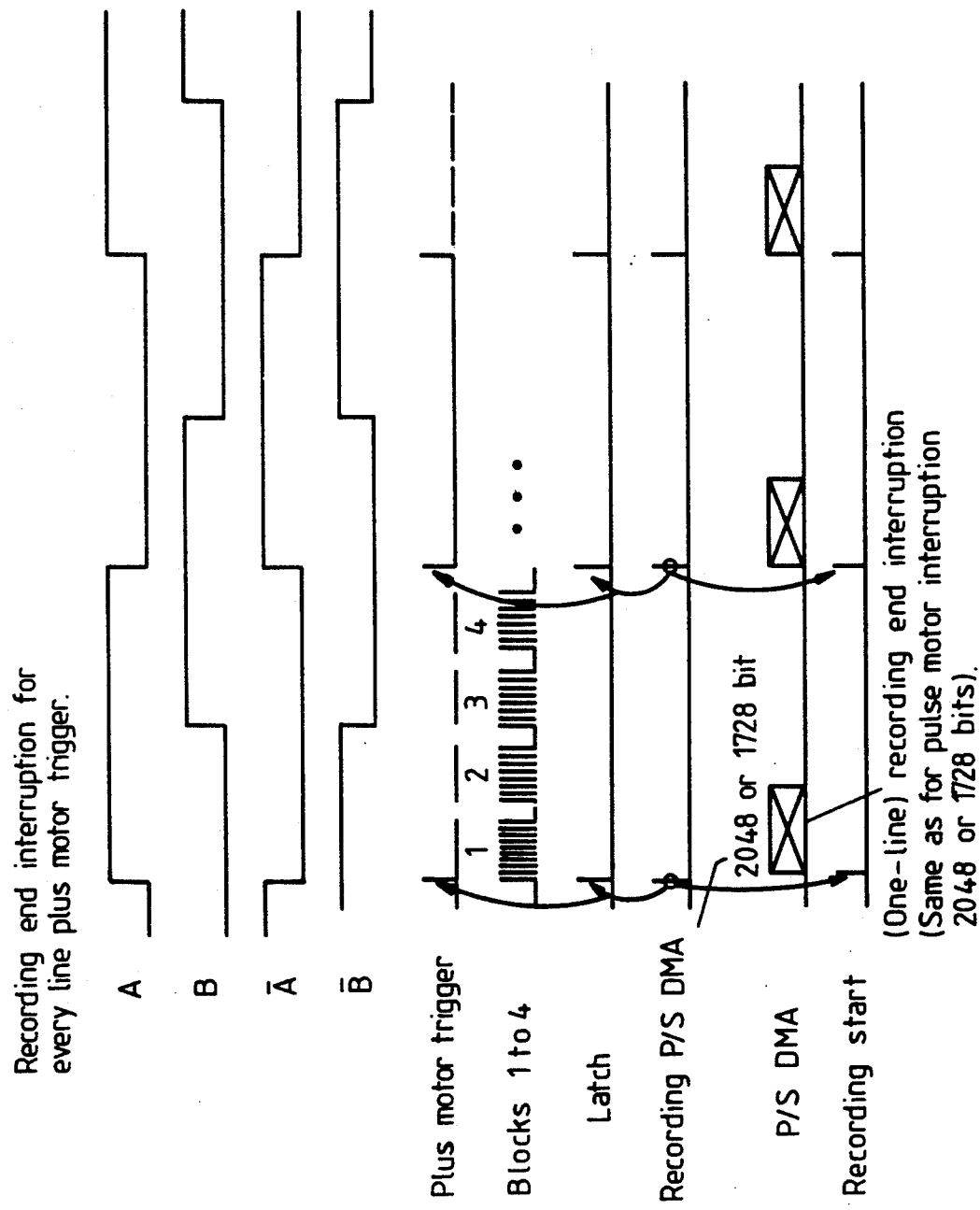
FIG. 40 illustrates timing steps in a thermal transfer printing arrangement.

FIG. 40 is a timing chart for a conventional control sequence. Excitation phases of a pulse motor are indicated at A, B, *A, and *B. The motor can advance by sequented pulses with change of the phase.

The printing process may be as follows. If a one-line recording end interruption process is started, a trigger (start) for the pulse motor and a latch pulse and a recording start signal for transferring printing data to a printing head are generated. The pulse motor trigger prompts the motor to generate a predetermined number of pulses. If it advances one line (two pulse/line in the figure), the recording end interruption occurs. If the recording start signal is generated, blocks 1 to 4 of the recording head generate pulses each of predetermined duty in sequence to execute the transfer process. At the same time as the strt of recording a recording P/S DMA starts to transfer the data on the next line to a shift register DMA which can store the printing data for a suitable time. For size B paper a 2048 bit DMA transfer occurs and for size A paper a 1728 bit DMA transfer occurs.

Figure 41:
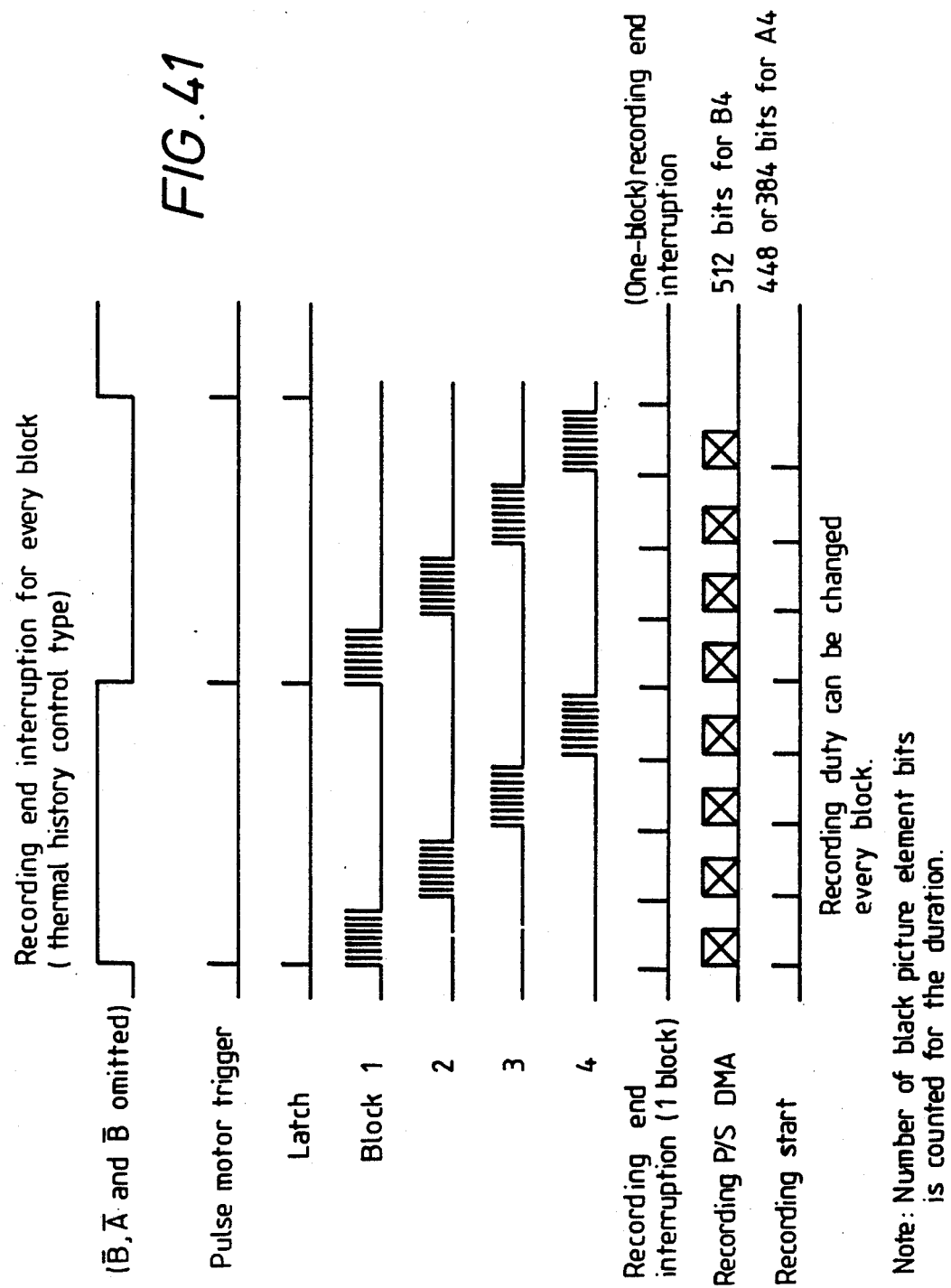
FIG. 41 is a further timing chart of thermal transfer printing in an apparatus according to the present invention.

The printing concentration control is made by determining e.g the recording duty, a recording block length, a period, on the basis of parameters of e.g. the printing head resistance, temperature, and time from the preceding line recording to the present line recording. FIG. 41 is a timing chart for the printing sequence of a thermal control system according to the present invention. The difference from a conventional system is that the recording end interruption is made for every block. The DMA transfer occurs for every block, and the number of black picture element bits in each block is counted. This parameter is added to the conventional parameters to control precisely the duty and the other factors for every block.

Figure 42:
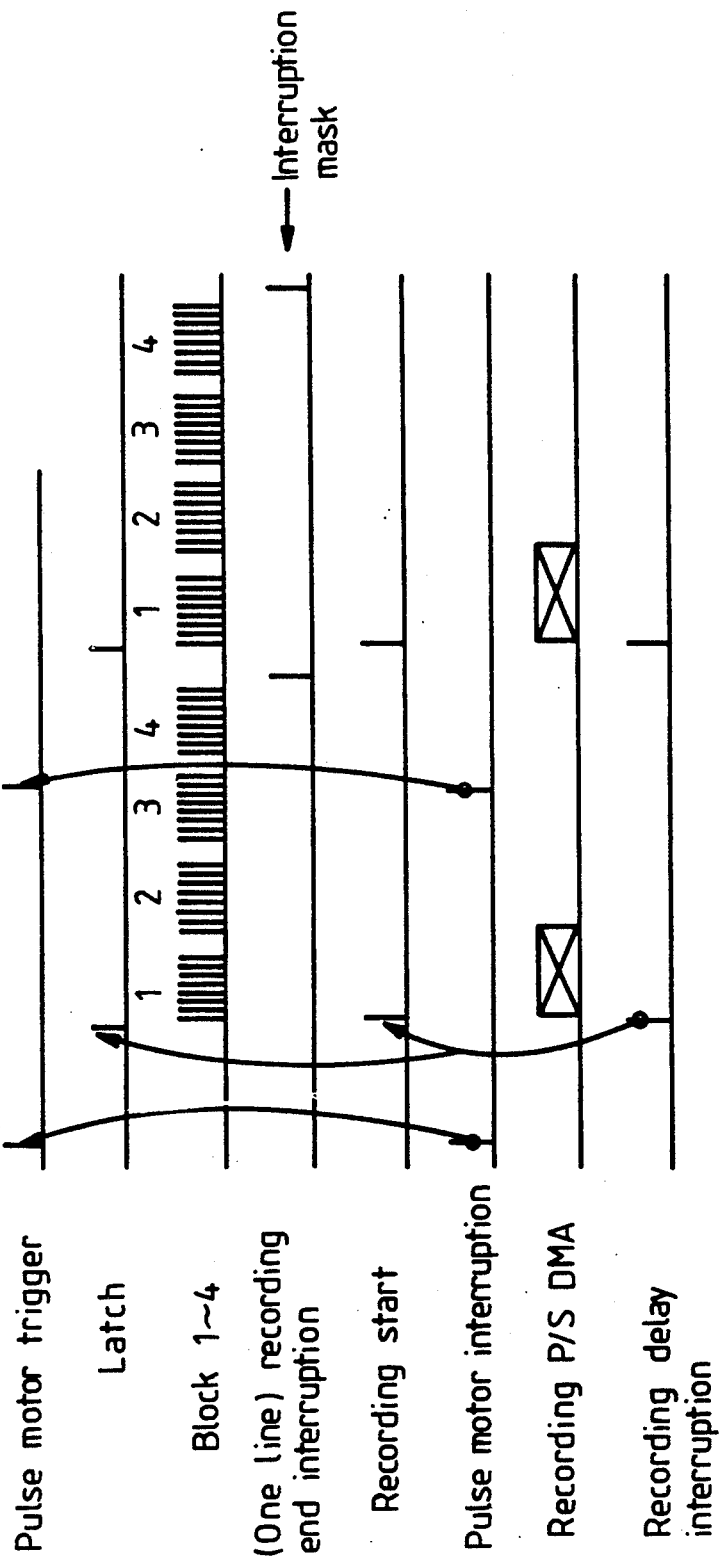
FIG. 42 shows a further timing chart.

FIGS. 42 and 43 are timing charts for a conventional printing system and the thermal history control system which uses a delay timer that the pulse motor is started by the pulse motor interruption before printing is started in a predetermined delay time. The delay timer can start the pulse motor before printing, thereby controlling the image deteriorations such as sticking.

Figure 44A:
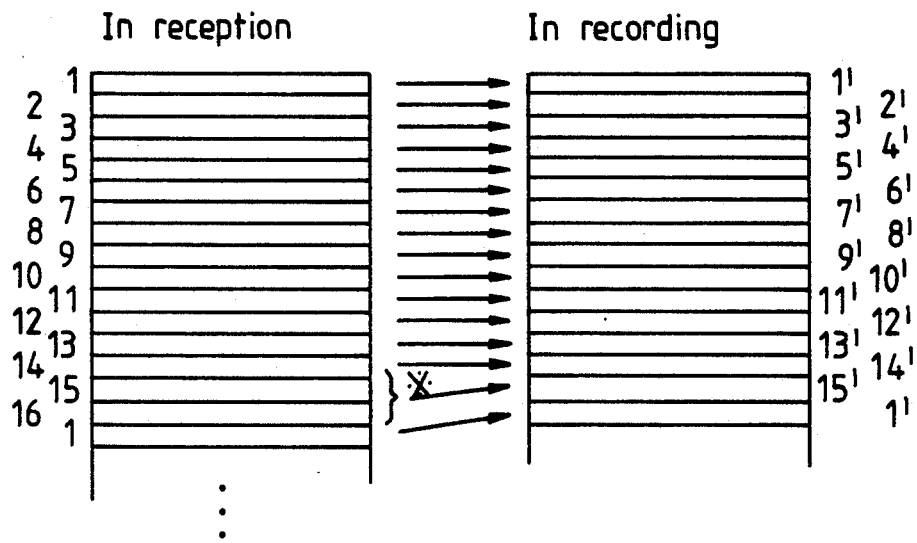
FIG. 44 illustrates document size reduction in an embodiment of the present invention.

In Japan and Europe, A4 recording paper is widely used, but the US and other many countries letter size paper is used which is wider, but longer than A4 paper. If an A4 document is received and recorded on the letter size paper, it is expected that some information is omitted. To avoid this, if the recording paper is of letter size, reduction occurs by one line for 16 lines as shown in FIG. 44(a). This prevents information from being omitted.

Figure 44B:
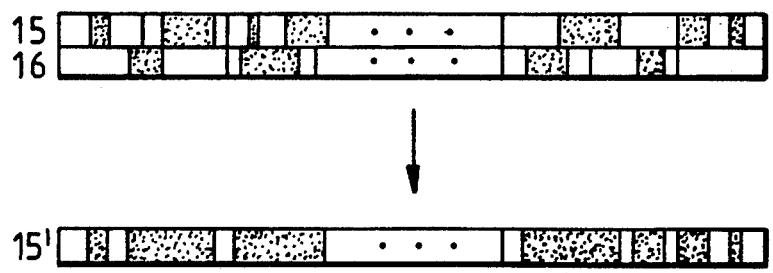

In the reduction process, the line to be reduced and the preceding line are optically read to keep the information as shown in FIG. 44(b). It further is difficult for the software optically read two lines in the recording section, particularly in the thermal history control.

For the reason, a two-line optically reading process is made in the codec section, and a line attribution table is used to determine the position corresponding to the line to be reduced. This improves the through-put and is available for wide module construction.

The facsimile apparatus of the present invention may have its telephone features limited to a minimum for simplification of pulses. For the reason, dialing can be made in two ways, one using an external telephone set and the other being a sheet dialing method which makes use of an OCR sheet.

Figure 45:
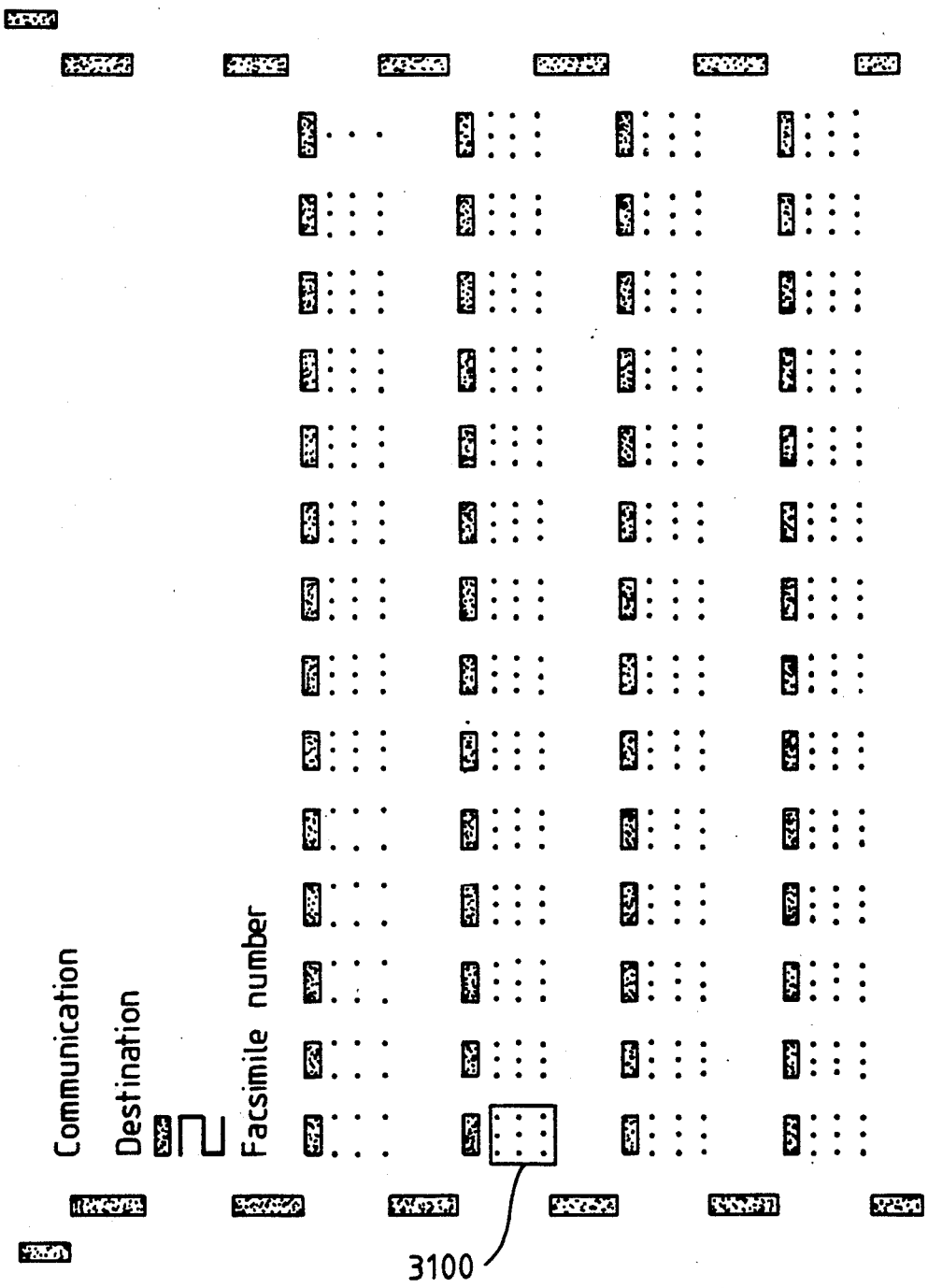
FIG. 45 illustrates image data which can be read according to an embodiment of the present invention.

FIG. 45 is a format sheet for sheet dialing. The user may enter a character by connecting nine points on the entering area 3100 of the sheet. The facsimile apparatus can automatically recognize the character for dialing or change of feature data and set transmission designation time.

FIG. 46 is an example of entering on the OCR sheet. Not only the numbers 0 to 9 may be entered but also letters A to Z and some symbols.

Figure 47:
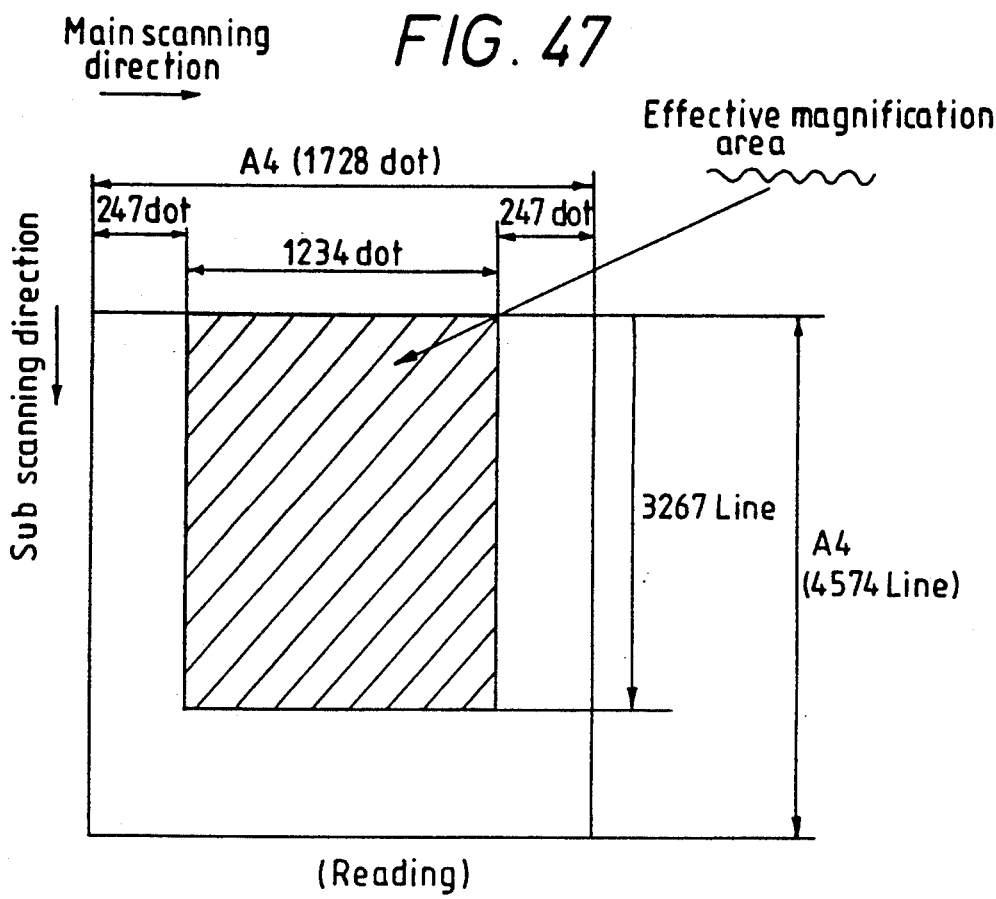
FIG. 47 illustrates magnification.

Magnification may be on the basis that the same data is written two times in the recording section. FIG. 47 shows the position relationship when an input document of 1234 dots by 3267 lines (15.4 line/mm in the sub-scanning direction) is magnified 141% to an A4 size of 1728 dots by 4574 lines.

Figure 48A:
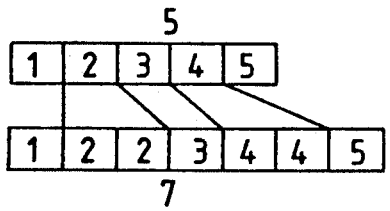
FIG. 48 illustrates schematically the operation by which magnification is achieved.
Figure 48B:
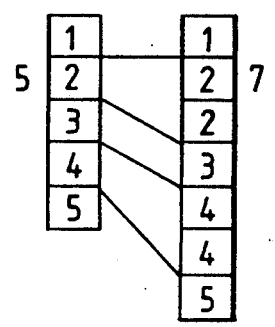

FIG. 48 illustrates magnification conceptually. When the main scanning direction has five dots 1 to 5 magnified to seven dots, the same dots 2 and 4 are used twice during magnification. Similarly, the sub-scanning direction has the same data written twice during to magnification.

This feature can be used in reception other than copying, and is particularly effective for weak-sighted people.

What is claimed is:

1. A facsimile apparatus, comprising:
   a transparent plate for receiving a document to be processed;
   scanning means movable relative to said transparent plate for scanning said transparent plate so as to generate a signal corresponding to an image on said document;
   output means for selectably transmitting said signal to a remote destination;
   input means for receiving a further signal representing a further image from a remote origin;
   store means for storing material for printing thereon, said material being in the form of a plurality of sheets; and
   printing means for withdrawing at least one sheet from said store means, receiving at least one of said signal and said further signal, and printing on said one at least sheet, said printing on said sheet being a representation of at least one of said image and said further image;
   wherein said scanning means includes electronic solid state light generation means for generating light for illuminating said transparent plate and detector means for detecting reflected light through said transparent plate and generating said signal therefrom.

2. A facsimile apparatus according to claim 1, having light control means for controlling said solid state light generation means so as to control the quantity of light generated thereby.

3. A facsimile apparatus according to claim 2, having means for generating a pulse signal, and said light control means is arranged to control the light generation of said solid state light generation means on the basis of said pulses, thereby to generate pulsed light generation by said solid state light generation means.

4. A facsimile apparatus according to claim 3, wherein said detector means is arranged to detect received light as a plurality of sequential lines and said light control means is arranged to synchronise said pulse signal with said plurality of sequential lines.

5. A facsimile apparatus according to claim 4, wherein said light control means is arranged to vary said synchronisation of said pulse signal with said plurality of sequential lines.

6. A facsimile apparatus according to claim 4, wherein said pulsed signal has a pulse duration less than the duration of scanning of one of said plurality of sequential lines.

7. A facsimile apparatus according to claim 4, wherein said pulsed signal has a pulse duration equal or greater than the duration of scanning of one of said plurality of sequential lines.

8. A facsimile apparatus according to claim 4, wherein said pulse signal is synchronised with the relative speed of movement of said transparent plate and said scanning means.

9. A facsimile apparatus according to claim 8, having a motor drive for causing said scanning means to move relative to said transparent plate, and pulse drive generation means for driving said motor drive according to a pulse drive signal, said pulse signal having a frequency which is an integral multiple of said pulse drive signal.

10. A facsimile apparatus according to claim 8, wherein said pulse drive generation means is arranged to vary the frequency of said pulse drive signal.

11. A facsimile apparatus according to claim 1, wherein said solid state light generation means includes a plurality of LEDs arranged linearly.

12. A facsimile apparatus according to claim 1, wherein said printing means comprises generating means for generating a pattern of heat, means for carrying ink, and means for transferring said ink to said at least one sheet of material in dependence on said pattern, thereby to generate said printing on said sheet.

13. A facsimile apparatus according to claim 1, wherein said facsimile apparatus also includes means for receiving an additional document to be processed, and transporting said additional document proximate said scanning means with the position of said scanning means being fixed, thereby to cause said scanning means to generate an additional signal corresponding to an additional image on said document.

14. A facsimile apparatus according to claim 1, wherein said scanning means has a plurality of selectable scanning directions.

15. A facsimile apparatus, comprising:
   a transparent plate for receiving a document to be processed;
   scanning means movable relative to said transparent plate for scanning said transparent plate so as to generate a signal corresponding to an image on said document;
   output means for selectably transmitting said signal to a remote destination;
   input means for receiving a further signal representing a further image from a remote origin;
   store means for storing material for printing thereon, said material being in the form of a plurality of sheets; and
   printing means for withdrawing at least one sheet from said store means, receiving at least one of said signal and said further signal, and printing on said at least one sheet, said printing on said sheet being a representation of at least one of said image and said further image;
   wherein said printing means comprises generating means for generating a pattern of heat, means for carrying ink, and means for transferring said ink to said at least one sheet of material in dependence on said pattern thereby to generate said printing on said sheet.

16. A facsimile apparatus according to claim 15, wherein said means for carrying ink is a movable film.

17. A facsimile apparatus according to claim 16, having means for moving said at least one sheet proximate said printing means in a predetermined direction, and said movable film is movable in a direction parallel to said predetermined direction.

18. A facsimile apparatus according to claim 16, having two film winding shafts, and said movable film extends between said shafts and is selectively movable in a direction towards either of said shafts.

19. A facsimile apparatus according to claim 18, wherein said shafts and said film are in a cassette removable from said facsimile apparatus.

20. A facsimile apparatus, comprising:
   a transparent plate for receiving a document to be processed;
   scanning means movable relative to said transparent plate for scanning said transparent plate so as to generate a signal corresponding to an image on said document;
   output means for selectably transmitting said signal to a remote destination;
   input means for receiving a further signal representing a further image from a remote origin;
   store means for storing material for printing thereon, said material being in the form of a plurality of sheets; and
   printing means for withdrawing at least one sheet from said store means, receiving at least one of said signal and said further signal, and printing on said at least one sheet, said printing on said sheet being a representation of at least one of said image and said further image;
   wherein said facsimile apparatus also includes means for receiving an additional document to be processed, and transporting said additional document proximate said scanning means with the position of said scanning means being fixed, thereby to cause said scanning means to generate an additional signal corresponding to an additional image on said document;
   and said facsimile apparatus further includes means for analysing said additional signal and for controlling said output means on the basis of said analysis of said additional signal.

21. A facsimile apparatus, comprising:
   a transparent plate for receiving a document to be processed;
   scanning means movable relative to said transparent plate for scanning said transparent plate so as to generate a signal corresponding to an image on said document;
   output means for selectably transmitting said signal to a remote destination;
   input means for receiving a further signal representing a further image from a remote origin;
   store means for storing material for printing thereon, said material being in the form of a plurality of sheets; and
   printing means for withdrawing at least one sheet from said store means, receiving at least one of said signal and said further signal, and printing on said at least one sheet, said printing on said sheet being a representation of at least one of said image and said further image;
   wherein said scanning means has a plurality of selectable scanning directions.

22. A facsimile apparatus, comprising:
   a transparent plate for receiving a document to be processed;
   scanning means movable relative to said transparent plate for scanning said transparent plate so as to generate a signal corresponding to an image on said document;
   output means for selectably transmitting said signal to a remote destination;
   input means for receiving a further signal representing a further image from a remote origin;
   store means for storing material for printing thereon, said material being in the form of a plurality of sheets; and
   printing means for withdrawing at least one sheet from said store means, receiving at least one of said signal and said further signal, and printing on said at least one sheet, said printing on said sheet being a representation of at least one of said image and said further image;
   a casing enclosing said scanning mans, said output means, said input means, said store means, and said printing means and having said transparent plate in a surface thereof;
   receiving means within said casing for receiving printed sheets from said printing means.

23. A method of processing a document comprising the steps of:
   a) locating said document on a transparent plate;
   b) scanning said document by an one-dimensional line sensor which generates light from electronic solid state light generation means, said light illuminating said document through said transparent plate, detects light reflected from said transparent plate, and generates an image signal corresponding to an image on said document, said scanning being carried out by moving said line sensor while said document is fixed; and
   c) processing said image signal by at least one of
      (i) transmitting said image signal to a remote destination; and
      (ii) printing on at least one sheet of material an image corresponding to said image on said document on the basis of said image signal.

24. A method of processing a document comprising the steps of:
   a) locating said document on a transparent plate;
   b) scanning said document by an one-dimensional line sensor which generates light from electronic solid state light generation means, said light illuminating said document through said transparent plate, detects light reflected from said transparent plate, and generates an image signal corresponding to an image on said document, said scanning being carried out by moving said line sensor while said document is fixed; and
   c) processing said image signal by at least one of
      (i) transmitting said image signal to a remote destination; and
      (ii) printing on at least one sheet of material an image corresponding to said image on said document on the basis of said image signal, said printing being performed by generating a pattern of heat on the basis of said image signal, and transferring ink from a carrier to said at least one sheet of material on the basis of said pattern of heat.

25. A method of processing a document comprising the steps of:
   a) locating said document on a transparent plate;
   b) scanning said document by an one-dimensional line sensor which generates light from electronic solid state light generation means, said light illuminating said document through said transparent plate, detects light reflected from said transparent plate, and generates an image signal corresponding to an image on said document, said scanning being carried out by moving said line sensor while said document is fixed; and
   c) processing said image signal by at least one of
      (i) transmitting said image signal to a remote destination; and
      (ii) printing on at least one sheet of material an image corresponding to said image on said document on the basis of said image signal,
   wherein said transmitting includes scanning an additional document to generate an additional signal corresponding to said destination, and transmitting said image signal on the basis of said additional signal.

26. A method of processing a document comprising:
   a) locating said document on a transparent plate;
   b) scanning said document and generating an image signal corresponding to an image on said document; and
   c) processing said image signal by at least one of
      (i) transmitting said image signal to a remote destination; and
      (ii) printing on at least one sheet of material an image corresponding to said image on said document on the basis of said image signal;
   wherein said scanning of said document is in one of a plurality of selectable directions.

27. A method of processing a document comprising:
   generating an image signal of an image of said document at a remote location;
   transmitting said image signal to a priority site; and
   printing on at least one sheet of material at said printing site an image corresponding to said image on said document on the basis of said image signal, said printing being by generating a pattern of heat on the basis of said image signal, and transferring ink from a carrier to said at least one sheet of material on the basis of said pattern of heat;
   wherein said step of printing commences a predetermined time after the start of arrival of said image signal at said printing site.

* * * * *